(12) United States Patent
Ushijima

(10) Patent No.: US 7,548,028 B2
(45) Date of Patent: Jun. 16, 2009

(54) CURRENT-MODE RESONANT INVERTER CIRCUIT

(75) Inventor: Masakazu Ushijima, 30-24 Nogata 6-chome Nakano-ku, Tokyo (JP)

(73) Assignees: Hong-Fei Chen, Taichung (TW); Masakazu Ushijima, Tokyo (JP)

( * ) Notice: Subject to any disclaimer, the term of this patent is extended or adjusted under 35 U.S.C. 154(b) by 339 days.

(21) Appl. No.: 11/330,328

(22) Filed: Jan. 12, 2006

(65) Prior Publication Data

US 2006/0193152 A1   Aug. 31, 2006

(30) Foreign Application Priority Data

Jan. 12, 2005   (JP)   ............... 2005-005409

(51) Int. Cl.
*H05B 37/00*   (2006.01)
(52) U.S. Cl. .................. 315/244; 315/276; 315/282; 315/209 R; 315/128; 315/DIG. 5; 363/21.07; 363/21.17; 363/22; 363/98
(58) Field of Classification Search ................. 315/127, 315/128, 209 R, 227 R, 224, 244, 276, 277, 315/282, 290, 291, DIG. 5; 363/21.07, 21.09, 363/21.15, 21.17, 22, 96–98, 132, 136
See application file for complete search history.

(56) References Cited

U.S. PATENT DOCUMENTS

| | | | | |
|---|---|---|---|---|
| 4,210,846 | A | * | 7/1980 | Capewell et al. ............. 315/121 |
| 4,541,041 | A | * | 9/1985 | Park et al. .................... 363/41 |
| 4,788,634 | A | | 11/1988 | Schlecht et al. |
| 5,416,387 | A | | 5/1995 | Cuk et al. |
| 5,495,405 | A | | 2/1996 | Fujimura et al. |
| 6,114,814 | A | | 9/2000 | Shannon et al. |
| 6,181,079 | B1 | | 1/2001 | Chang et al. |
| 6,259,615 | B1 | | 7/2001 | Lin |
| 6,633,138 | B2 | | 10/2003 | Shannon et al. |
| 6,774,580 | B2 | | 8/2004 | Suzuki et al. |
| 2002/0140376 | A1 | | 10/2002 | Kamata et al. |

(Continued)

FOREIGN PATENT DOCUMENTS

EP   0735658 A2   10/1996

(Continued)

*Primary Examiner*—Haissa Philogene
(74) *Attorney, Agent, or Firm*—Birch, Stewart, Kolasch & Birch, LLP

(57) ABSTRACT

A high conversion efficiency inverter circuit by providing the current-mode resonant type efficient in using a power source.

A current-mode resonant inverter circuit comprises a step-up transformer; the secondary winding side of the step-up transformer is composed of a resonant circuit between leakage inductance of the step-up transformer secondary winding and a capacitive component present in the secondary side circuit; one end of the step-up transformer primary winding is connected to the power source side; the other end of the primary winding is connected to a switched snubber circuit through the primary winding of a current transformer; the switched-snubber circuit comprises a pair of transistors different from each other in polarity; bases or gate of the pair of transistors, connected to each other, are connected to the secondary winding of the current transformer; either collector of the pair of transistors is connected to the primary winding of the current transformer; the other collector of the transistor is connected to the current transformer primary winding through a capacitor.

19 Claims, 47 Drawing Sheets

U.S. PATENT DOCUMENTS

2004/0245944 A1  12/2004  Lee et al.
2006/0152174 A1*  7/2006  Ushijima .................... 315/307

FOREIGN PATENT DOCUMENTS

| | | |
|---|---|---|
| JP | 59-32370 A | 2/1984 |
| JP | 7-211472 A | 8/1995 |
| JP | 8-288080 A | 11/1996 |
| JP | 2733817 B2 | 9/1998 |
| JP | 2002-233158 A | 8/2002 |
| JP | 2003-168585 A | 6/2003 |

* cited by examiner

Fig. 29
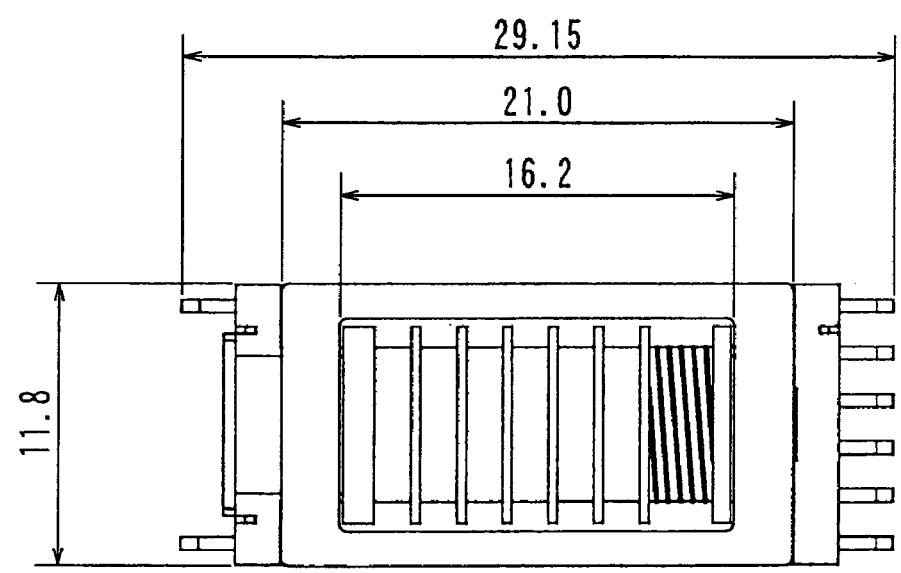
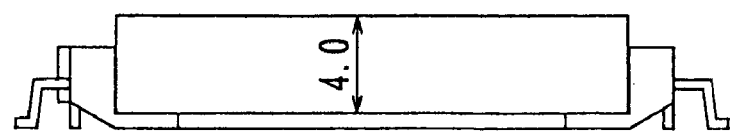

CURRENT-MODE RESONANT INVERTER CIRCUIT

This application claims priority to Japanese Patent Application No. 2005-005409 filed on Jan. 12, 2005.

TECHNICAL FIELD

The present invention relates to a dependent invention of the invention disclosed in Japanese Patent No. 2733817 (U.S. Pat. No. 5,495,405) by the inventor of the present invention or the use of the technical subject matters of that invention, and more particularly, to a current-mode resonant inverter circuit for a light source which is capacitive such as a hot cathode fluorescent lamp, a cold cathode fluorescent lamp (CCFL), an external electrode fluorescent lamp (EEFL), a neon lamp and any discharge lamps that has the similar characteristics.

BACKGROUND OF THE INVENTION

Recently, a surface light source has come to be used more widely, not only for displays for an advertisement and personal computer, but also for liquid crystal display television sets and the like.

There is a demand of making an inverter circuit for driving these surface light sources smaller and to make high conversion efficiency.

Hereinafter, a description is given for the relation between the recent transition of an inverter circuit for a cold cathode fluorescent lamp and the invention disclosed in Japanese Patent No. 2733817 (U.S. Pat. No. 5,495,405).

For an inverter circuit for a cold cathode fluorescent lamp, conventionally, the collector resonant circuit shown in FIG. 24 has been widely used as a classical circuit. This is sometimes referred to as "Royer circuit". However, since the Royer circuit is officially defined as a circuit which reverses a switching operation by saturating the transformer. A circuit which performs the reverse operation by using the resonance on the collector side is desirably referred to as "collector resonant circuit" or "collector resonant Royer circuit" as distinguished from the Royer circuit.

An initial inverter circuit for a cold cathode fluorescent lamp, which never uses the resonating method on the secondary side of the circuit, uses the so-called closed magnetic circuit type transformer having small leakage inductance for the step-up transformer. Under these circumstances, those skilled in the art understand that the leakage inductance of the step-up transformer in the inverter circuit is deemed disadvantageous in that it drops the output voltage on the secondary side of the transformer, and is desirable to be as small as possible.

As a result, the resonance frequency of the circuit on the secondary side of the transformer under these circumstances, without relation to the operational frequency of the inverter circuit, is set at a frequency much higher than the operational frequency of the inverter circuit in order not to influence the operational frequency of the inverter circuit. Furthermore, the ballast capacitor Cb is essential to stabilize the lamp current.

Next, among the inverter circuits for a cold cathode fluorescent lamp, the one shown in FIG. 25 is known, which is disclosed in Japanese Laid-Open Patent Publication (Kokai) No. Hei 07-211472. The circuit, where the resonance frequency of the circuit on the secondary side is three times as high as the oscillation frequency of the primary side circuit as shown in FIG. 26, has been widely used, being referred to as the so-called triple resonant circuit. In the step-up transformer used in this case, the leakage inductance is favorably made larger to some extent.

In this case, as shown in the explanatory diagram of FIG. 27, the oscillation frequency and third-order harmonic of the inverter circuit are combined to produce a trapezoidal waveform.

The actual current which flows through the cold cathode fluorescent lamp of the triple resonant circuit presents the waveform shown in FIG. 28.

The name of the step-up transformer in this case has not been fixed yet. There has been debate about whether or not it can be referred to as the "closed magnetic transformer", which is so-called among those skilled in the art, and the definition of the name remains ambiguous. The problem of how to describe the state in which a larger amount of flux leaks although the magnetic circuit structure is closed has been discussed. There is still a problem in the lack of technical terms which consider the above state.

The shape of the transformer used in the actual so-called triple resonance is flat as shown in FIG. 29, where the flux leakage is considerably larger than in a conventional one although the magnetic circuit structure is closed. Specifically, the transformer has a large leakage inductance.

In any case, the technical idea makes the leakage inductance of the step-up transformer larger to some extent so as to form a resonant circuit between the leakage inductance and the capacitive component formed on the secondary side of the step-up transformer (FIG. 25). Also, the resonance frequency is set at a frequency three times as high as the operational frequency of the inverter circuit so as to produce the third-order harmonic in the secondary circuit (FIG. 26), thereby making the lamp current waveform trapezoidal (FIG. 27). In this case, a ballast capacitor C2, which is the ballast capacitor, operates as a part of the resonance capacitor.

As disclosed in Japanese Laid-Open Patent Publication (Kokai) No. Hei 07-211472, this technical idea considerably improves the conversion efficiency of the inverter circuit and furthermore makes the inverter circuit smaller than the step-up transformer. Also, the recent or current collector resonant inverter circuit for a cold cathode fluorescent lamp is based on the technical idea of the triple resonance, and it would not be an exaggeration to say that the technique is employed in most of the collector resonant inverter circuits which are currently used.

Next, the invention disclosed in Japanese Patent No. 2733817 (U.S. Pat. No. 5,495,405) on which the present invention is based makes the step-up transformer further smaller and improves conversion efficiency drastically. The invention, which started to be worked widely around 1996, contributes a great deal to make the inverter circuit in a laptop personal computer smaller and to improve conversion efficiency. The invention, in which the operational frequency of the inverter circuit and the resonance frequency in the secondary circuit almost coincide, is achieved by making the step-up transformer leakage inductance further larger and making the capacitive component in the secondary circuit larger at the same time in the triple resonance.

The technique utilizes an effect that the exciting current flowing through the primary winding of the step-up transformer decreases when the inverter circuit operates at a frequency close to the resonance frequency in the secondary circuit, thereby improving the power factor as seen from the primary winding side of the transformer and reducing the copper loss of the step-up transformer.

At the same time, after the invention was disclosed, as driving methods for the primary side circuit, in addition to the conventional collector resonant circuit, many kinds of driving methods including the following separately excited-type driving methods of a fixed frequency and zero current switching type driving methods for performing switching by detecting the zero current through the primary side windings. Each of these series of peripheral techniques is closely related to the invention, and contributes to popularizing usage of the resonance technique of the secondary side circuit in the invention.

Considering the changes in the series of background techniques regarding the inverter circuit for a cold cathode fluorescent lamp from a viewpoint of the leakage inductance of the step-up transformer, it can be regarded as the history that the step-up transformer leakage inductance increases and the secondary side circuit resonance frequency becomes lower at the same time as a new generation of the inverter circuit comes to the forefront as shown in FIG. 30.

It should be noted that FIG. 30 is an explanatory diagram illustrating that the relation between the drive frequency $f_0$ of the inverter circuit and the resonance frequency fr in the secondary circuit changes with the times.

Improving the step-up transformer and selecting the drive frequency thereof appropriately achieve the miniaturization of the inverter circuit and improve conversion efficiency of the inverter circuit. Regarding this matter, in the invention disclosed in Japanese Laid-Open Patent Publication No. 2003-168585 by the inventor of the present invention (U.S. Pat. No. 6,774,580-B2), with the explanatory diagram of FIG. 31 (an explanatory diagram illustrating the improvement scheme of the power factor as seen from the driving methods side, in which the horizontal axis indicates frequency, and θ indicates the phase difference between the voltage and current of the primary winding of the step-up transformer, showing that power factor is improved as θ becomes closer to zero), a scheme for promoting the conversion efficiency as seen from the driving method side is disclosed in detail.

On the contrary, as shown in U.S. Pat. No. 6,114,814-B1 and Japanese Laid-Open Patent Publication No. Sho 59-032370, those skilled in the art consistently have advocated the technical idea that a high conversion efficiency inverter circuit is achieved by zero current switching methods.

These technical ideas, however, without having a viewpoint of the improvement power factor effect of the step-up transformer, are incorrect in that high efficiency is due to the reduction of heat generated in the switching transistor.

The reason will be described in detail below.

Zero current switching method is one power control method of the inverter circuit. A typical example thereof is a zero current switching type circuit as shown in FIG. 32, which is disclosed in U.S. Pat. No. 6,114,814-B1 and Japanese Laid-Open Patent Publication No. Sho 59-032370. The inventor of the present invention also discloses a similar technique in Japanese Laid-Open Patent Publication No. Hei 08-288080. The technique is described based on the U.S. Pat. No. 6,114,814-B1 as follows.

U.S. Pat. No. 6,114,814-B1 shows explanatory diagrams illustrating the operation of the conventional zero current switching type circuit shown in FIG. 11 which is shown as FIG. 33 in the present specification, wherein A, B show a case in which no power control is performed; C, D a case in which power control is performed; E, F a case in which zero current switching operation is tried in a state that a voltage effective value advances in phase with respect to a current value. Also, FIG. 12 of the above-mentioned U.S. Pat. No. 6,114,814-B1 is shown as FIG. 34 of the present specification, wherein G, H show one exemplary control which is not zero current switching operation.

In FIG. 33, A shows the voltage of the primary winding of the transformer when drive power is at maximum and B shows the current flowing through the transformer primary winding in that case. When the zero current switching method is used, timing when the current becomes zero is detected so as to switch driving methods. When power is at maximum, specifically when no power control is performed adjusting the duty ratio (the circulation angle) to 100%, there is no phase difference between the effective value of the effective voltage phase and the current phase supplied to the transformer primary winding. Specifically, in this condition the power factor is favorable.

Next, C of FIG. 33 shows the voltage across the transformer primary winding when the duty ratio is decreased so as to control drive power, and D shows the current flowing through the transformer primary winding in this case. In FIG. 33, the switching transistor of the driving methods is turned on at timing when the current becomes zero. On the contrary, it is not at zero current timing when the switching transistor is turned off. In this case, there is a phase difference between the effective value phase of the voltage applied to the transformer primary winding and the phase of the current flowing through the transformer primary winding. As a result, the power factor is not favorable in this case.

In FIG. 34, G shows a case in which power is controlled at a limited duty ratio in the same way so that the effective value phase of the voltage across the transformer primary winding is in phase with the phase of the current flowing through the transformer primary winding, ignoring the zero current switching method. In this case, the power factor is actually favorable as seen from the transformer primary winding side and the heat generated in the step-up transformer is small. However, this is not the result of the use of the zero current switching method.

Here, a contradiction arises in the technical idea that the zero current switching method makes higher conversion efficiency of the inverter circuit. In the technical idea of the invention disclosed in U.S. Pat. No. 6,114,814-B1, zero current switching method is eliminated in the state shown in G, H of FIG. 34, for the reason that decreasing the conversion efficiency of the inverter circuit.

It should be noted that in E, F of FIG. 34 are explanatory diagrams illustrating a case in which zero current switching operation is tried in a state that a voltage effective value advances in phase with respect to a current effective value, and G, H of FIG. 34 are explanatory diagrams showing one exemplary control which is not zero current switching operation.

According to the comparative experiments conducted by the inventor of the present invention, however, the inverter circuits have clearly higher conversion efficiency by the control method of G, H of FIG. 34 than by the control method of C, D of FIG. 33.

Consequently, the theory that the zero current switching method makes the inverter circuit higher conversion efficiency is wrong.

The background against which such a misunderstanding has occurred is as follows.

Using the zero current switching method, particularly only when no power control is performed, there is necessarily no phase difference between the effective voltage phase and the current phase of the primary winding of the step-up transformer. Therefore, the power factor of the step-up transformer is improved; the current flowing through the transformer primary winding decreases; and the current flowing through the switching transistor also decreases to a minimum. As a result, the heat generated in the step-up transformer primary winding and the heat generated in the switching transistor decrease, thereby improving the conversion efficiency of the inverter circuit. This is taken, by mistake, that the zero current switching method brings high efficiency.

In the state shown as FIGS. 11A and 11B in U.S. Pat. No. 6,114,814-B1, in which no power control is performed, the operational state thereof is equivalent to the standard current-mode resonant operational state. Specifically, as a matter of fact it is not the zero current switching method but conventional current resonant type circuit that brings the inverter circuit high efficiency.

A current-mode resonant inverter circuit is known for lighting a hot cathode fluorescent lamp, and for example, the circuit shown in FIG. 35 is generally used. In such a current-mode resonant circuit, no dimmer function is provided in its basic circuit structure. Thus, when the light output is controlled in the current-mode resonant circuit, a DC-DC converter circuit is provided at a preceding stage thereof.

FIG. 36 is an explanatory dimmer circuit of an inverter circuit for a cold cathode fluorescent lamp which combines a conventional current-mode resonant circuit, a DC-DC converter circuit at a preceding stage thereof and the leakage flux transformer invented by the present inventor (same inventor of this invention). In this example, the DC-DC converter circuit comprises a transistor Qs, an inductance Lc, a diode Ds, and capacitor Cv.

A scheme of improving the current-mode resonant circuit itself for light control has also been proposed. FIG. 37 shows the dimmer circuit disclosed by the present inventor in Japanese Laid-Open Patent Publication No. Hei 08-288080 (same inventor of this invention), in which, in a prescribed period of time after timer circuits 10, 11 detect zero current, a frequency control circuit 12 turns off switching elements 2, 3. The timer circuits 10, 11, which are RS flip-flops, are set at zero current and reset after a prescribed period of time. In this scheme, light is controlled by the method in which after the switching method is turned on by detecting zero current, the switching method is turned off.

A similar scheme is disclosed in FIG. 9 in U.S. Pat. No. 6,114,814-B1. This scheme is illustrated in the circuit diagram shown in FIG. 38 of the present specification, in which an RS flip-flop 172 is set at zero current and reset after a prescribed period of time. Both in U.S. Pat. No. 6,114,814-B1 and in Japanese Laid-Open Patent Publication No. Hei 08-288080, zero current is detected so as to turn on the switching method and to set the RS flip-flop at the same time, followed by resetting after a prescribed period of time so as to turn off the switching method. Both provide a dimmer function to the switching method in the current-mode resonant circuit, characterized in that the current delays in phase with respect to the voltage effective value when controlling light. They are based on completely the same technical ideas and their achievement methods are almost the same.

According to what the present inventor himself knows, he has confirmed that, if light is controlled based on the invention disclosed in Japanese Laid-Open Patent Publication No. Hei 08-288080, when a cold cathode fluorescent lamp or hot cathode fluorescent lamp is controlled so as to be considerably dim, a larger current flows through the transistor of the switching method thereby generating heat.

In either case, since high efficiency in the inverter circuit is clearly due to the current-mode resonant type, the present inventor has disclosed the current-mode resonant inverter circuit for a discharge lamp as FIG. 39 in Japanese Patent Application No. 2004-318059 corresponding to U.S. patent application Ser. No. 11/261,492 (same inventor of this invention).

Recently, there is a demand in making an inverter circuit high-powered in order to drive multiple cold cathode fluorescent lamps, external electrode fluorescent lamps EEFL or the like in parallel, in a liquid crystal display backlight for television for example, a number of attempts have been made to drive the inverter circuit directly using the direct-current power (generally about 400V) obtained from commercial power through a PFC circuit (power factor control circuit) as method for making the inverter circuit high-powered and reducing the cost thereof.

However, the cold cathode fluorescent lamps used for a liquid crystal display backlight for television are mostly long and their steady discharge voltages often exceed 1600V. When trying to light the cold cathode fluorescent lamps, since a conventional current-mode resonant circuit is composed of a half-bridge circuit, it is difficult to drive the inverter circuit by direct commercial power so as to light the cold cathode fluorescent lamps.

Consequently, for example, in the examples disclosed in U.S. Pat. No. 6,181,079, the cold cathode fluorescent lamps are lighted in the current-mode resonant circuit by switching the high voltage obtained after being stepped up through the step-up transformer from the PFC circuit output.

In the conventional current-mode resonant circuit, the half-bridge type has been mainly used, which is known as a lighting device for a hot cathode lamp. FIG. 40 shows one example of the inverter circuit applied in order to light a cold cathode fluorescent lamp.

However, the half-bridge circuit is less efficient in using the power supply voltage. FIG. 41 is an explanatory diagram illustrating the efficiency at which the half-bridge circuit uses the supply voltage, showing the voltage supplied to the transformer primary winding. Specifically, the reference character Er represents the waveform of the voltage at the half-bridge output stage and its effective value voltage. The reference character Es represents a rectangular (square) wave half of the power supply voltage, which would be the same if converted into the alternating voltage effective value.

Next, when power is controlled by the zero current switching method disclosed in Japanese Laid-Open Patent Publication No. Sho 59-032370 so as to control a cold cathode fluorescent lamp, the power factor is not very favorable. Furthermore, since the half-bridge configuration cannot respond to low power supply voltage, it is difficult to take full advantage of the power factor improvement effect disclosed in Japanese Patent No. 2733817 (U.S. Pat. No. 5,495,405).

As driving methods for carrying out the technical subject matter described in Japanese Patent No. 2733817 (U.S. Pat. No. 5,495,405), a separately excited-type driving method is often employed with the fixed frequency oscillation circuit composed of a capacitor C and a resistor R as an oscillation circuit. In this case, however, there are sometimes fluctuations in parasitic (stray) capacitances caused by assembly methods for mass production, thereby causing deviations with the secondary side resonance frequency circuit of the step-up transformer. Alternatively, there are sometimes fluctuations in component values thereby causing the drive frequency of the drive circuit on the primary side to deviate. In such situations, constant driving at the optimum resonance frequency at which the power factor is improved is difficult.

If the resonance frequency of the secondary side circuit is shifted away from the drive frequency of the primary side circuit, the efficiency of the inverter circuit becomes extremely worse. Therefore, when using fixed-frequency separately-excited driving methods, the Q value of the secondary side resonant circuit is lowered so as to obtain broad resonance characteristics thereby responding to frequency deviation. For such a reason, it is difficult to raise the Q value of the secondary side resonant circuit in the fixed-frequency separately-excited driving methods.

When trying to drive the secondary side resonant circuit with a low Q value by a conventional current-mode resonant circuit, continuous oscillation becomes difficult. Therefore, consideration has to be given so as not to make the Q value too low when driving by the current-mode resonant type.

However, in a general step-up transformer for a cold cathode fluorescent lamp, the Q value of the secondary side resonant circuit is never set to high. Specifically, it is because the technical idea of setting the Q value to high is not known among those skilled in the art at the time of filing of the application of the present invention.

Consequently, in order to respond to a commercial step-up transformer for fixed-frequency drive, the value of the coupling capacitor Cc on the primary side is decreased so as to resonate with the leakage inductance of the step-up transformer on the primary winding side, thereby making the coupling capacitor Cc involved in the resonance to ensure continuous oscillation with stability. However, the measures involve problems that heat is generated easily in the step-up transformer.

Next, as a method for making the inverter circuit high-powered and reducing the cost thereof, consideration is given to problems in the attempt to drive the inverter circuit directly using the direct-current power (generally about 400V) obtained from commercial power through a PFC circuit (power factor control circuit). For example, in the example disclosed in U.S. Pat. No. 6,181,079, the step-up transformer is provided after the PFC circuit so as to obtain a direct current voltage higher than 400V followed by further stepping up the direct current voltage through a half-bridge switching circuit by driving a parallel loaded serial resonance circuit so as to light a cold cathode fluorescent lamp.

However, also in this case, the half-bridge circuit, which is less efficient in using power voltage, cannot light a cold cathode fluorescent lamp directly due to its high discharge voltage.

In order that such a cold cathode fluorescent lamp can be lighted directly at DC 400V, which is the PFC circuit output, the Q value of the parallel loaded serial resonant circuit has to be set to a high value so as to make the step-up ratio higher. Specifically, the following equation shows that a large value for the Q is required in order to light 1600V cold cathode fluorescent lamps in parallel.

$$Q = 1600V (400V/2) = 8$$

At least 8 to 10 is required for the Q value in order to light the cold cathode fluorescent lamps at DC 400V.

Consequently, there has been a demand of the current-mode resonant circuit system, which uses power voltage efficiently.

Also, in the power control method by the conventional zero current switching method, power factor becomes worse when power is controlled for the following reason. In the conventional zero current switching circuit shown in FIG. 38, the relation between the voltage and current given to the primary winding of step-up transformer is exemplarily shown in FIG. 42 and FIG. 43.

The voltage waveform rises by detecting the zero point of the current. The ON timing of the switching point is at zero current, but the OFF timing thereof is not at zero current.

The voltage waveform converted into the effective value is shown with a broken line. As can be seen from FIG. 42, the current delays in phase with respect to the voltage effective value. This means that the power factor is poor. With the zero current switching method, idle current (reactive current) increases when power is controlled, thereby increasing copper loss in the step-up transformer primary winding, so that the conversion efficiency of the inverter circuit becomes worse.

Next, a description is given for the function for the power factor decreases using the zero current switching method with reference to nomographs. When using the zero current switching method, power factor is poor particularly at a narrower (smaller) duty ratio as shown in FIG. 43. This is because the current is considerably delays in phase with respect to the voltage.

A description is given in further detail as follows.

FIG. 44 shows the relation between delay angle and duty ratio, as to how considerably the current waveform delays in phase with respect to the effective voltage waveform, which is a simple inverse proportional relation.

FIG. 44 calculates how the phase of effective voltage and the current phase change along with a change in duty ratio. It is shown, for example, when the duty ratio is 25%, the delay angle of the current with respect to the voltage is 67.5 deg. From FIG. 44, the phase delay of the current with respect to the voltage when the duty ratio is set at 25% can be obtained as about 67.5 deg.

As shown in FIG. 45, in the zero current switching circuit, the intersection of the frequency corresponding to the delay angle and the phase characteristic becomes the operational frequency of the inverter circuit. In the zero current switching circuit, therefore, the operational frequency deviation is unavoidable when power is controlled.

Next, consideration is given for power factor in FIG. 46 and FIG. 47.

In FIG. 46, if the load current converted on the primary side is set to a, the exciting current is represented by tan θ, and the current through the transformer primary winding is represented by 1/cos θ (reciprocal of power factor).

FIG. 47 is an explanatory diagram showing the relation among the load current converted on the transformer primary side, the exciting current, and the current through the transformer primary winding for considering power factor. FIG. 47 illustrates that a large delay angle allows a larger exciting current thereby increasing idle current.

In FIG. 47, the combined current ratio represents 1/cos θ (reciprocal of power factor). Taking the current delay in phase with respect to the voltage effective value as a current delay angle θ, the figure shows its relation with 1/cos θ (reciprocal of power factor). How much large current flows through the transformer primary winding than load current is considered in FIG. 47 as follows. If the current delays by 67.5 deg. in phase with respect to the voltage effective value, the current flows through the transformer primary winding is 2.61-times larger than in a case in which there is no delay. Consequently, the power factor becomes extremely worse, and more heat is generated in the transformer primary winding due to increase in copper loss. Also, for the same reason, more heat is generated in the transistor of the switching method.

Specifically, when power is controlled using the zero current switching method, if using the duty ratio control method disclosed in each of U.S. Pat. No. 6,114,814-B1, Japanese Laid-Open Patent Publication No. Hei 08-288080 and Japanese Laid-Open Patent Publication No. Sho 59-032370 for power control, the following conclusion is obtained from a viewpoint of improving power factor.

In a state that the duty ratio is large, specifically, in a state that the current slightly delays in phase with respect to the voltage effective value, the conversion efficiency of the inverter circuit is favorable. However, when the duty ratio is small, the current delays considerably in phase and consequently, the power factor becomes worse, and a larger current flowing through the transformer primary winding makes the inverter circuit conversion efficiency worse. Particularly, as the duty ratio becomes smaller thereby delaying the current in phase closer to 90 deg., idle current increases rapidly thereby making the efficiency significantly worse.

Specifically, in such a state, when the zero current switching method is applied to a laptop personal computer, if an AC adapter, the supply voltage becomes the largest. Under these conditions, when power is restricted so as to make a liquid crystal display panel darker or the like, the current delays longest in phase. In this case, significant heat is generated in the inverter circuit in practice.

Furthermore, there is also a problem that the operational frequency deviation of the inverter circuit is unavoidable when current is controlled by the zero current switching method.

What is clear is that the technical idea of the zero current switching is not always necessary in order to configure the high-efficiency inverter circuit in a state that power is controlled. On the contrary, the idea is damaging. In order to configure an inverter circuit with good conversion efficiency, the above technical idea has to be eliminated and a method in which the power factor becomes best in the step-up transformer primary winding has to be applied.

SUMMARY OF THE INVENTION

In order to achieve the above objectives, the present invention is to provide a high-efficiency inverter circuit by providing the current-mode resonant type which brings high conversion efficiency in using power, reflecting the technical subject matter in Japanese Patent No. 2733817 (U.S. Pat. No. 5,495,405).

Also, the present invention is to provide an inverter circuit that has high conversion efficiency in using the supply voltage for lighting a cold cathode fluorescent lamp by a parallel loaded serial resonance circuit.

Also, even when power is restricted, the present invention, without damaging the power factor improvement effect, is to provide a high conversion efficiency inverter circuit which reflects the technical subject matter in Japanese Patent No. 2733817 (U.S. Pat. No. 5,495,405). Specifically, power is controlled without making the power factor worse by a method that causes the transformer primary side, the voltage and the current to be in phase when controlling power.

Specifically, inverter circuits that have high conversion efficiency in using supply voltage is provided with a switched-snubber circuit as switching means for a current-mode resonant inverter circuit.

Also, current detecting means of the current-mode resonant inverter circuit detects the current flowing through the resonance capacitor of the resonant circuit or the current flowing through the secondary winding of the transformer so that the inverter circuit responds to a high Q value and that the inverter circuit also responds to a low Q value stably.

Also, when power is controlled, the phase difference between the phase of the drive voltage effective value as seen from the step-up transformer primary winding side and the phase of the flowing current is narrowed so as to perform driving with a good power factor.

Also, the inverter circuit is composed by a pair of circuits, i.e., a master circuit and a sub circuit, so that a discharge lamp requiring high voltage for lighting is lighted easily by double-side high voltage driving.

BRIEF DESCRIPTION OF THE DRAWINGS

FIG. 29 is an explanatory diagram showing one example of a transformer, used in a conventional triple resonance, in which flux leakage is larger although a magnetic circuit structure is closed;

DESCRIPTION OF THE PREFERRED EMBODIMENTS

Figure 1:
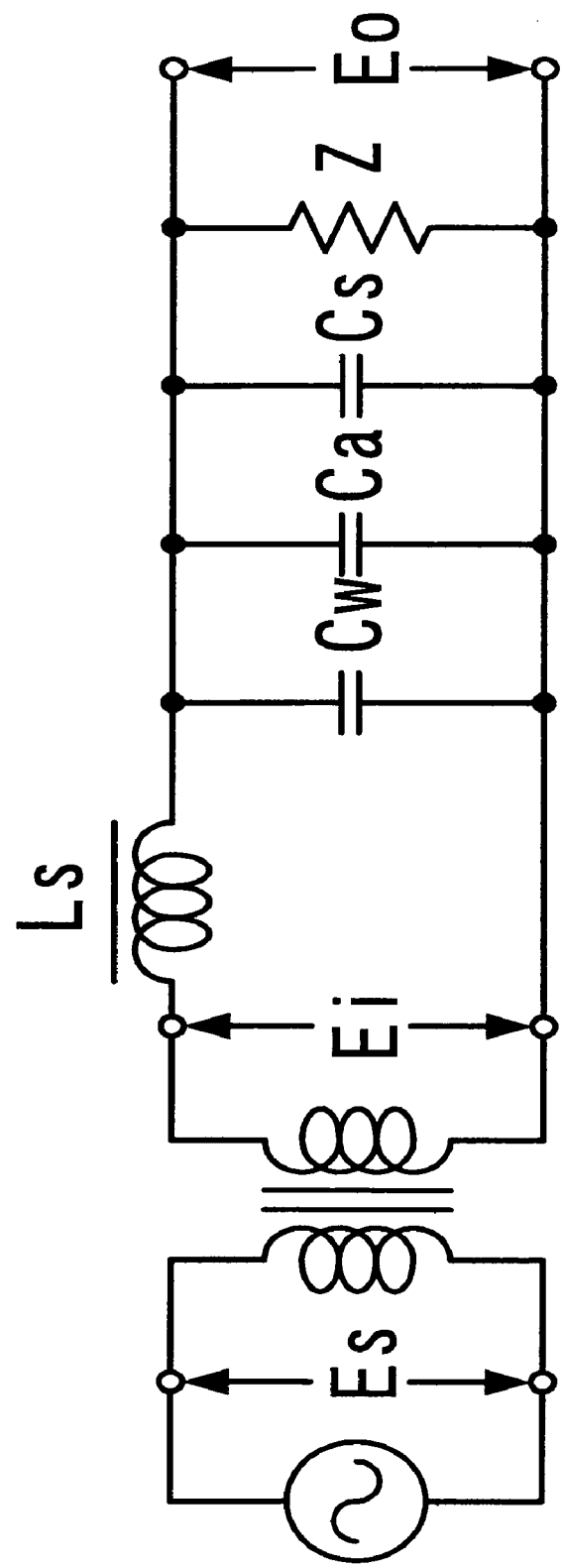
FIG. 1 is an explanatory diagram showing an equivalent circuit of a resonant circuit according to the present invention.

First, the resonant circuit of the present invention may be configured as the one shown in FIG. 1, or may utilize a step-up transformer in which the leakage inductance is replaced with a choking coil. In FIG. 1, capacitive components Cw, Ca and Cs in the secondary side circuit in combination make up the resonance capacitance, and compose the secondary side resonant circuit of the step-up transformer together with the leakage inductance Ls. In this case, the reference character Z denotes the impedance of a discharge lamp. In this case, the step-up transformer operates according to the equation Ei=Es.k.N2/N1, in which k means coupling coefficient, and N1, N2 mean the number of turns of the transformer primary and secondary windings.

The oscillation frequency of the inverter circuit is determined by the resonance frequency of the secondary circuit. The resonance frequency is set to fr:

$$f_r = \frac{1}{2\pi\sqrt{L_s \cdot (C_W + C_a + C_s)}}$$

The oscillation frequency of the current-mode resonant circuit in the present invention becomes the above frequency or a frequency slightly lower by the work of a parallel loaded serial resonance circuit.

Conventionally, taking the secondary side circuit when being driven by fixed-frequency separately-excited means in the example of a 14-inch-sized laptop personal computer, the impedance Z of the discharge lamp is about 100 kΩ, and the operational frequency of the inverter circuit is about 60 kHz. Under these exemplary conditions, the appropriate value of the leakage inductance Ls is 240 mH to 280 mH and the appropriate value of the secondary side capacitance is 25 pF to 30 pF.

Although these parameter changes as appropriate depending on the size, system or the like of a liquid crystal display backlight or surface light source, the above equation is applicable without changes.

Figure 2:
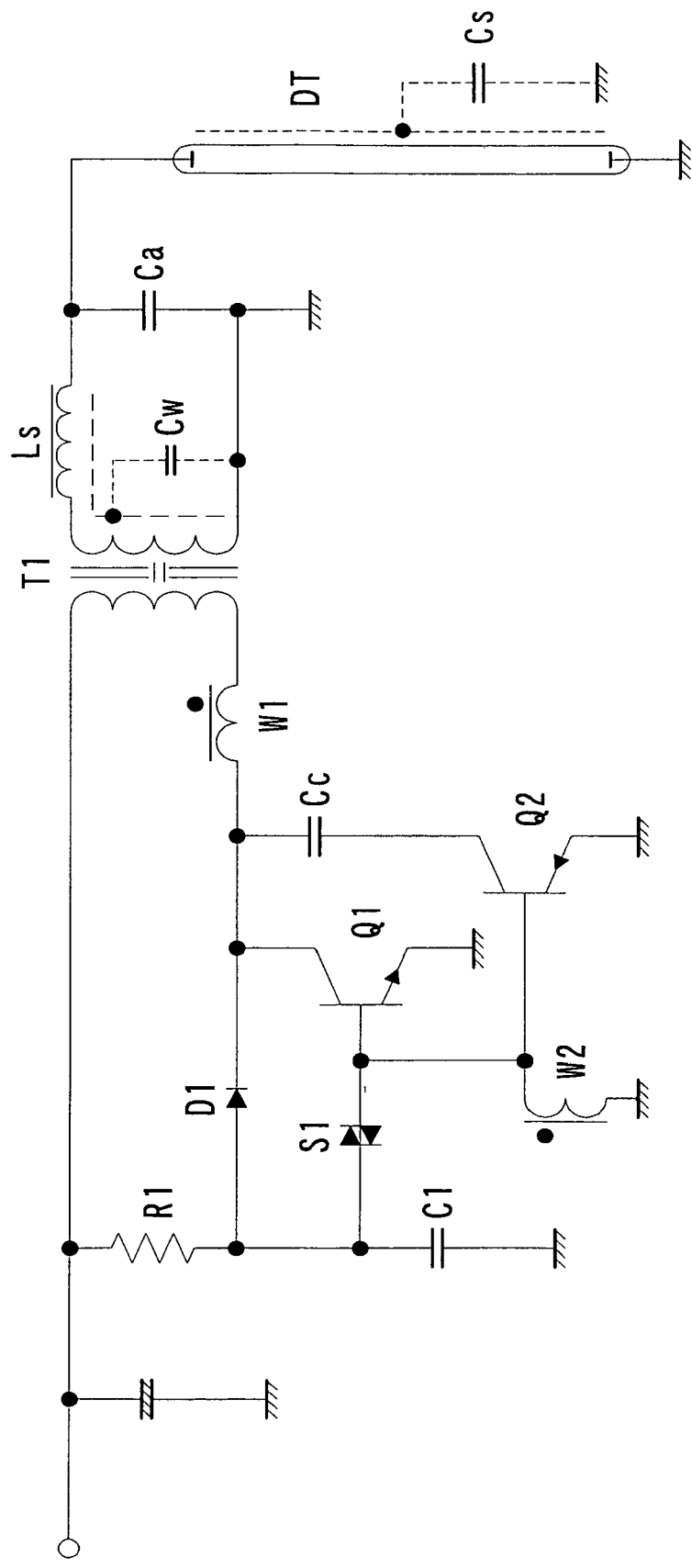
FIG. 2 is a circuit structural diagram showing one embodiment of a current-mode resonant circuit according to the present invention in which a drive circuit is composed of a switched-snubber circuit.

FIG. 2 is one embodiment of a current-mode resonant circuit in which a drive circuit is composed of a switched-snubber circuit. A transformer T1 is a leakage flux-type step-up transformer which has a leakage inductance value for Ls; Cw is the distributed capacitance of the transformer secondary winding; Ca is the capacitance of the capacitive component connected as appropriate for adjusting resonance frequency; and Cs is parasitic (stray) capacitance around a cold cathode fluorescent lamp. The inductance Ls of the transformer T1 and the combined capacitance of Cw, Ca and Cs, which are capacitive components present in the secondary side circuit, compose a resonant circuit (parallel loaded serial resonance circuit) of the secondary side circuit. Transistors Q1, Q2 and a coupling capacitor Cc compose the switched-snubber circuit. The switched-snubber circuit includes a pair of the transistors Q1, Q2 different from each other in polarity. The transistor Q2 is connected to a collector of the transistor Q1 through the coupling capacitor Cc. Windings W1, W2 compose a current transformer, and W1 corresponds to the primary winding, W2 to the secondary windings.

This enables the bases of the transistors Q1, Q2 to be connected to each other for driving and the secondary winding W2 of the current transformer to drive the switched-snubber circuit alone, thereby achieving a current-mode resonant inverter circuit for a discharge lamp with simple configuration.

Figure 3:
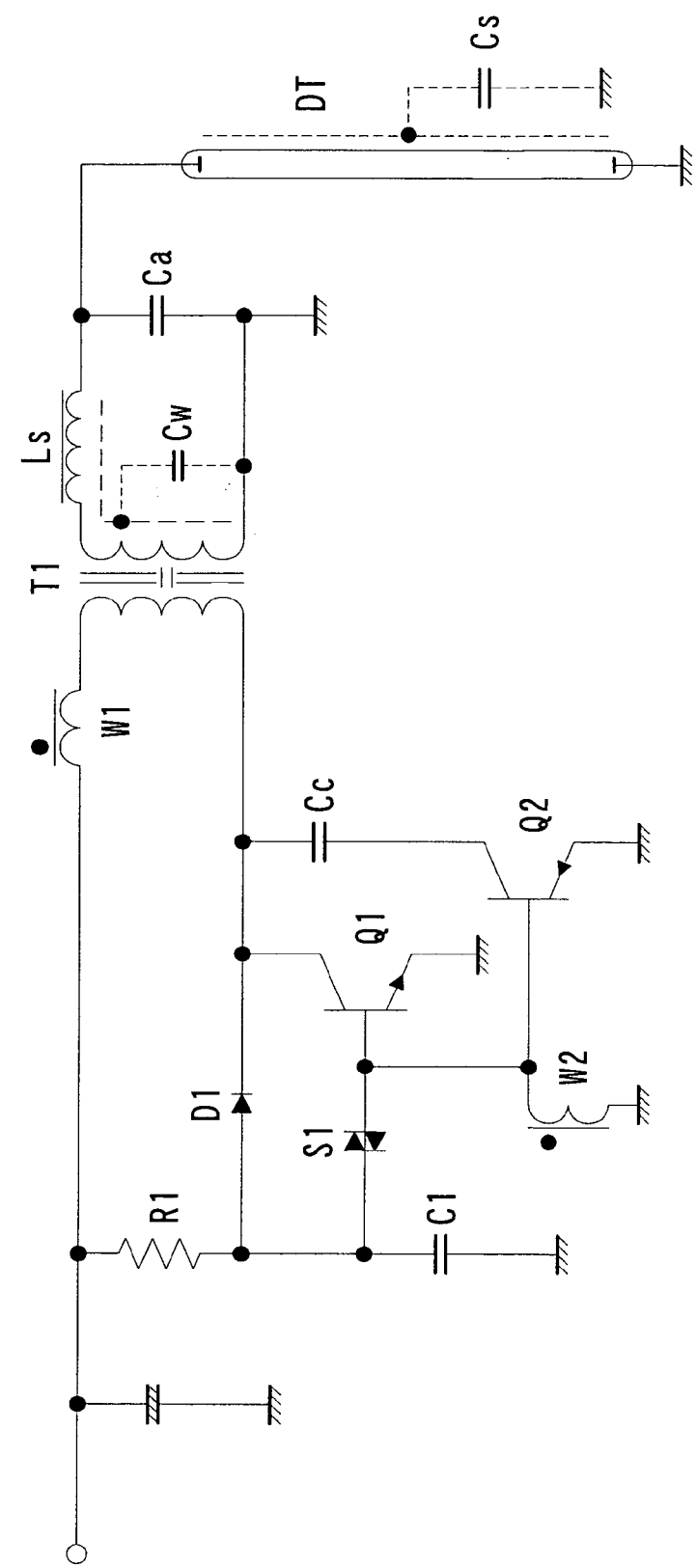
FIG. 3 is a circuit structural diagram showing another embodiment of the current-mode resonant circuit according to the present invention in which the drive circuit is composed of the switched-snubber circuit.

Also, as shown in FIG. 3, the current transformer is not limited to being inserted between the transformer T1 and the switched-snubber circuit. Even if the current transformer lies between the power source and the step-up transformer T1, as a result of repositioning the primary winding W1, its operation is the same.

It should be noted that, since this circuit is basically a current-mode resonant circuit, oscillation does not start in the inverter circuit without starting means. A start circuit, composed of a resistor R1, a capacitance C1, a diode D1 and a thyristor S1, is common in a current-mode resonant circuit. Regarding the operation of the start circuit, when the power source is turned on so as to charge the capacitance C1 through the resistor R1, exceeding the breakdown voltage of the thyristor S1, current flows through the base of the transistor Q1 from the capacitance C1 so as to start the transistor Q1. After starting the transistor Q1, the voltage of the capacitance C1 is discharged through the diode D1, and the start circuit then stops working.

Also, the switching means is not limited to bipolar transistors. The bipolar transistors may be replaced with field-effect transistors FET or integrated bipolar transistors IGBT without changing the mode of operation thereof. Furthermore, even if the current transformer is replaced with another current detecting means and an amplifier circuit, the mode of operation remains the same.

Figure 4:
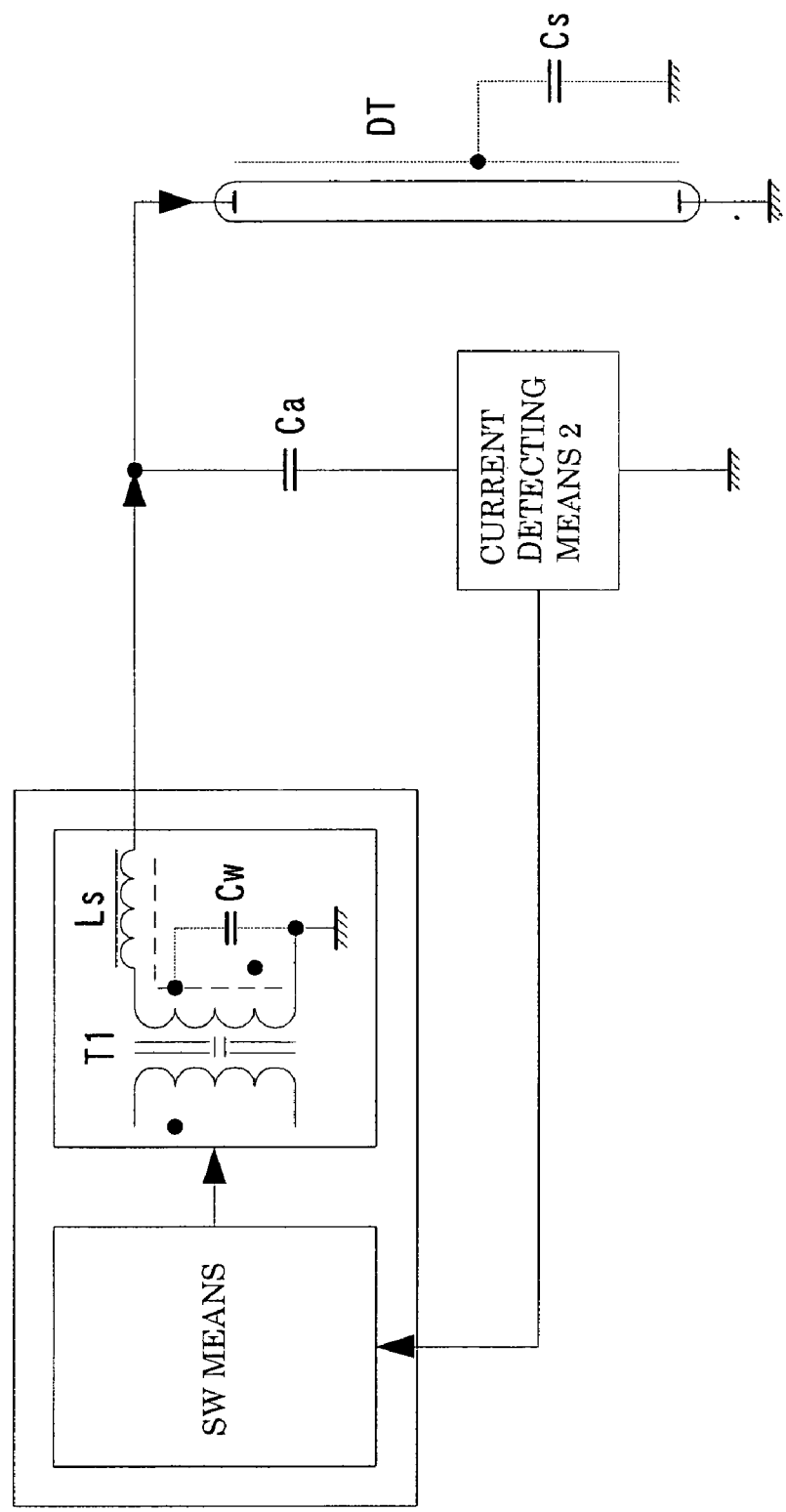
FIG. 4 is a circuit structural diagram showing another embodiment of the current-mode resonant circuit according to the present invention.

FIG. 4 is one example in which the current detecting means of the current-mode resonant circuit is implemented on the secondary side of the step-up transformer. In this example, the ground GND side of an auxiliary resonance capacitor Ca to be added to the secondary side circuit as appropriate is connected through the current detecting method so that the voltage generated in the current detecting method is used for switching the switching method. An exemplary current detecting means may be a resistor, and also a current transformer or current detecting element with an amplifier circuit, their operation and effect being essentially the same.

Figure 5:
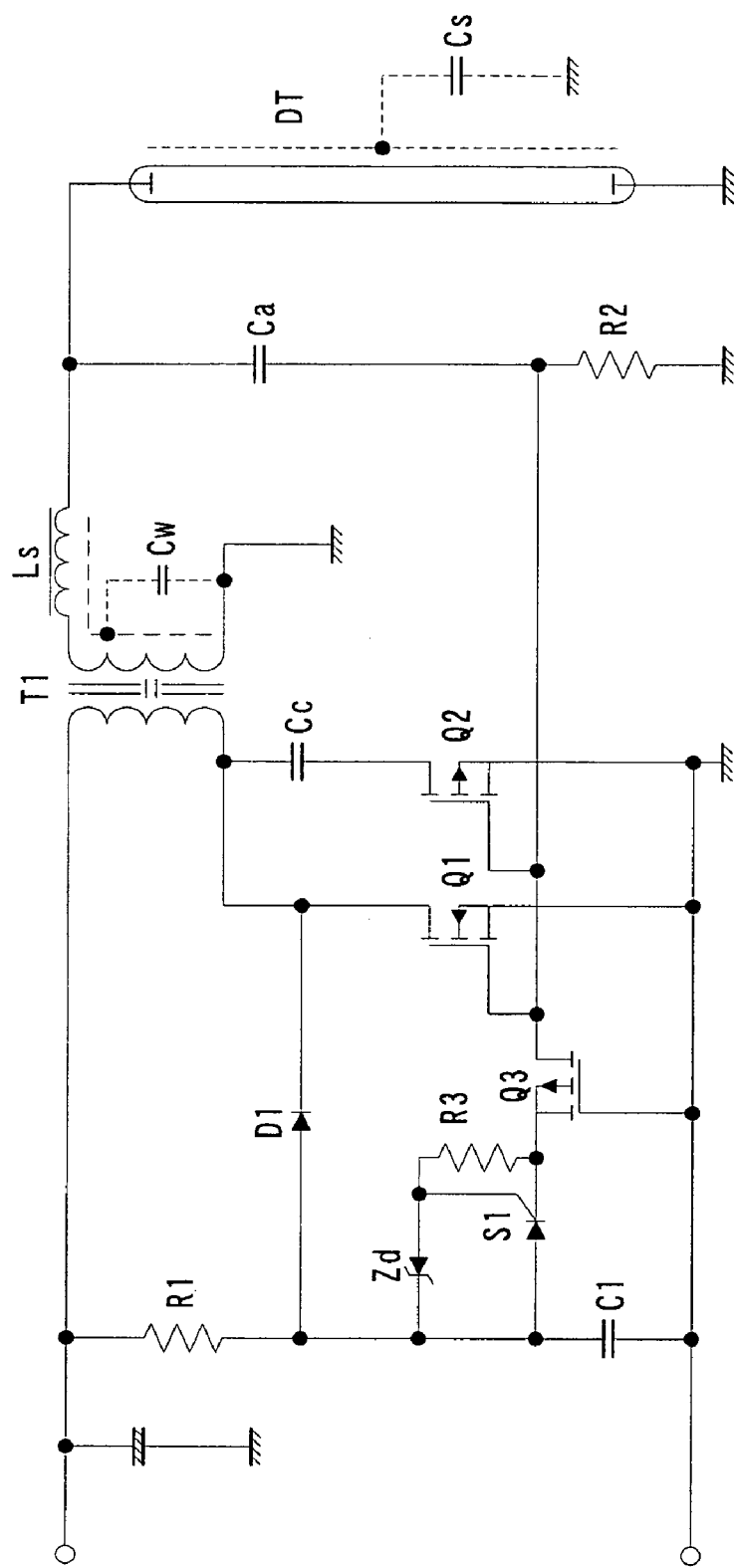
FIG. 5 is a circuit structural diagram showing further another embodiment of the current-mode resonant circuit according to the present invention in which the drive circuit is composed of the switched-snubber circuit.

FIG. 5 shows a case in which the circuit shown in FIG. 4 specifically comprises the switched-snubber circuit. The resonance current flowing through the resonance capacitor Ca is detected by current detecting means R2, and the transistors Q1, Q2 as a switching element are switched by the voltage thereof. The resonance current flows not only through the resonance capacitor Ca but also the capacitances Cw and Cs. Since the capacitive components are equivalently connected to the resonance capacitor Ca in parallel, the current flowing through the resonance capacitor Ca and the resonance current flowing through all the capacitive components are in phase. Therefore, detecting the current flowing through the resonance capacitor Ca allows the phase of the resonance current to be detected accurately.

In this case, although the start circuit may have any configuration in order to achieve the objectives, the starting circuit in the example of FIG. 5 is composed of a Zener diode ZD and a thyristor S1 so as to start at a low voltage. The reference character Q3 denotes a grounded-gate switch, which interrupts the start circuit working when negative voltage is generated in the resistor R2 so as to turn on the transistor Q2 as a switching element.

Figure 6:
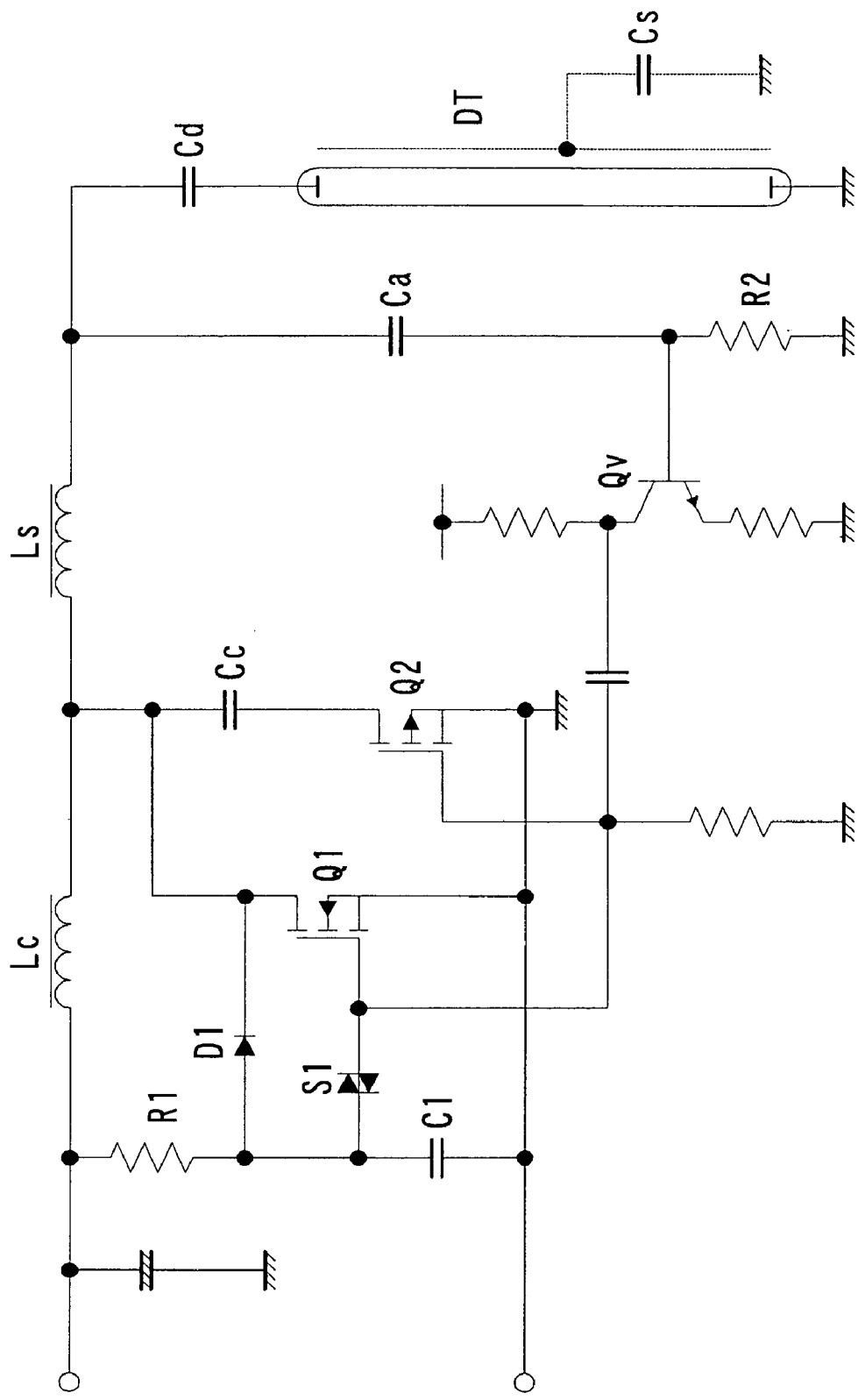
FIG. 6 is a circuit structural diagram showing a different embodiment of the current-mode resonant circuit according to the present invention in which the drive circuit is composed of the switched-snubber circuit.

FIG. 6 shows a case in which the step-up transformer T1 is replaced with choking (choke) coil Lc and Ls. In this example, since the output phase of the inverter circuit is not reversed, the phase is reversed by a transistor Qv.

Figure 7:
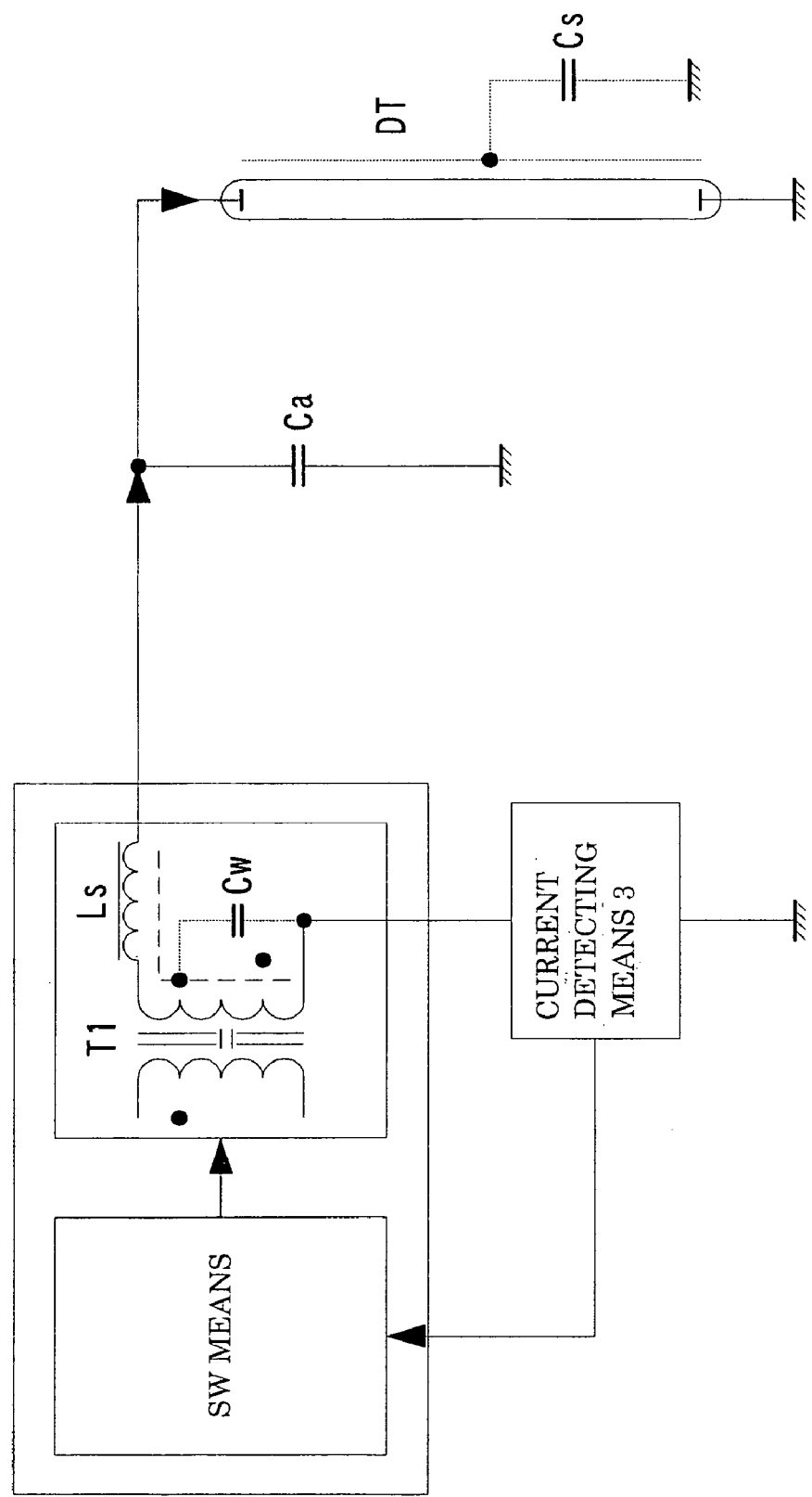
FIG. 7 is a circuit structural diagram showing further another embodiment of the current-mode resonant circuit according to the present invention.

Next, FIG. 7 shows another example of the current detecting means being implemented on the secondary side of the step-up transformer. Specifically, the current detecting method shown in FIG. 7 detects the current flowing through the secondary winding of the step-up transformer, and the switching timing of the switching means is determined by its detection signal.

Figure 8:
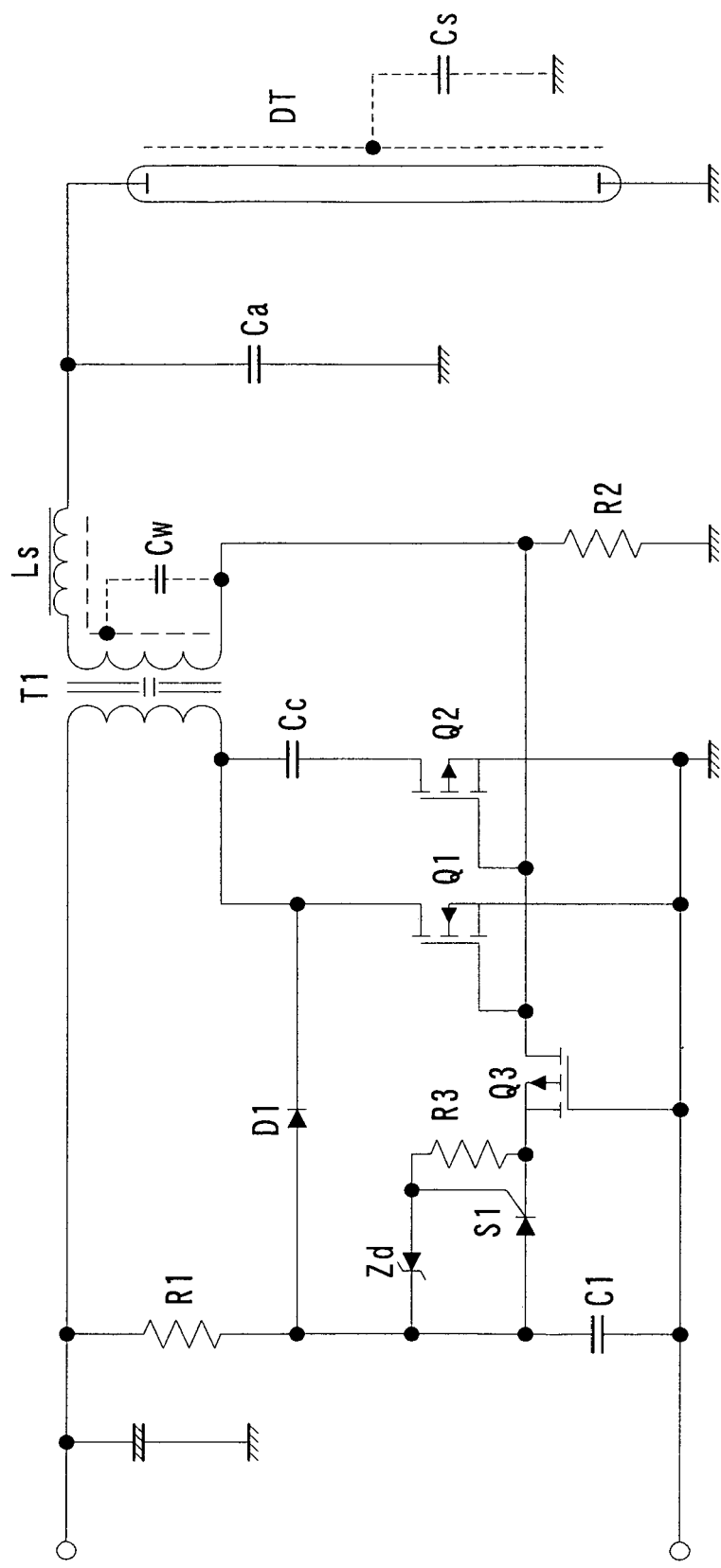
FIG. 8 is a circuit structural diagram showing still another embodiment of the current-mode resonant circuit according to the present invention in which the drive circuit is composed of the switched-snubber circuit.

FIG. 8 shows a case in which the circuit of FIG. 7 specifically comprises the switched-snubber circuit.

In this case, the switched-snubber circuit can control power by controlling the duty ratio of an N-channel (or NPN) transistor.

Figure 9:
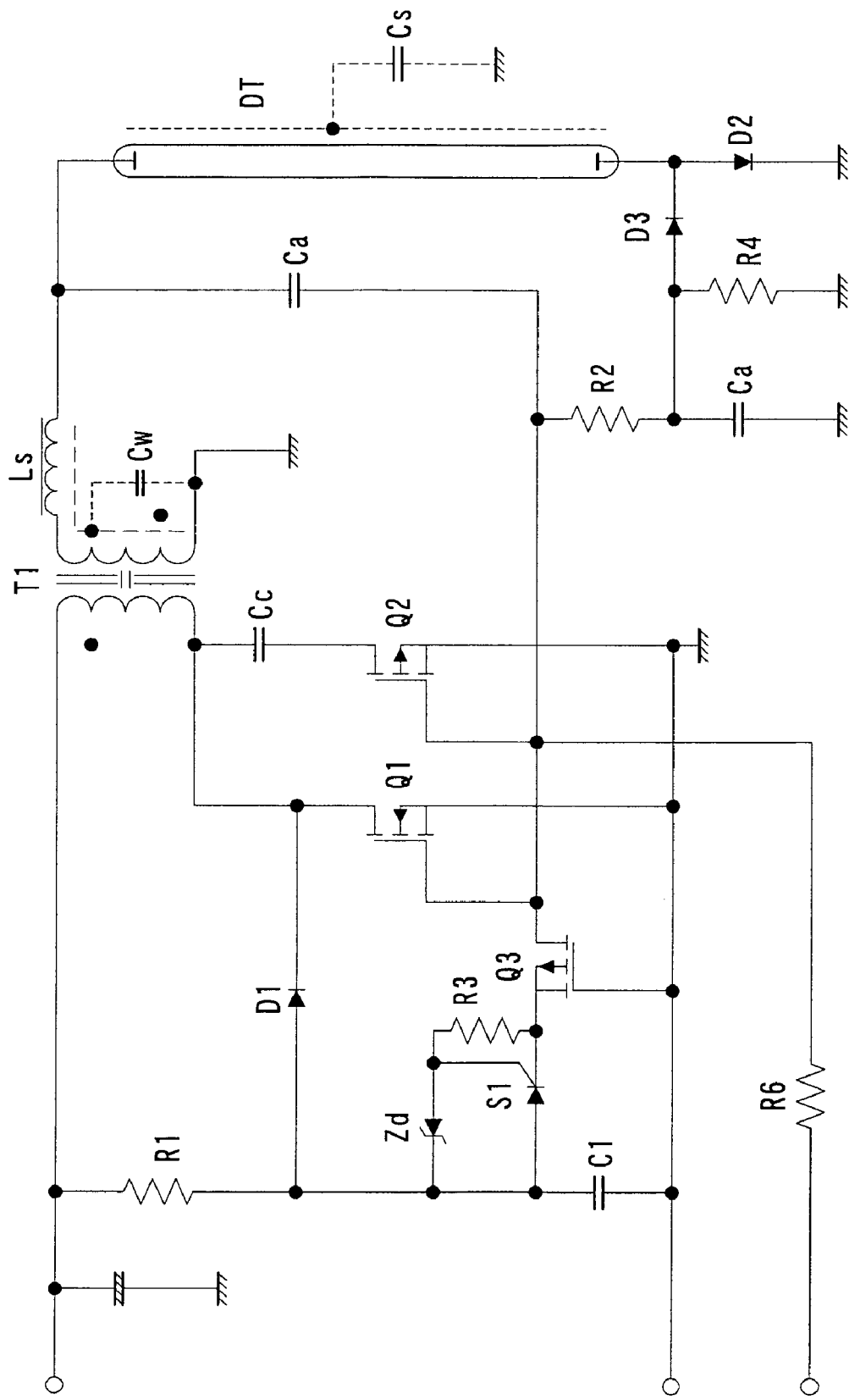
FIG. 9 is a circuit structural diagram showing yet another embodiment of the current-mode resonant circuit according to the present invention in which the drive circuit is composed of the switched-snubber circuit.

Consequently, a rectifier circuit for detecting the lamp current through the cold cathode fluorescent lamp, which is composed of diodes D2, D3 and a resistor R4 as shown in FIG. 9, is configured so that a negative potential is generated in the resistor R4 as the cold cathode fluorescent lamp current increases. The potential is fed back to the gate of the switched-snubber circuit so as to configure a lamp current feedback circuit.

Also, a direct current potential is given to the lamp current feedback circuit through a resistor R6 so as to configure a dimmer circuit.

This configuration is the simplest for an inverter circuit for a cold cathode fluorescent lamp with lamp current control function, and in spite of such a simple configuration, a high-performance inverter circuit can be achieved.

In this case, the leakage inductance Ls of the step-up transformer (or, alternatively, Ls of a choking (choke) coil) for series resonance is set at a small value and the resonance capacitor Ca is set at a relatively larger value so that a resonant circuit with a larger value for Q can be configured. As a result, the step-up ratio can be higher and the even number-order harmonic leaking in the secondary side circuit can be smaller, thereby making the lamp current waveform closer to a sine wave.

Figure 10:
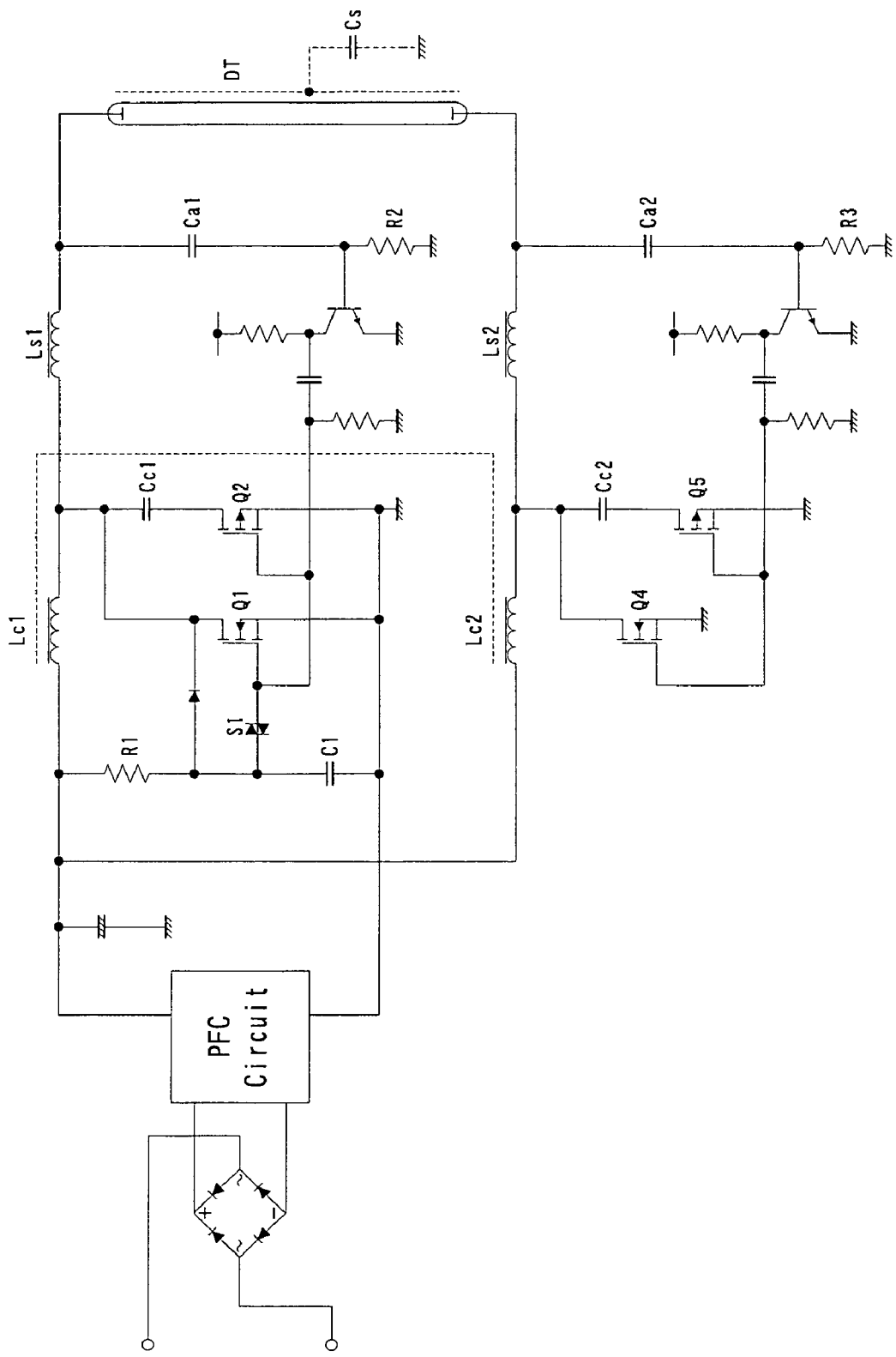
FIG. 10 is a circuit structural diagram showing a different embodiment of the current-mode resonant circuit according to the present invention in which the drive circuit is composed of the switched-snubber circuit, wherein a cold cathode fluorescent lamp can be driven easily in the double-side high voltage driving system.

Next, FIG. 10 shows a case in which, with the current-mode resonant inverter circuit which has been described thus far as a main inverter circuit, is paired with a sub inverter circuit so as to oscillate the sub inverter circuit with the main inverter circuit synchronously. Such a configuration can easily drive the cold cathode fluorescent lamp in the double-side high voltage driving system.

Since the current-mode resonant circuit starts the oscillation circuit by the current flowing through a load, it is enough for the start circuit to be provided at either side. When the inverter circuit in the main circuit starts, the inverter circuit in the sub circuit is automatically started.

The above circuit may be composed of a common current-mode resonant circuit, and also can be composed of a zero current detection-type self-excited oscillation circuit (zero current switching type) as an improved current-mode resonant circuit.

(Operation)

First, a description is hereinafter given in generalities as to why the current-mode resonant driving means makes the inverter circuit to have high conversion efficiency.

Figure 11:
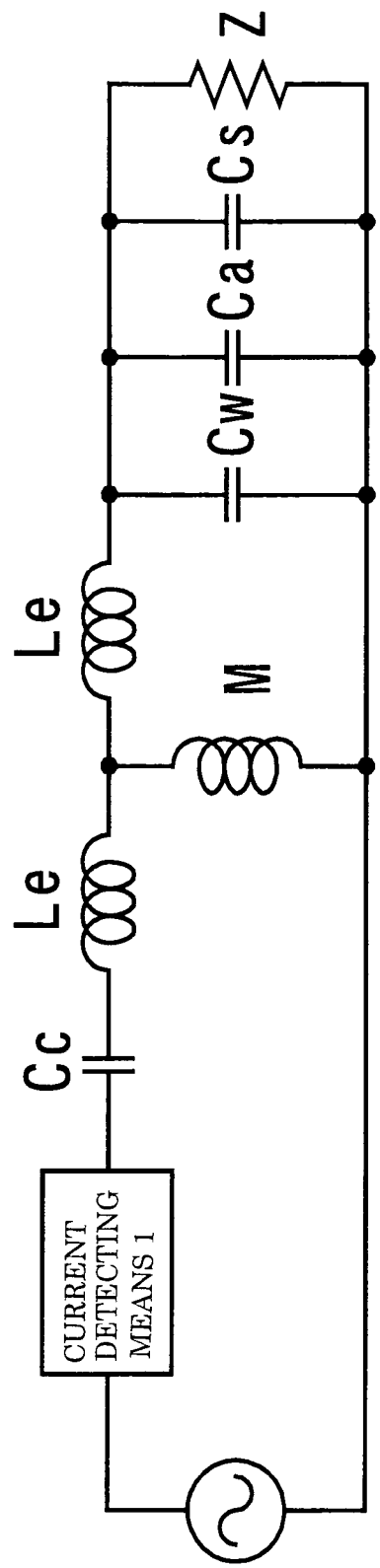
FIG. 11 is an explanatory diagram illustrating an equivalent circuit to the secondary side resonant circuit including up to the primary drive circuit of a step-up transformer in a conventional art.

FIG. 11, showing the relation between the step-up transformer and the cold cathode fluorescent lamp as a load in the inverter circuit for a cold cathode fluorescent lamp in a conventional current-mode resonant circuit, is an explanatory diagram illustrating an equivalent circuit of the secondary side resonant circuit including up to the primary drive circuit of the step-up transformer. In this equivalent circuit, the step-up transformer is shown as a three-terminal equivalent circuit.

U.S. Pat. No. 6,114,814-B1, No. 6,633,138, and No. 6,259,615, and Japanese Laid-Open Patent Publication No. 2002-233158 refer to the circuit as a "tank circuit", while Japanese Laid-Open Patent Publication No. Sho 59-032370, Japanese Patent No. 2733817 (U.S. Pat. No. 5,495,405) by the present inventor and Japanese Laid-Open Patent Publication No. 2003-168585 refer to it as "resonant circuit". However, both mean the same. In this case, the current detecting method is provided on the primary side of the step-up transformer.

In FIG. 11, the reference capacitor Cc denotes a coupling capacitor on the primary side, which is inserted as required in order to cut off direct current in the conventional current-mode resonant circuit, or alternatively, in order to cut off the direct current component caused by unbalanced switching when the driving methods is an H-Bridge circuit. In general, it is better for the inverter circuit for a cold cathode fluorescent lamp not to be involved in resonance by giving a large enough value. It should be noted that, if the coupling capacitor Cc is involved in resonance, more heat is generated in the inverter circuit thereby decreasing the conversion efficiency.

The reference inductance Le denotes the leakage inductance (called by The Institute of Electrical Engineers of Japan, concerned academic societies) of the transformer, which is distinguished from the leakage inductance (JIS) Ls based on the JIS measurement method. The M denotes the mutual inductance of the transformer. The Cw denotes the distributed capacitance of the transformer secondary windings, Ca the resonance capacitance added as required for adjusting resonance frequency, Cs the parasitic capacitance around the discharge lamp, which in combination compose the resonance capacitance on the secondary side. Z denotes the impedance of the discharge lamp (in this case, cold cathode fluorescent lamp).

For reference, if the self-inductance of the transformer winding is set to $L_0$, and coupling coefficient to k, there is the following relations between the values:

$$Le = k \cdot Lo$$

$$M = (1-k) \cdot Lo$$

$$L_s = L_e + \frac{1}{\frac{1}{L_e} + \frac{1}{M}}$$

It should be noted that, in a common current-mode resonant circuit, the resonance current detecting means, which is provided on the transformer primary side, detect the current input on the transformer primary side.

Figure 12:
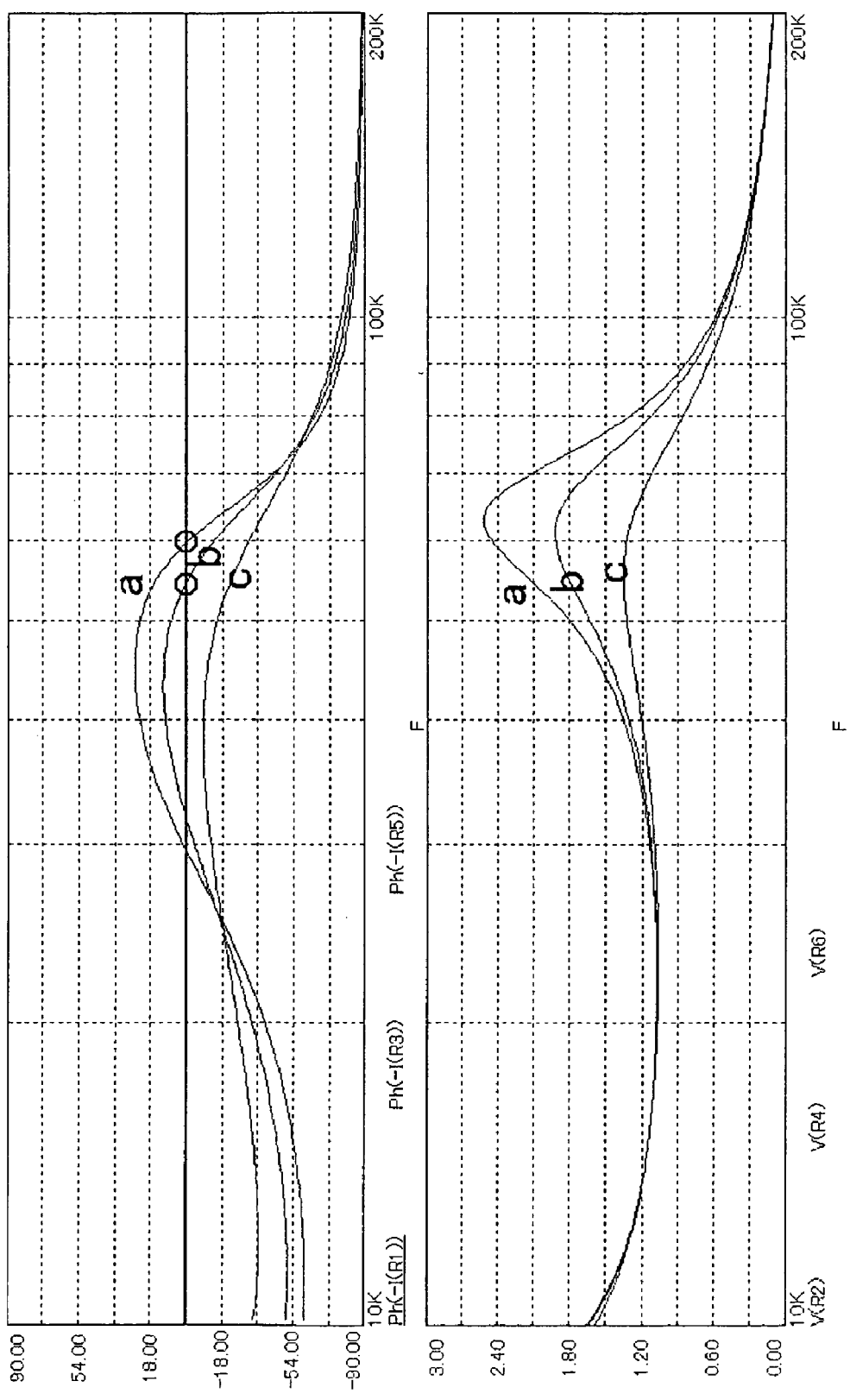
FIG. 12 shows explanatory diagrams illustrating phase characteristic (upper portion) and transfer characteristic (lower portion) when a simulation is performed by the equivalent circuit shown in FIG. 11, wherein the horizontal axis denotes frequency.

The circuit simulation using the equivalent circuit has obtained the following result. Specifically, as a result of a simulation performed on the equivalent circuit, the explanatory diagrams in FIG. 12 show phase characteristic (upper portion) and transfer characteristic (lower portion), each horizontal axis denoting the drive frequency of the inverter circuit. FIG. 12 (upper portion) shows the phase relation between the voltage and current as seen from the transformer primary side. FIG. 12 (lower portion) shows the voltage applied to the impedance Z of the discharge lamp. In FIG. 12, the discharge lamp impedance Z changes in three levels: "a" denotes high impedance; "b" middle impedance; and "c" low impedance.

The resonant circuit on the secondary side for driving a cold cathode fluorescent lamp, which is referred to as "parallel loaded serial resonance circuit" performs step-up operation depending on loads. In this case, in FIG. 12 (upper portion), at a frequency where the lines of phase characteristic and zero degrees cross each other, the drive frequency of the inverter circuit is determined. A detail description thereof is given below.

Considering the phase characteristic when the discharge lamp impedance Z changes from high, middle to low, as the discharge lamp impedance becomes lower compared with the impedance of the resonant circuit, as shown in FIG. 12 (upper portion), the current detected by the current detecting means 1 shown in FIG. 11 delays in phase with respect to the resonance current, and the oscillation frequency of the inverter circuit oscillates at a frequency lower than the resonance frequency of the resonant circuit.

When the impedance is low, there is no frequency which crosses the zero degree line. This means, in a conventional current-mode resonant inverter circuit, if the discharge lamp impedance Z becomes lower than a certain limit, continuous oscillation becomes impossible. This is known as the so-called "runaway effect" in the zero current switching-type drive circuit, which is regarded as a defect of the zero current switching type driving methods. Here, the case in which the discharge lamp impedance is low means, specifically means that the Q value is low in the resonance circuit in the equivalent circuit shown in FIG. 11.

Specifically, as shown in the phase characteristic in FIG. 12 (upper portion), the current-mode resonant circuit oscillates by automatically searching for the frequency at which there is no phase difference between the effective voltage phase on the step-up transformer primary side and the current phase in the oscillation frequency of the inverter circuit. Specifically, the current-mode resonant circuit operates by selecting the frequency at which power factor is favorable. As a result, since almost no exciting current flows on the step-up transformer primary winding side, copper loss in the step-up transformer primary winding decreases, thereby improving the conversion efficiency of the inverter circuit.

Figure 13:
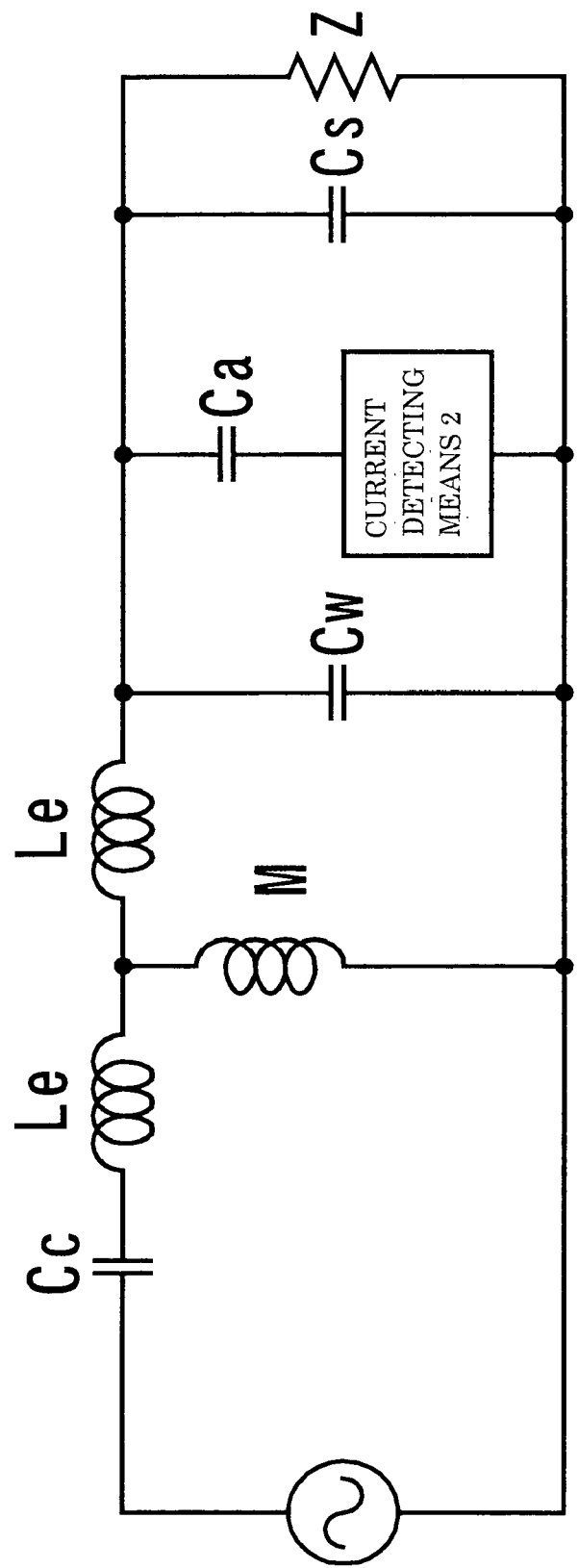
FIG. 13 is an explanatory diagram showing a circuit equivalent to the circuit shown in FIG. 4.

Thus, the operation by driving the parallel loaded serial resonance circuit by the conventional current-mode resonant circuit has been described. Next, a description is given for the operation of the current-mode resonant circuit in the present invention. FIG. 13 shows a case in which the circuit shown in FIG. 4 is replaced with an equivalent circuit. A circuit simulation performed based on this circuit shows the following result.

Figure 14:
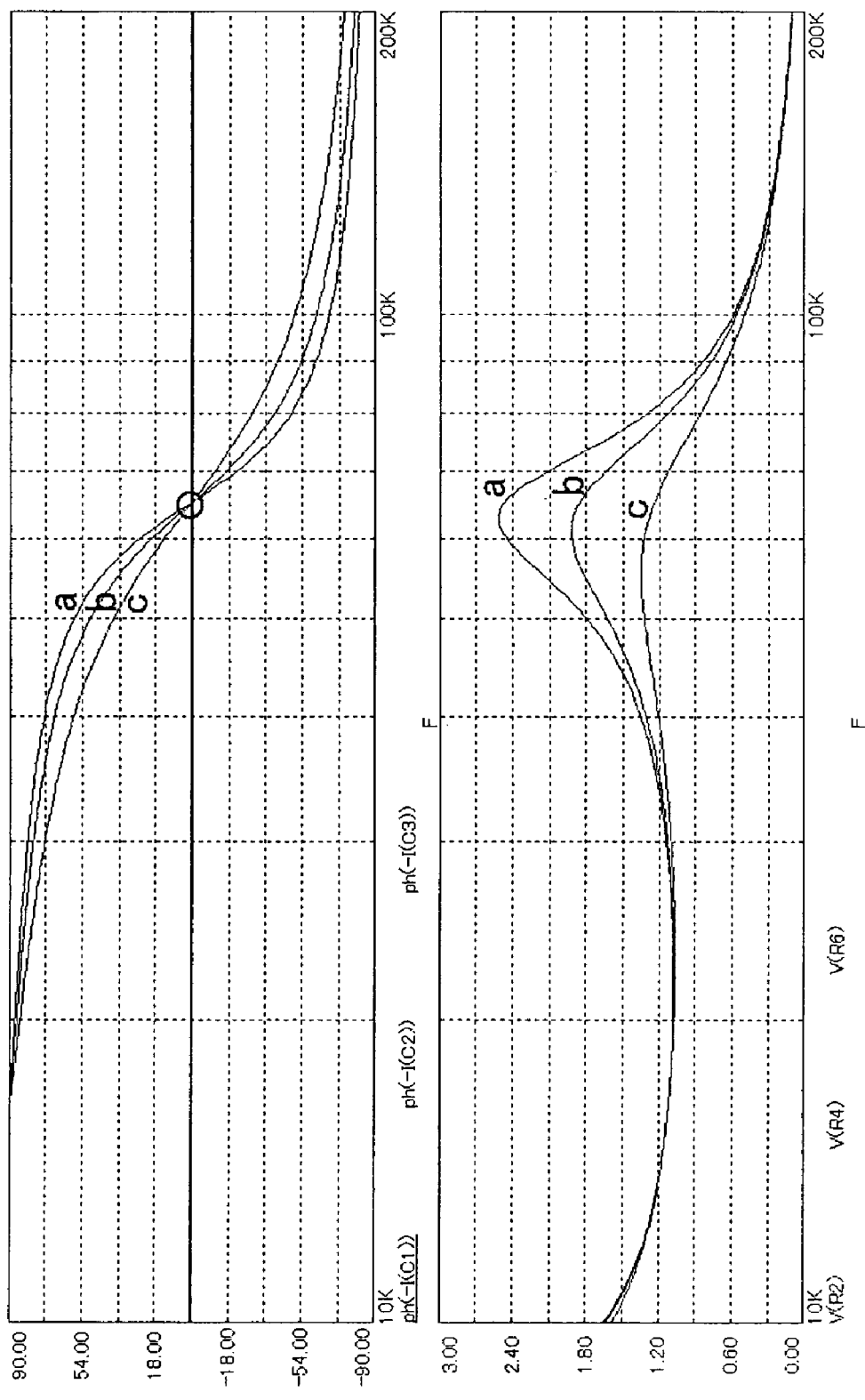
FIG. 14 shows explanatory diagrams illustrating phase characteristic (upper portion) and transfer characteristic (lower portion) when a simulation is performed by the equivalent circuit shown in FIG. 13, wherein the horizontal axis denotes frequency.

In FIG. 14 (upper portion) and FIG. 14 (lower portion), the horizontal axis denotes frequency. FIG. 14 (upper portion) shows phase characteristic, and FIG. 14 (lower portion) transfer characteristic. The reference characters "a" denotes that the cold cathode fluorescent lamp impedance is high; "b" middle impedance; and "c" low impedance.

The current-mode resonant circuit of the present invention determines the timing for switching the switching means by detecting the current flowing through the resonance capacitor Ca. Therefore, in FIG. 14 (upper portion), at a frequency at which phase characteristics a, b and c cross the zero degree line, the operational frequency of the inverter circuit is determined.

Also, in any of the cases in which the load impedance is high, middle or low, the operational frequency of the inverter circuit does not change characteristically.

Furthermore, different from the conventional current-mode resonant circuit, even when the load impedance is low and the Q value of the resonant circuit is low, continuous oscillation is possible in the inverter circuit without the runaway effect. Therefore, stable operation is possible in a wide load range from low load impedance up to high.

Figure 15:
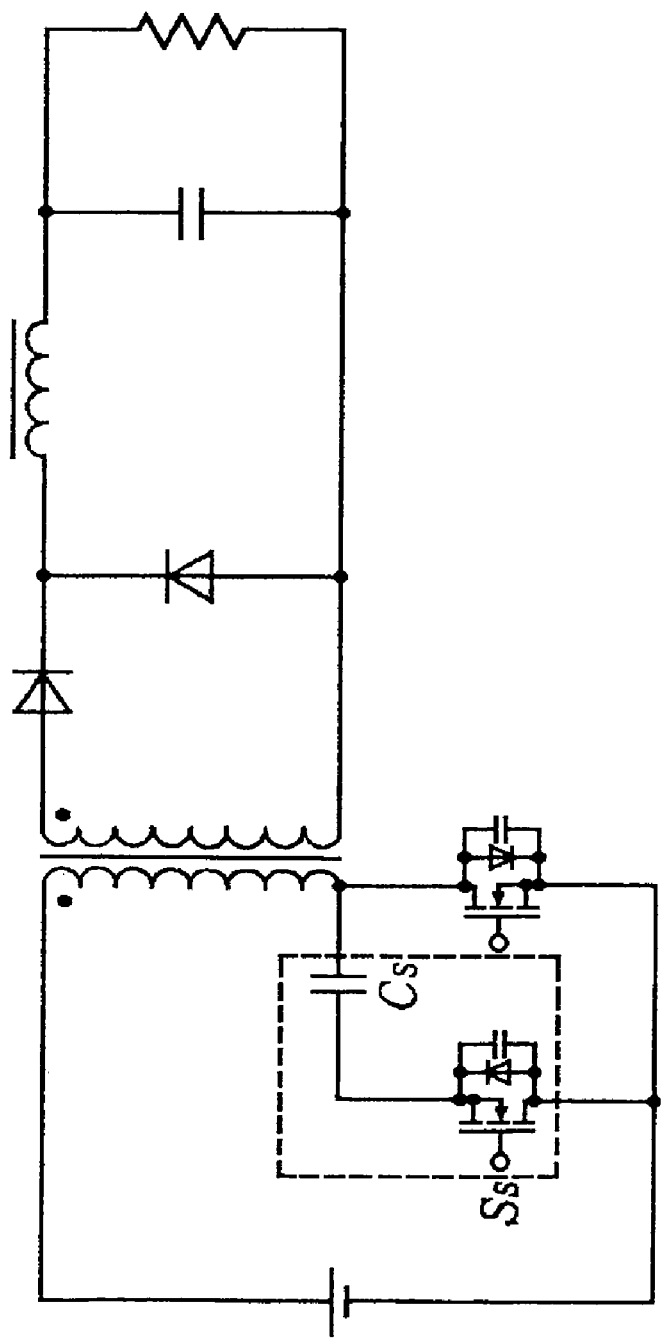
FIG. 15 is one example of a literature showing that the switched-snubber circuit is known. A switched-snubber, as shown in FIG. 15, composed of a switch Ss and a capacitor Cs, is connected to the main switch of the converter in parallel. The switch of the snubber is turned on/off alternately with the main switch. When the main switch is turned off, the energy accumulated in the parasitic inductance charges the snubber capacitor through a diode built in the snubber switch. As the current becomes zero, the current is turned in the reverse direction so as to keep on flowing through the snubber switch. The energy charged in the capacitor then regenerates on the input power side. The voltage of the main switch is clamped at the voltage of the snubber capacitor. If deadtime is given so as to turn off both switches at the same time, zero-voltage switching becomes possible and turn-on current surge can be reduced. In this case, there is basically no loss in the snubber circuit. Furthermore, the transformer magnetic flux is reset by the switched-snubber. "Basic Theory of Switching Converter" (published by Corona Corporation)

Next, to describe the switched-snubber circuit as a postscript, the operation of the conventional switched-snubber circuit is known by the literature "Basic Theory of Switching Converter" (published by Corona Corporation) shown in FIG. 15 and the like. The circuit has been frequently used for a DC-DC converter and the like. It should be noted that no such usage has implemented a parallel loaded serial resonance circuit on the transformer secondary circuit so as to take advantage of the effect thereof.

In the present invention, as shown in FIG. 4, the current flowing through the resonance capacitor provided in the secondary circuit is detected. Based on the principle, the operation of the inverter circuit composed of the switched-snubber circuit in the present invention is described below.

Referring to FIG. 5, the reference character R2 denotes current detecting means, which detects the current flowing through the resonance capacitor Ca. The voltage generated in the current detecting means R2 is applied to the gates of transistors Q1, Q2, i.e., the switching means. In this case, if the voltage generated in the current detecting means R2 is positive, the transistor Q1 is turned on. If the voltage generated in the current detecting means R2 is negative, the transistor Q2 is turned on. Therefore, if the current detecting method R2 is connected to zero potential, the transistors Q1 and Q2 are alternately turned on depending on phases of the resonance current flowing through resonance capacitance CA. As a result, the duration when the transistor Q1 is on and the duration when the transistor Q2 is on are equal.

Also, since the secondary side circuit of the step-up transformer resonates in the present invention, current flows slightly differently from the current flowing through the switched-snubber circuit used in a conventional DC-DC converter. The description thereof is given below.

Figure 16:
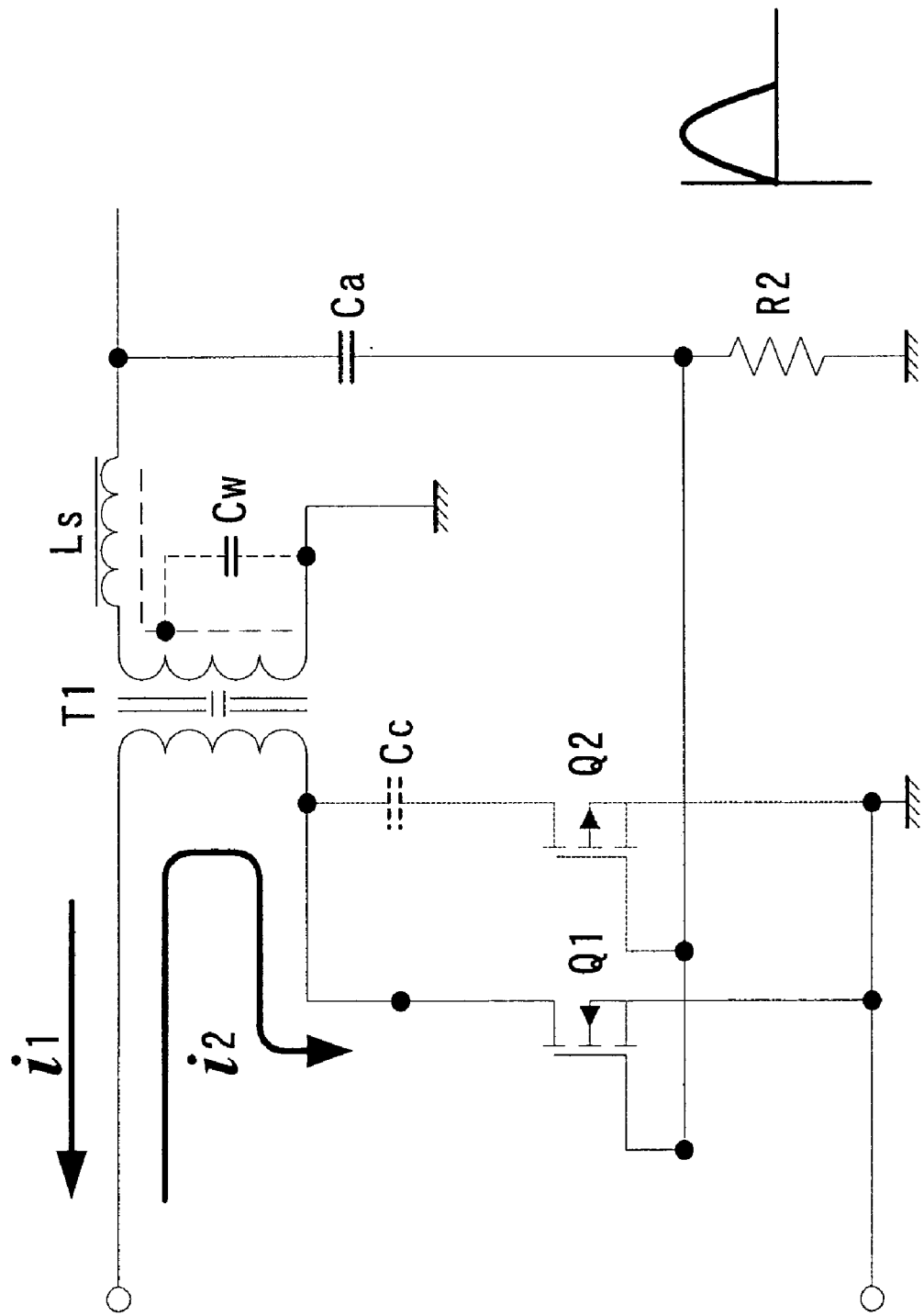
FIG. 16 is a circuit diagram illustrating the current flow when a positive phase voltage is generated in the current detecting method of one exemplary current-mode resonant circuit according to the present invention so as to turn on a transistor Q1 of switching method.

FIG. 16 is an explanatory diagram showing the current flow when a positive phase voltage is generated in the current detecting means R2. In this case, the transistor Q1 of the switching means is turned on. Through the transistor Q1, a reverse current i1 first flows and a forward current i2 then flows.

Figure 17:
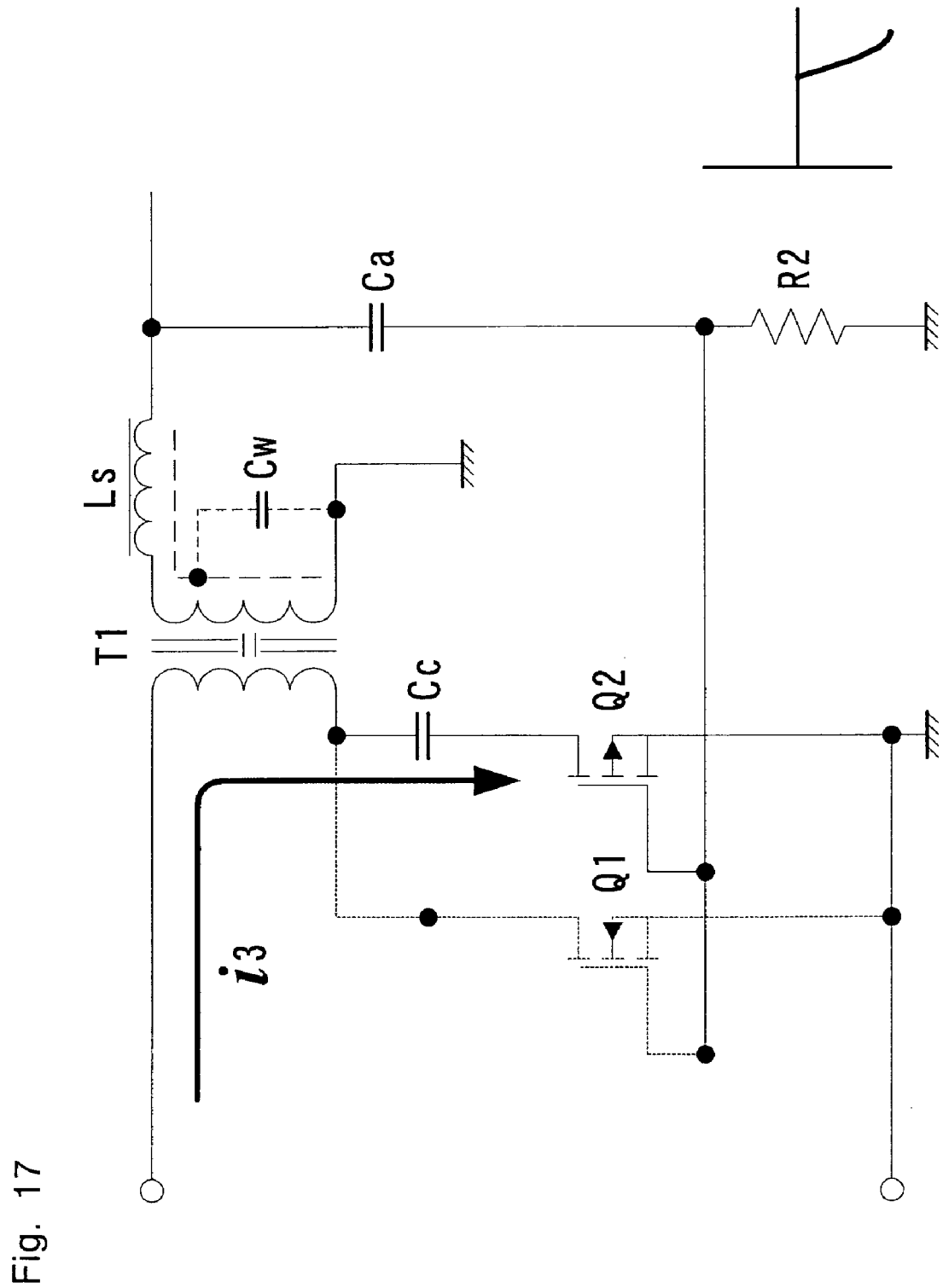
FIG. 17 is a circuit diagram illustrating the current flow when a negative phase voltage is generated in the current detecting method in the one exemplary current-mode resonant circuit according to the present invention so as to turn off the transistor Q1 of the switching method; a transistor Q2 is turned on so as to flow a reverse current; and a coupling capacitor Cc is charged by the current.

Next, the voltage of the current detecting means R2 becomes negative, the transistor Q1 is turned off and the transistor Q2 is turned on. Then, as shown in FIG. 17, since a reverse current flows through the transistor Q2, the coupling capacitor Cc is charged by the current so that the voltage in this part becomes higher than the supply voltage. In this case, since the Q2 is a P channel-type transistor, it is the forward current which flows from the GND toward the power source.

Figure 18:
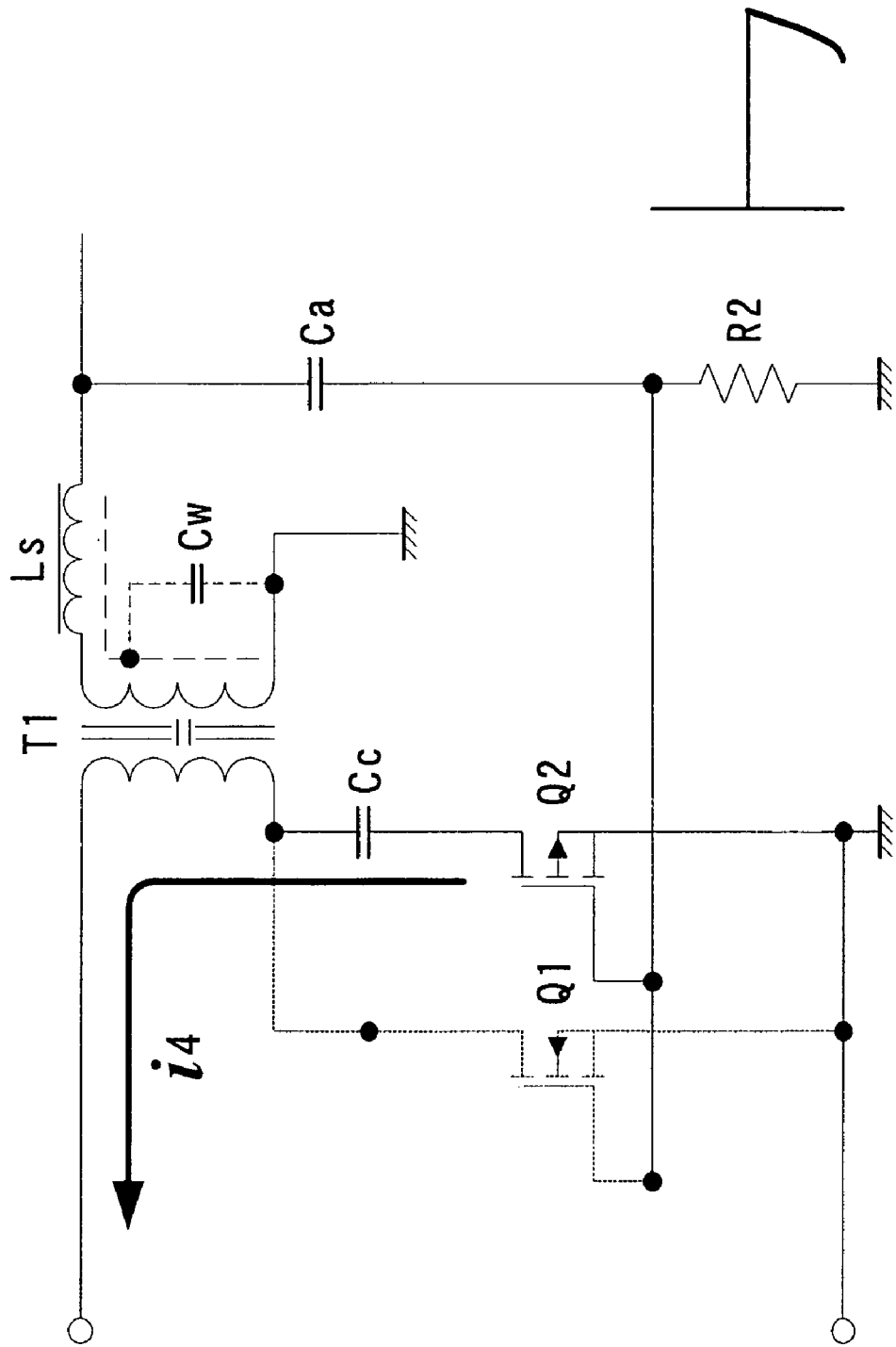
FIG. 18 is a circuit diagram illustrating the current flow when a negative phase voltage is generated in the current detecting method in the one exemplary current-mode resonant circuit according to the present invention so as to turn off the transistor Q1 of the switching method; the transistor Q2 is turned on so as to flow a reverse current; the coupling capacitor Cc is charged by the current; and then a forward current flows through the transistor Q2.

Next, as shown in FIG. 18, the forward current flows through the transistor Q2 so as to reset the magnetic flux in the transformer T1. By repeating the operation, the potential of the coupling capacitor Cc rises to be maintained at a constant potential. As a result, since the step-up transformer primary winding is supposed to be driven at a voltage slightly higher than the supply voltage, the drive system by the switched-snubber circuit is highly efficient in using the supply voltage.

Also, since the transformation ratio for obtaining a required voltage can be smaller, the step-up transformer can be made further smaller. Also, the above operation is the same even if the step-up transformer is replaced with a choking coil.

Also, in the switched-snubber circuit, power can be controlled by controlling the duty ratio of the transistor Q1. Specifically, by applying a direct current potential to the current detecting means R2, power can be controlled.

Figure 19:
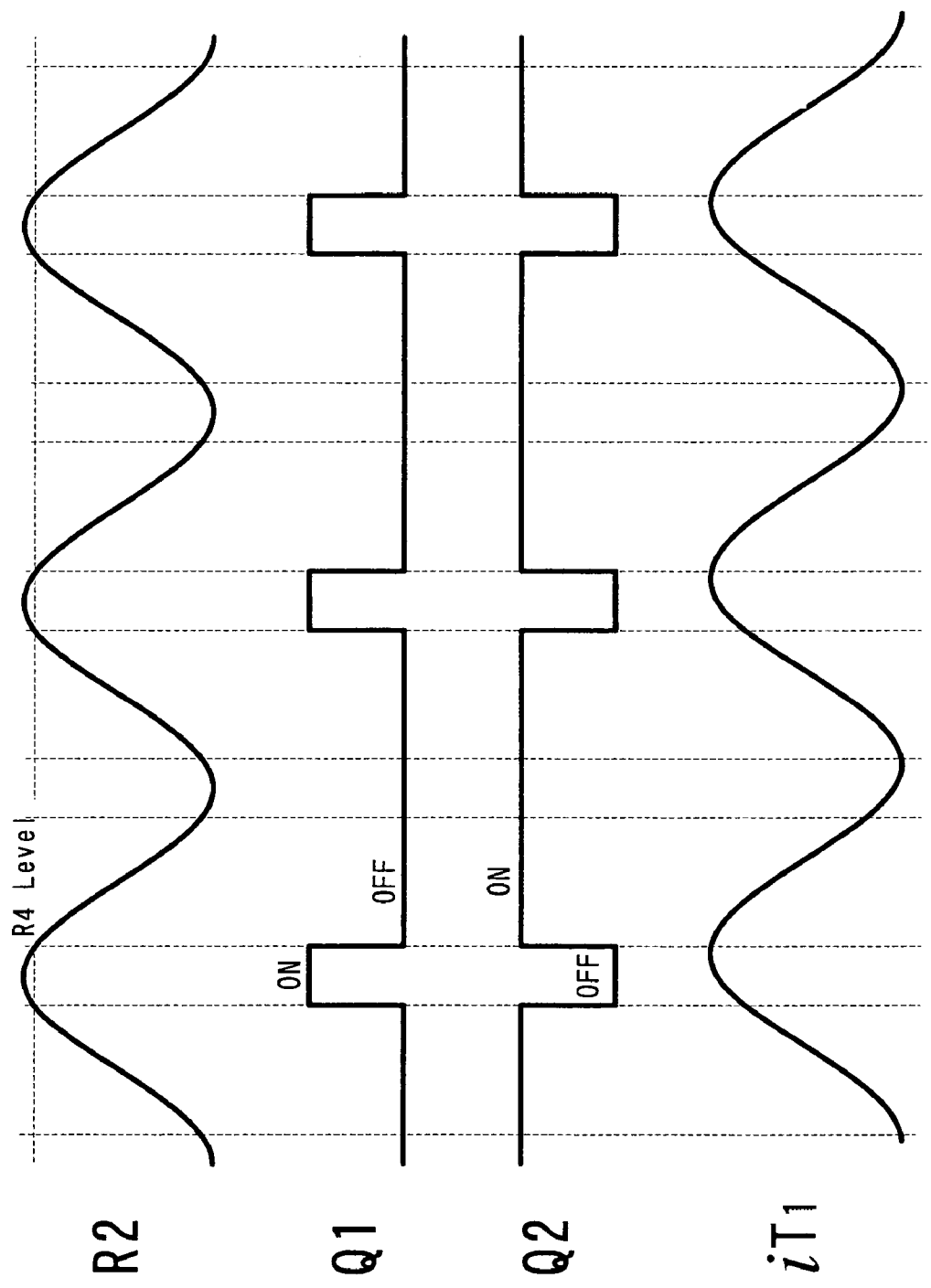
FIG. 19 is an explanatory diagram showing a control waveform in each part of the circuit shown in FIG. 9 and phase relations therebetween.

FIG. 19 shows a voltage waveform in each part of the circuit shown in FIG. 9. Referring to the figure, a description is given below.

When a positive potential is applied to the current detecting means R2, while the transistor Q1 is turned on, specifically, the duty ratio becomes larger. Consequently, the current flowing through the transformer T1 increases, and the potential accumulated in the coupling capacitor Cc becomes higher after the transistor Q1 is turned off when the transistor Q2 is turned on. As a result, this means that the step-up transformer is driven at a high voltage, thereby increasing the drive power.

On the other hand, when a negative potential is applied to the current detecting means R2, the duration when the transistor Q1 is on becomes shorter and the duty ratio becomes smaller. As a result, the drive power decreases.

In the case of the circuit shown in FIG. 9, the diodes D2, D3 are configured so that the negative potential becomes higher as the discharge lamp current increases. As a result, since the duty ratio of the transistor Q1 becomes smaller through the current detecting means R2 as the lamp current increases, power is restricted so as to be adjusted in a direction of decreasing the lamp current. Specifically, the circuit composes the negative feedback circuit of the lamp current.

In FIG. 19, iT1, which is the current flowing through the transformer primary winding, has slightly delays in phase with respect to the voltage generated in the current detecting R2, but they can be thought as being almost in phase. The switching timing of the Q1, Q2 is determined by the relation between the voltage generated in the current detecting means R2 and the negative potential generated in the resistor R4. The timing when the Q1 is turned on, specifically, since the voltages applied to the primary winding of the step-up transformer T1 are in phase, as clearly seen from the relation shown in FIG. 9, the current iT1 flowing through the step-up transformer T1 is closely in phase with the effective value of the voltage applied to the primary winding of the step-up transformer T1. Specifically, this means that the power factor is extremely favorable. At the same time, this also means that almost no exciting current flows.

The fact that almost no exciting current flows means that the self-inductance of the step-up transformer secondary winding can be small as long as it is driven under the ideal conditions. This leads to a drastic change in the design concept of the step-up transformer for a discharge lamp. Specifically, the permeability of the core material may be lower than in a conventional one and the number of turns of the transformer primary and secondary windings may be smaller than in a conventional one. Particularly, if the number of turns of the transformer secondary winding is too large, as disclosed in Japanese Patent No. 2733817 and Japanese Patent Application No. 2003-365326 corresponding to US Patent Application Publication No. US-2005-88113, due to the distributed constant transformer secondary winding, the structure of dense coupling and thin coupling appear (specifically, ¼λ self-resonance). Since the self-resonance effect is an important parameter which determines the maximum value for the number of turns of the secondary winding of the step-up transformer for a discharge lamp, it is significantly important that the number of turns of the transformer secondary winding be smaller. This invention makes it possible. Considering the point disclosed in Japanese Patent Application No. 2003-365326, it is implied that a step-up transformer which can convert larger power can be achieved in spite of the smaller dimension thereof.

Next, a description is given for the operation of the current-mode resonant circuit based on the current detecting means shown in FIG. 7.

Figure 20:
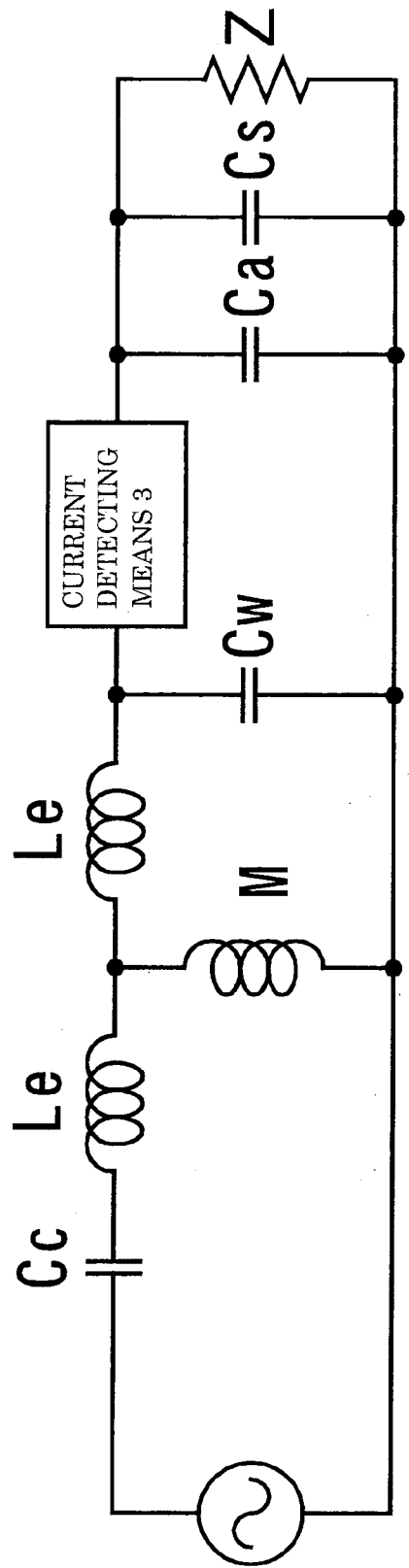
FIG. 20 is an explanatory diagram showing a circuit equivalent to the circuit shown in FIG. 7.

FIG. 20 shows a case in which the circuit shown in FIG. 7 is replaced with an equivalent circuit. The current detecting means is equivalent for a circuit simulation whether coupled to the GND side of the step-up transformer secondary winding or coupled to the high voltage side.

A circuit simulation performed based on this shows the following result.

Figure 21:
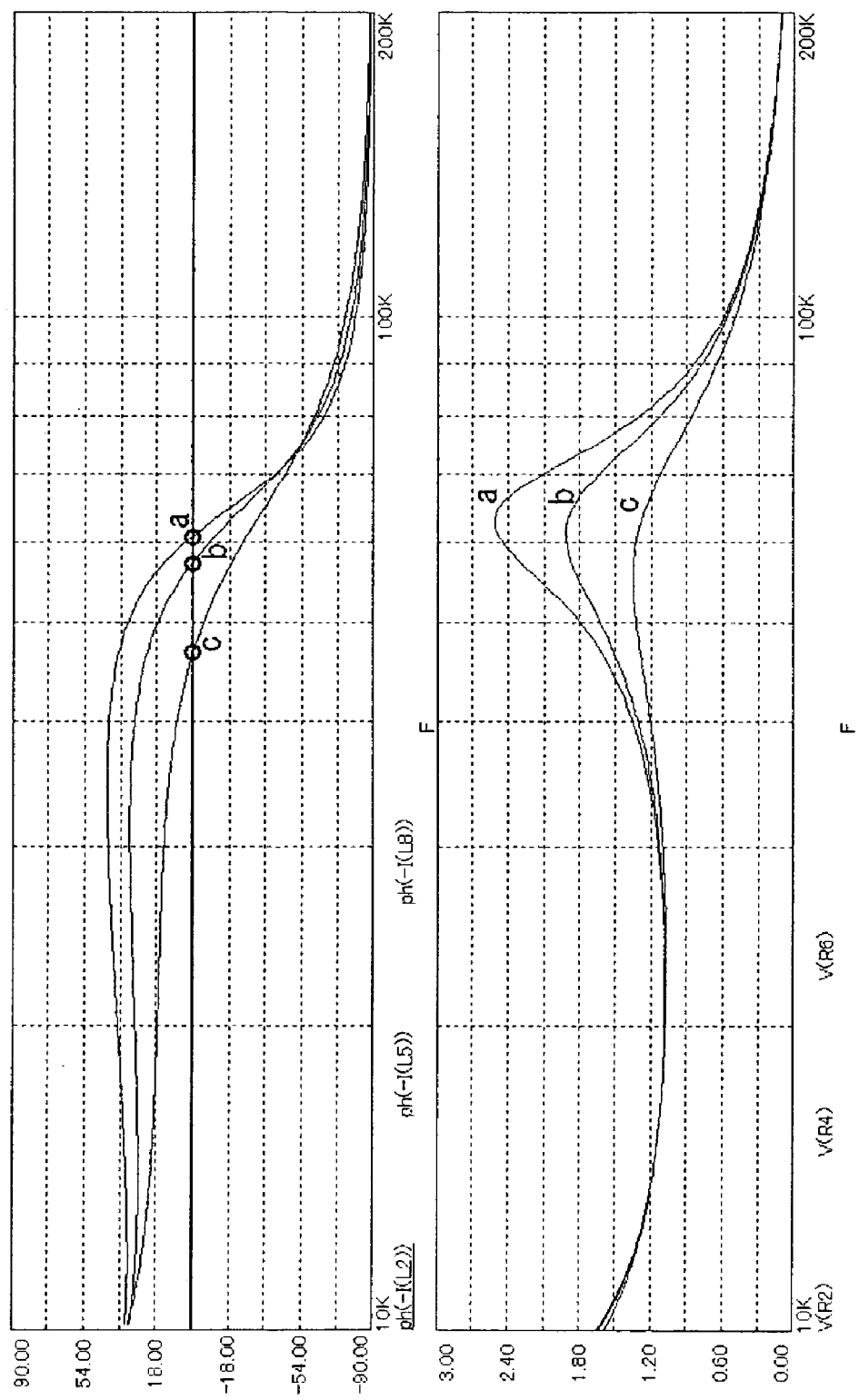
FIG. 21 shows explanatory diagrams illustrating phase characteristic (upper portion) and transfer characteristic (lower portion) when a simulation is performed by the equivalent circuit shown in FIG. 20, wherein the horizontal axis denotes frequency.

In FIG. 21 (upper portion) and FIG. 21 (lower portion), the horizontal axis represents frequency. FIG. 21 (upper portion) shows phase characteristic similarly to FIG. 14 (upper portion) and FIG. 21 (lower portion) shows transfer characteristic similarly to FIG. 14 (lower portion). In FIG. 21, "a" means that the cold cathode fluorescent lamp is high impedance; "b" middle impedance; and "c" low impedance.

The current-mode resonant circuit of the present invention determines the timing for switching the switching means by detecting the current flowing through the step-up transformer secondary windings. Therefore, in FIG. 21 (upper portion), at a frequency at which phase characteristics a, b and c cross the zero degree line, the operational frequency of the inverter circuit is determined.

Also, as the load impedance becomes lower from high, middle down to low, the drive frequency of the inverter circuit characteristically becomes lower. Here, what is different from the conventional current-mode resonant circuit is that when the load impedance is small, conventional current-mode resonant circuit has runaway effect. But in this invention, continuous oscillation is possible in the inverter circuit without the runaway effect even when the Q value of the resonant circuit is low. Therefore, stable operation is possible in a wide load range from low load impedance up to high.

Next, a description is given for the operation of power control means in the present invention.

Figure 22:
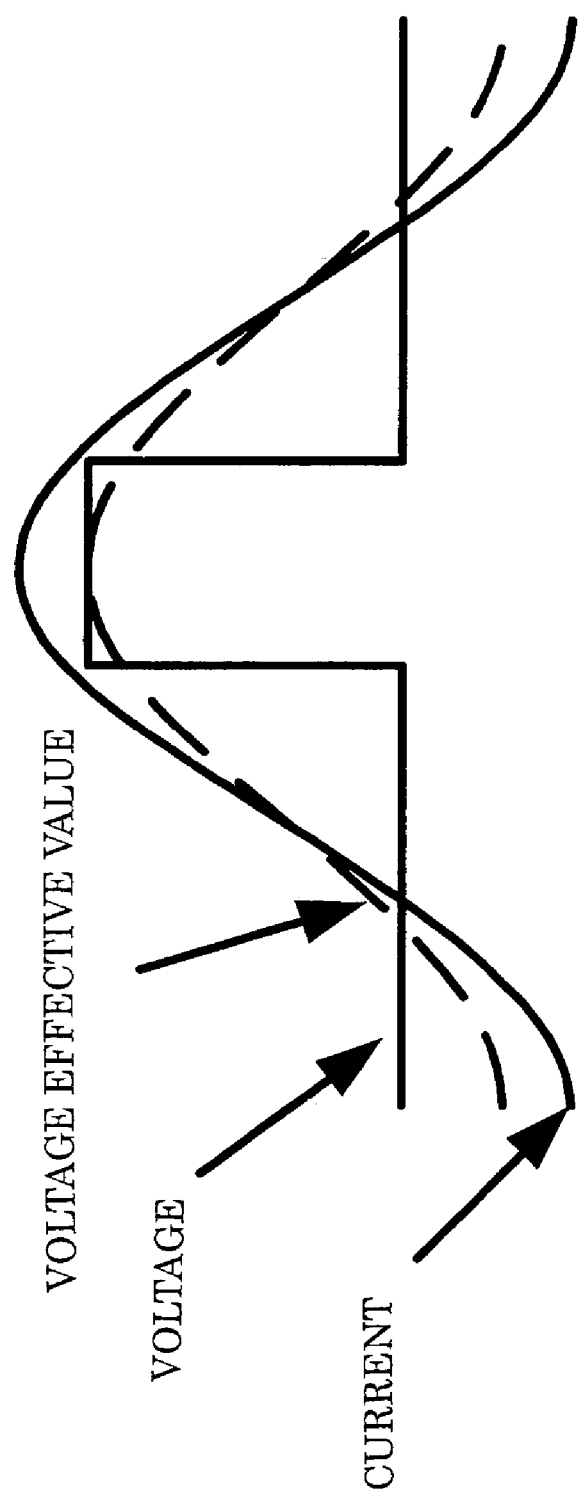
FIG. 22 shows the phase relation between the voltage effective value and current in the present invention, showing a power control method when a duty ratio becomes smaller so as to reduce the power of the inverter circuit.
Figure 23:
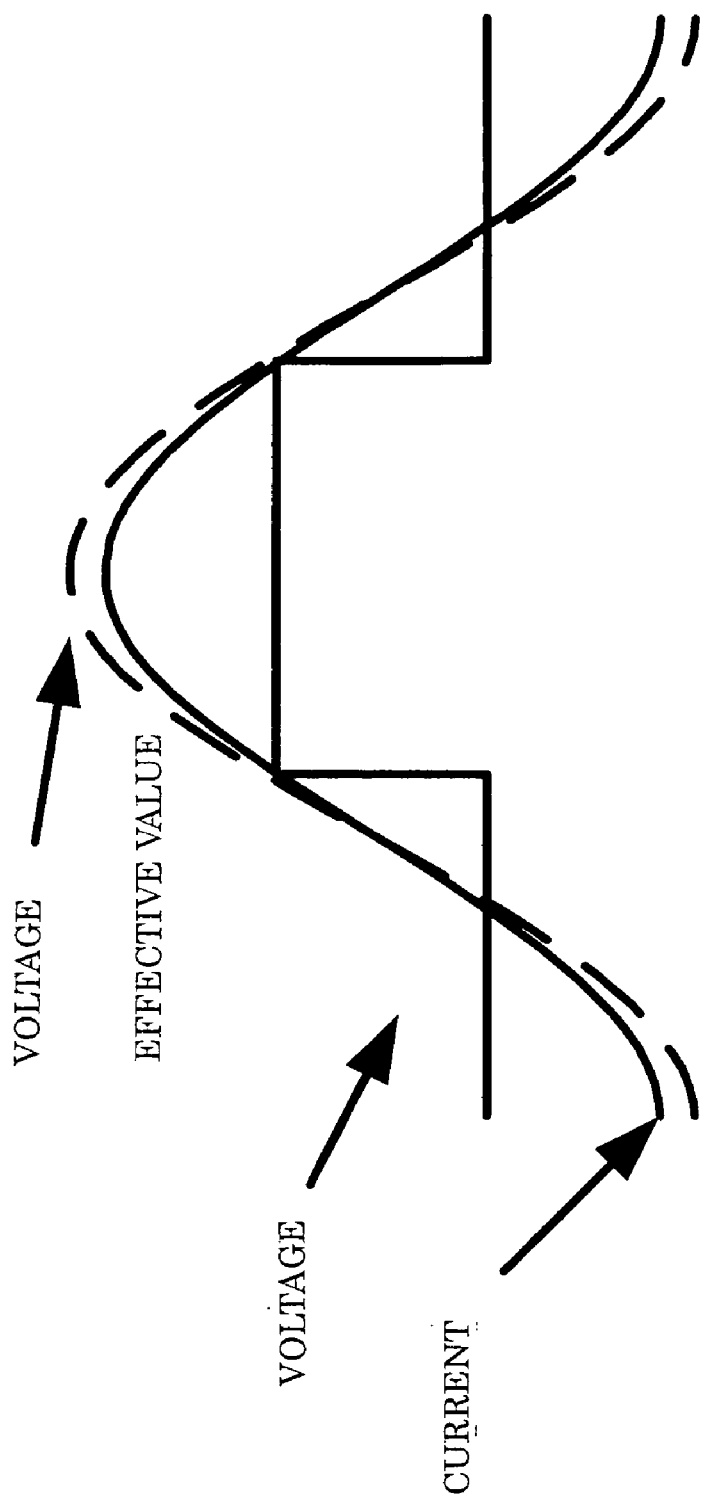
FIG. 23 shows the phase relation between the voltage effective value and current in the present invention, showing the power control method when the duty ratio becomes larger so as to increase the power of the inverter circuit.
Figure 24:
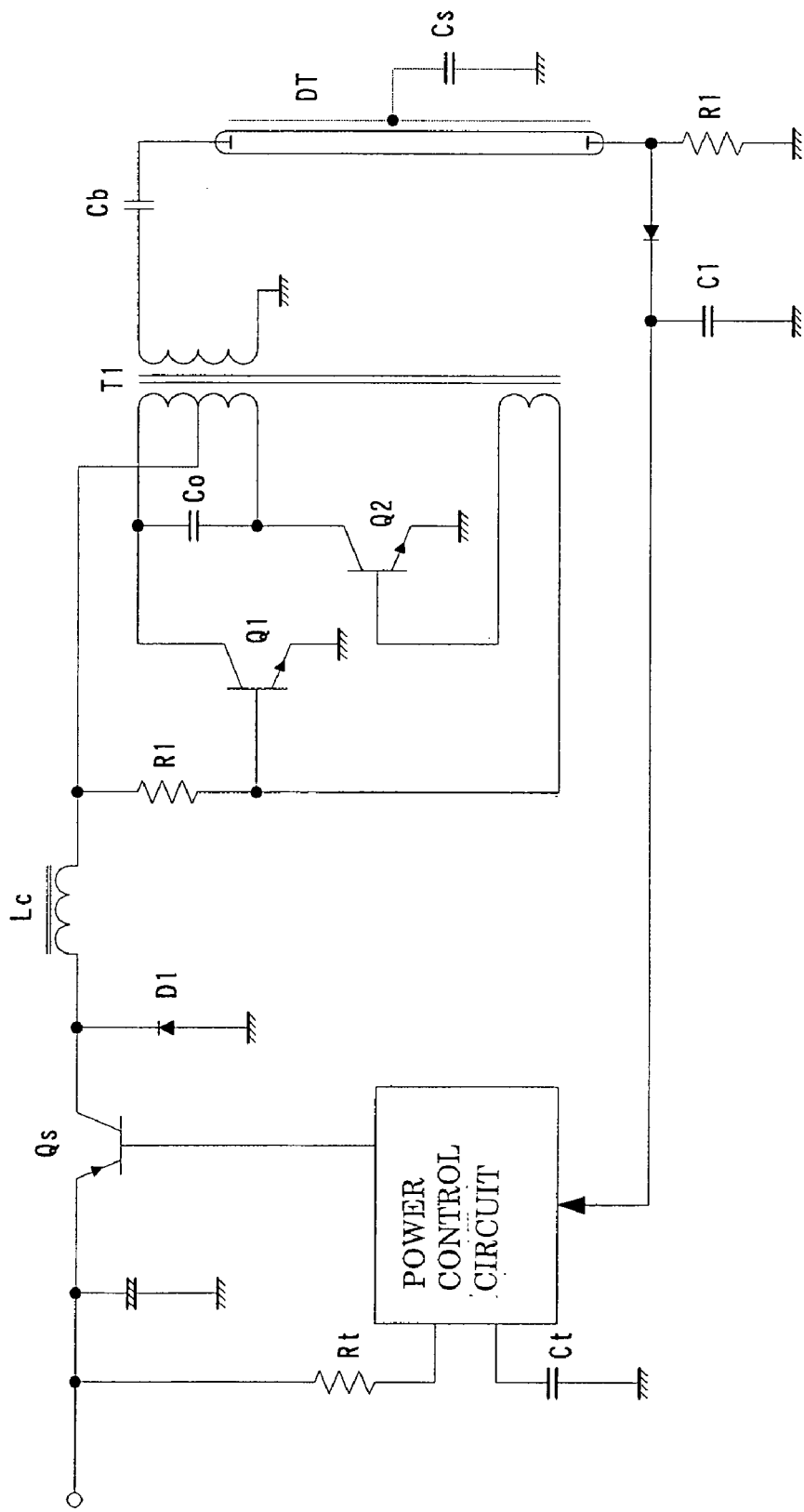
FIG. 24 is a circuit structural diagram showing a conventional collector resonant inverter circuit.
Figure 25:
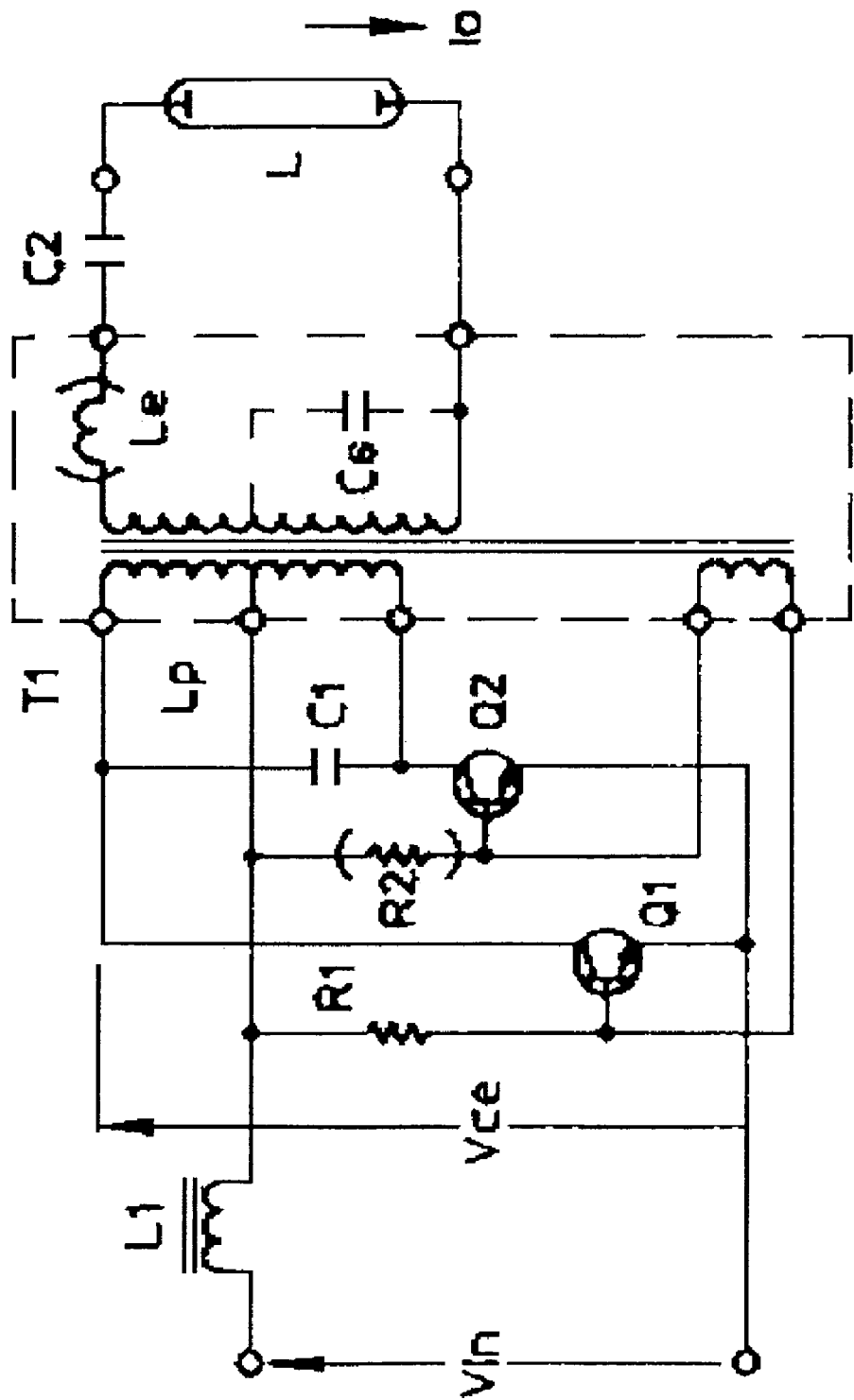
FIG. 25 is a circuit structural diagram showing one example of a conventional inverter circuit for a cold cathode fluorescent lamp.
Figure 26:
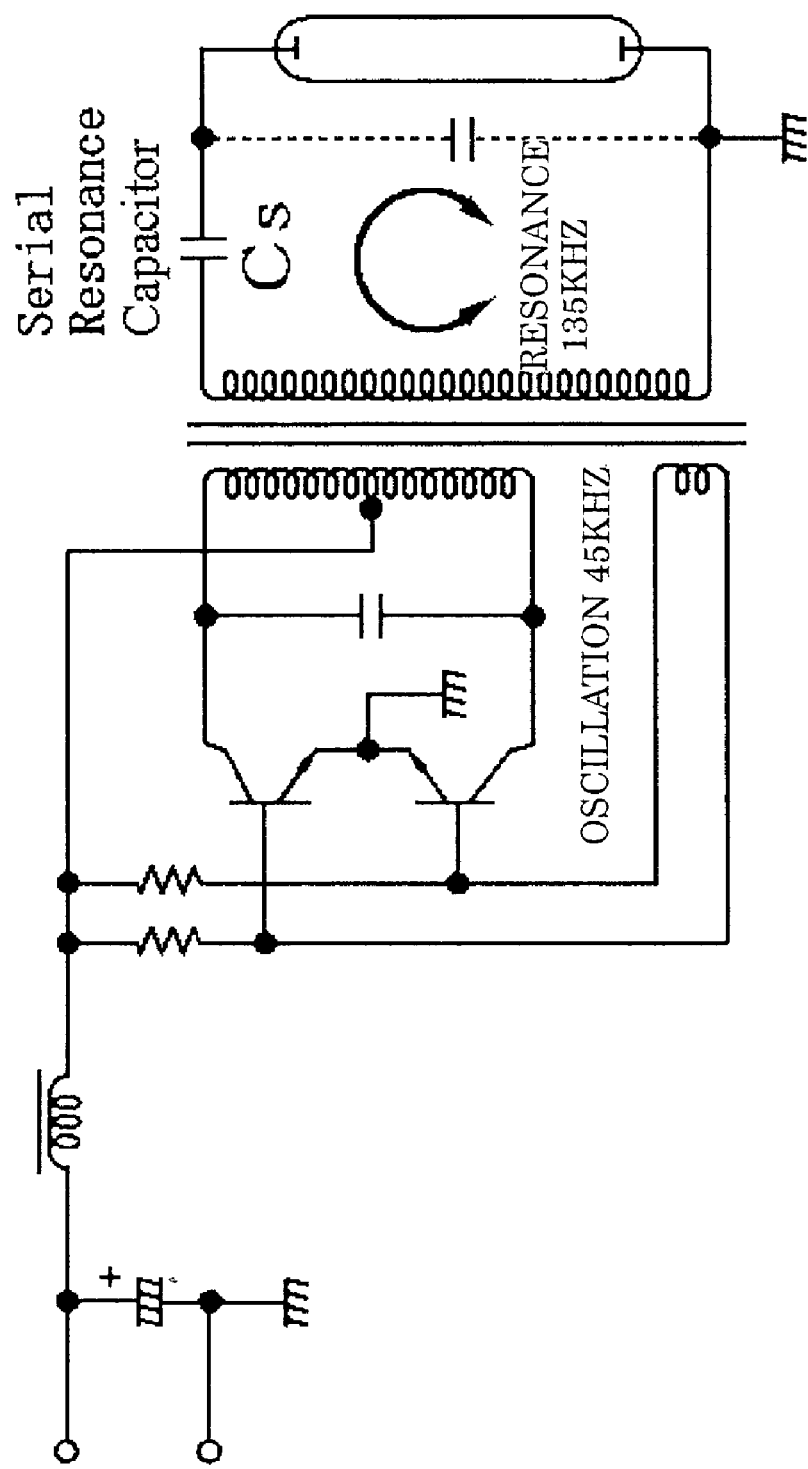
FIG. 26 is an explanatory diagram illustrating that the resonance frequency of the secondary circuit of the inverter circuit shown in FIG. 25 is three times as high as the oscillation frequency of the primary circuit.
Figure 27:
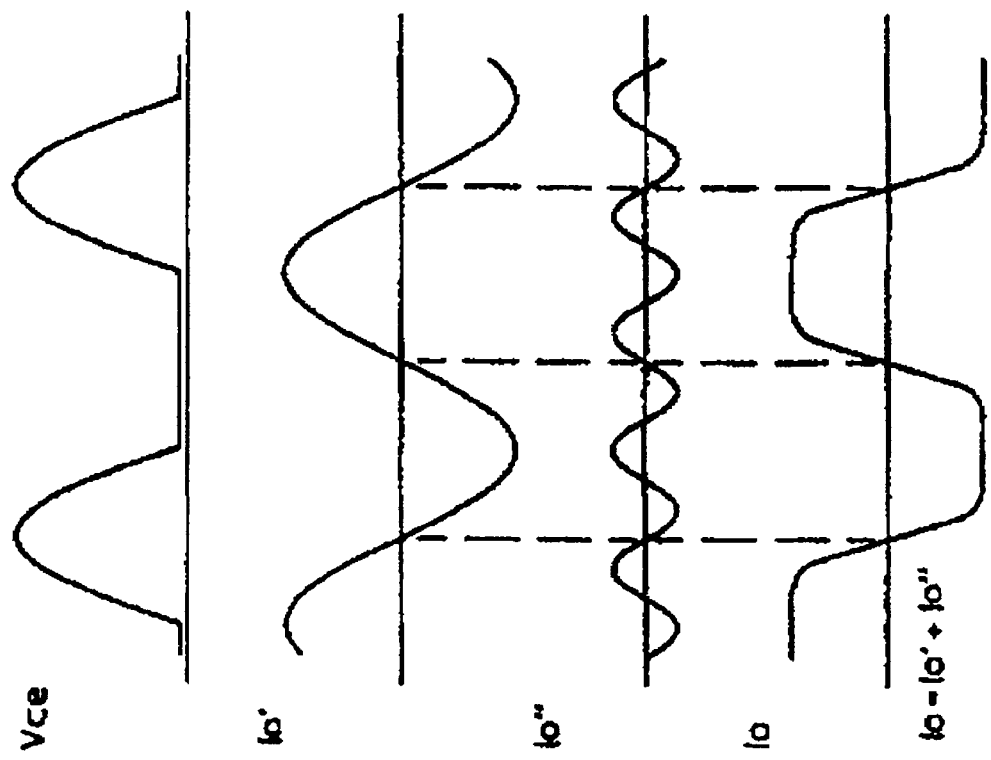
FIG. 27 is an explanatory diagram illustrating that the oscillation frequency and third-order harmonic in the inverter circuit are combined so as to create a trapezoidal waveform.
Figure 28:
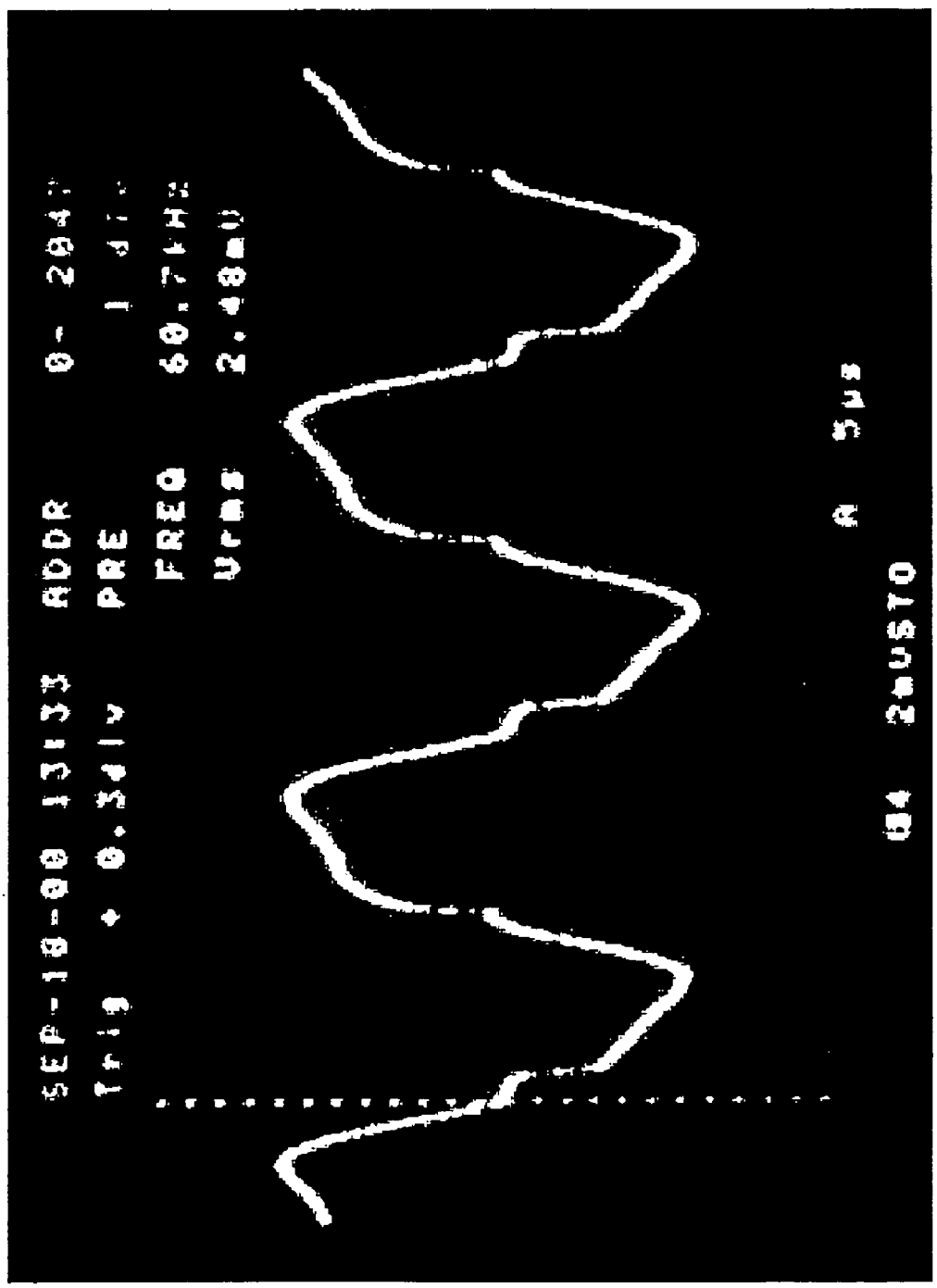
FIG. 28 is an explanatory diagram showing a waveform of the current flowing through a cold cathode fluorescent lamp of an actual triple resonant circuit of the inverter circuit shown in FIG. 25.
Figure 30:
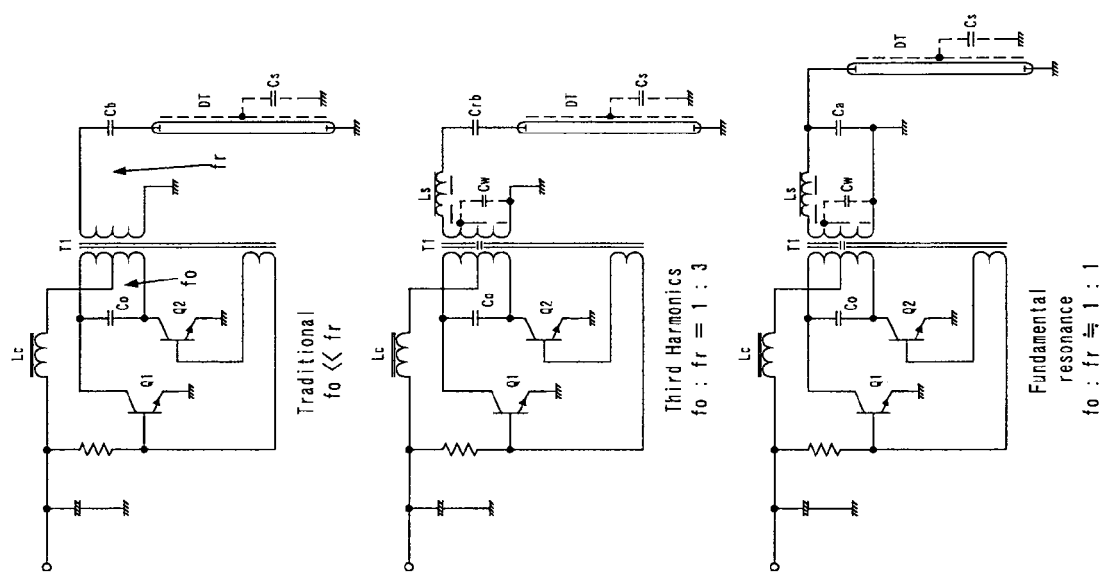
FIG. 30 is an explanatory diagram illustrating that the relation between $f_0$ and fr changes with the times, wherein $f_0$ is drive frequency of the inverter circuit and fr is resonance frequency of the secondary circuit.
Figure 31:
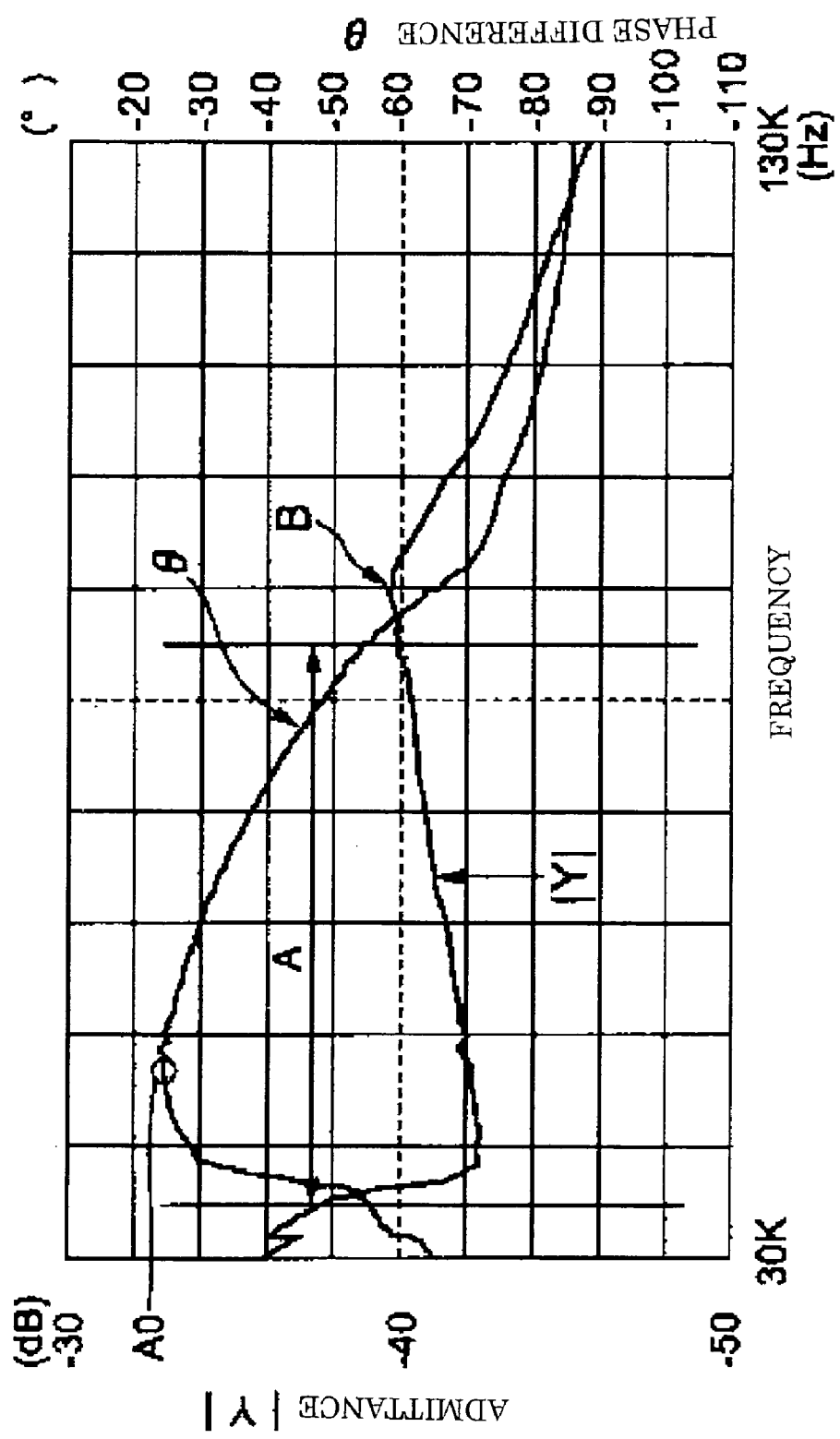
FIG. 31 is an explanatory diagram illustrating a scheme of improving power factor as seen from the driving methods side in one exemplary conventional inverter circuit.
Figure 32:
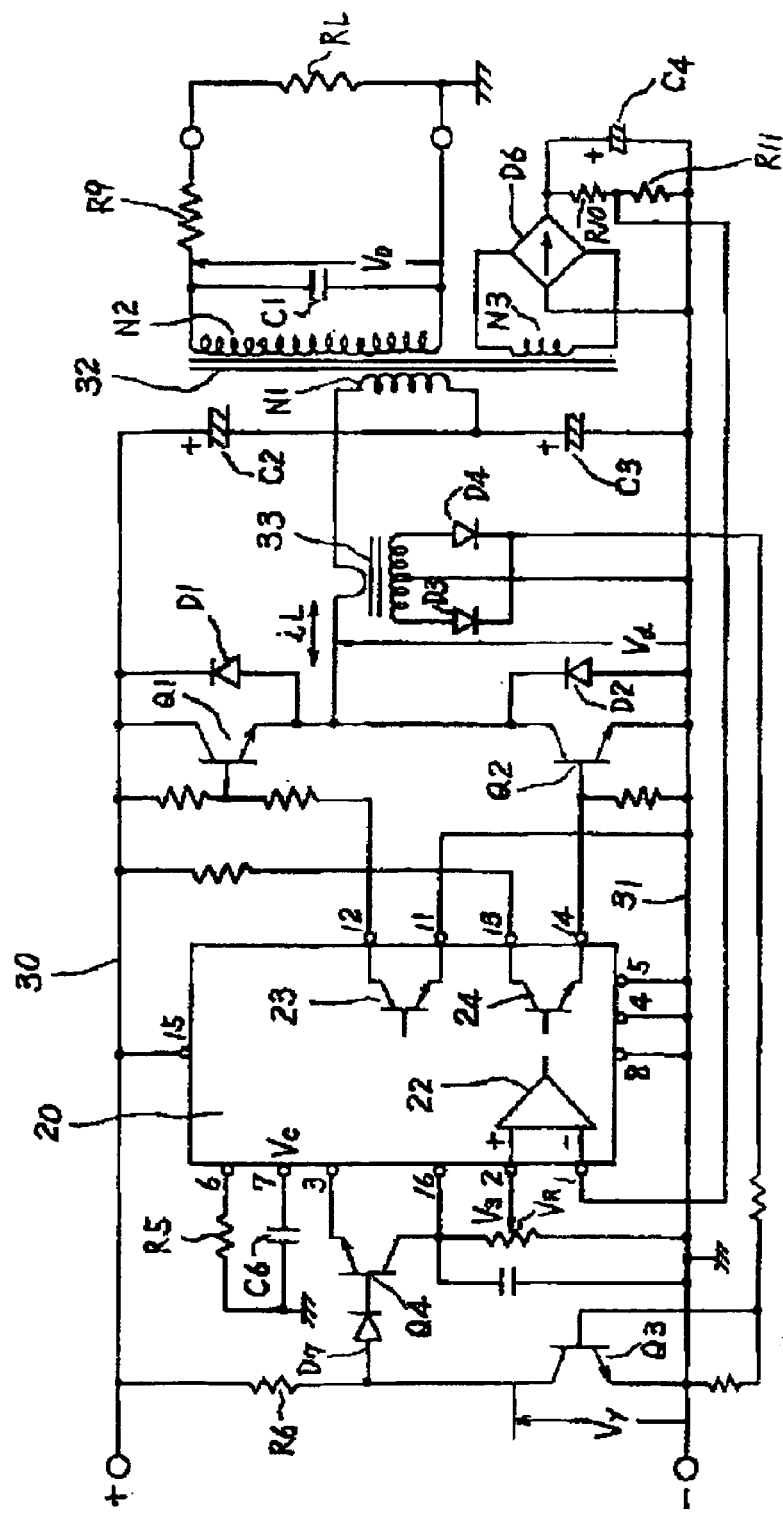
FIG. 32 shows a conventional, typical zero current switching type circuit.
Figure 33:
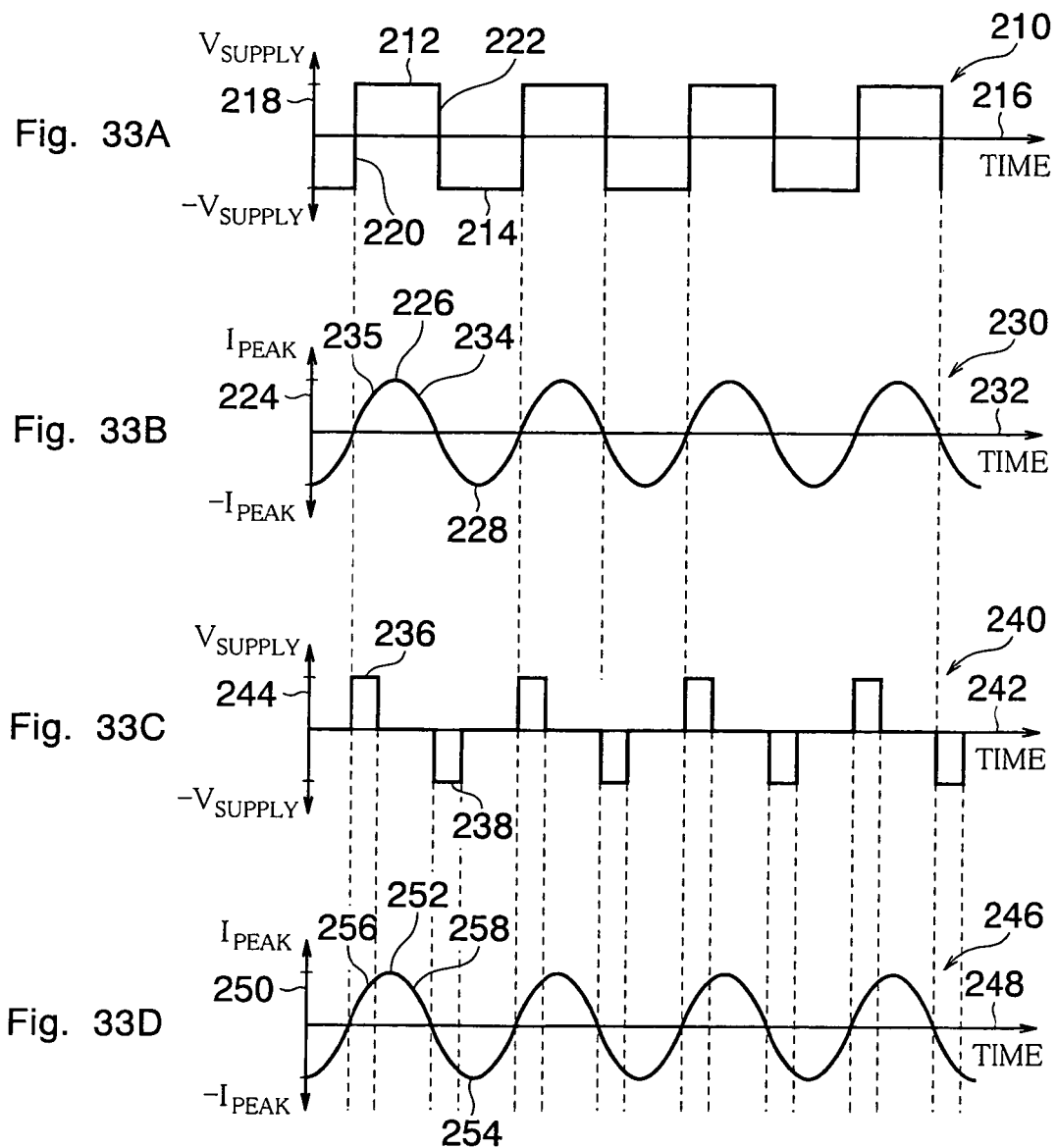
FIG. 33 shows explanatory diagrams illustrating control waveforms for illustrating the operation of the conventional zero current switching type circuit and the phase relation therebetween, wherein A, B show a state in which no power control is performed and C, D a state in which power control has been performed.
Figure 34:
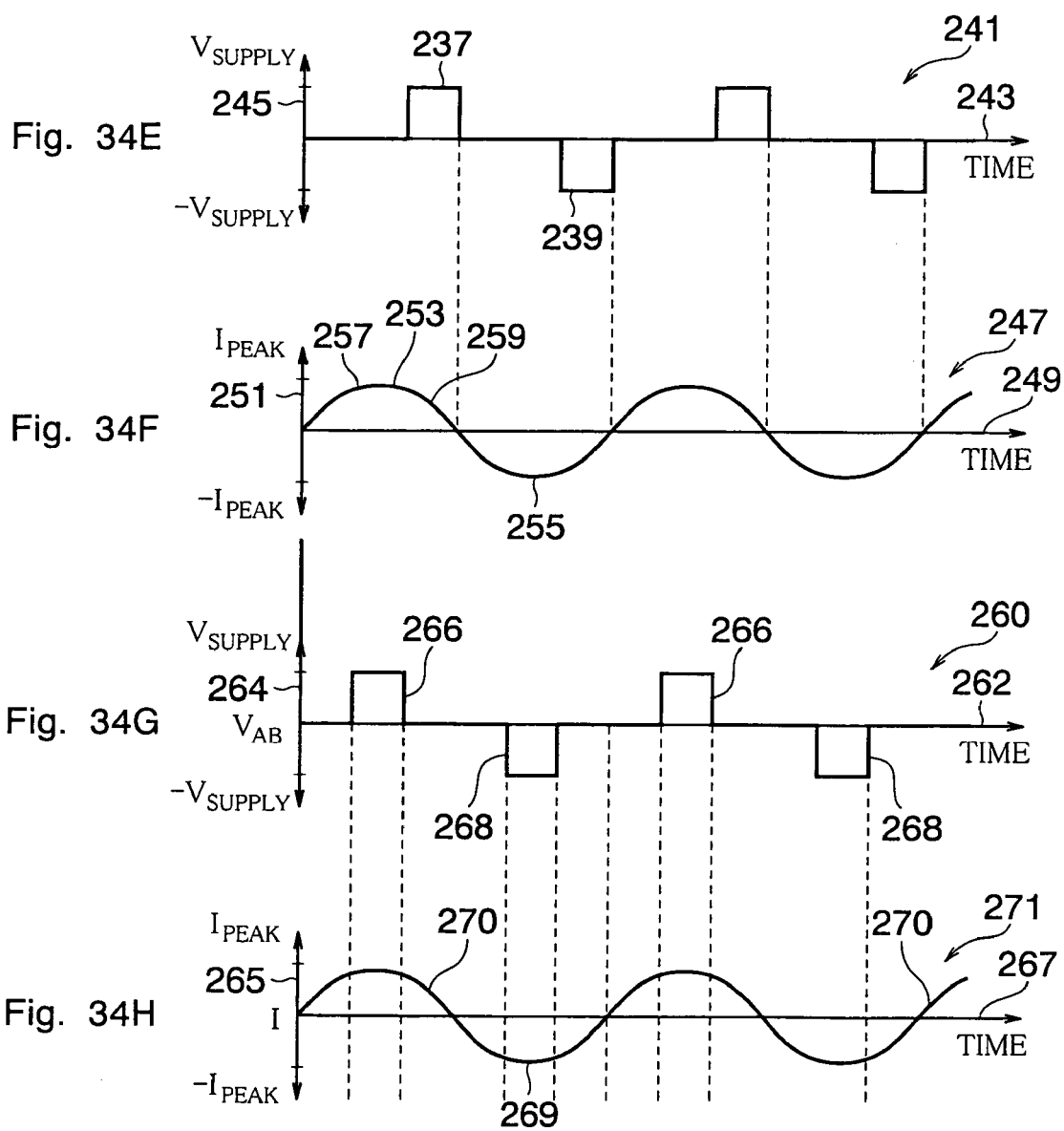
FIG. 34 shows explanatory diagrams illustrating control waveforms for illustrating the operation of the conventional zero current switching type circuit and the phase relation therebetween, wherein E, F show a state in which zero current switching operation is attempted in a state that a voltage effective value advances in phase with respect to a current effective value, and G, H show one exemplary control which is not zero current switching operation.
Figure 35:
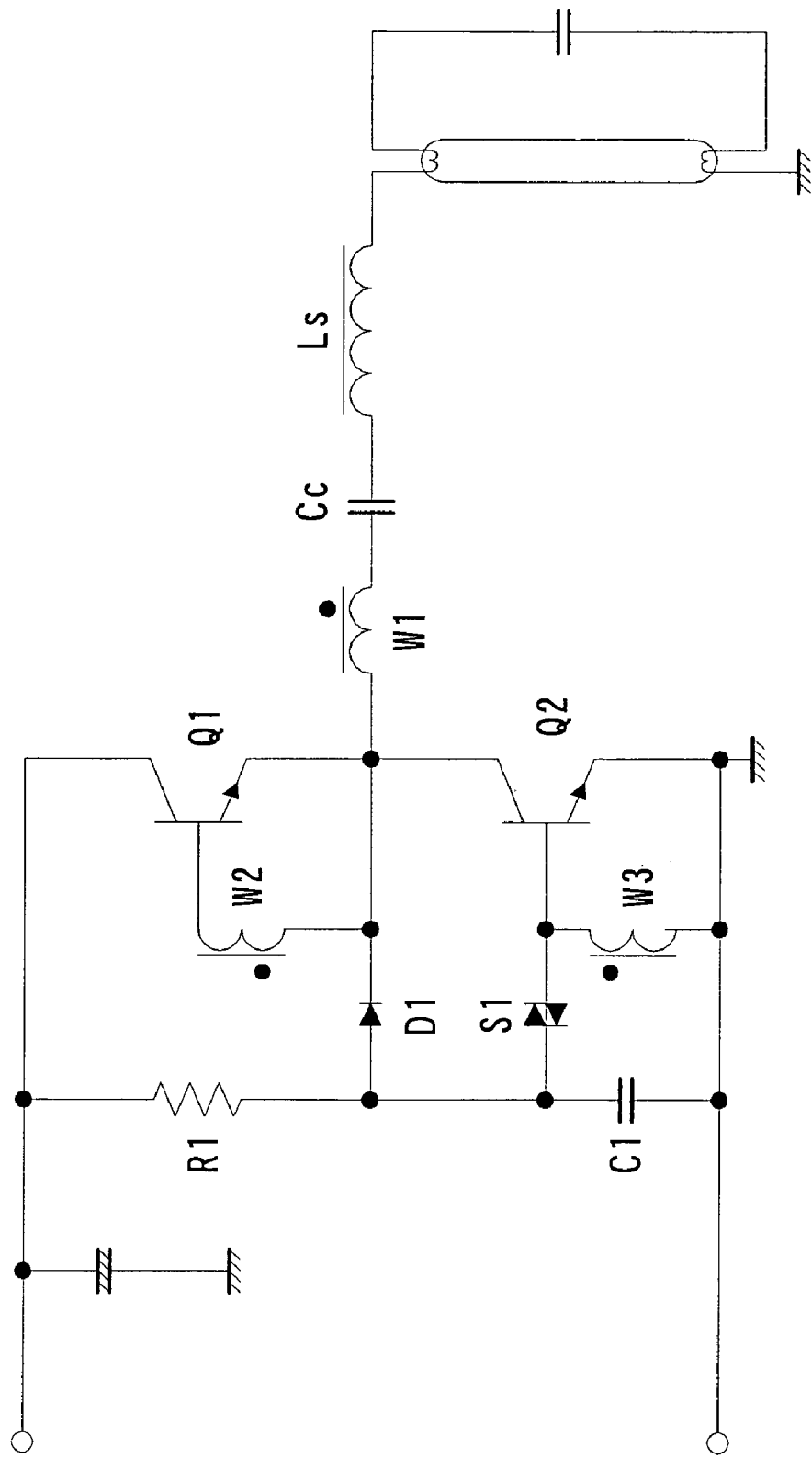
FIG. 35 is a circuit structural diagram showing one example of a current-mode resonant circuit which is known for a conventional hot cathode fluorescent lamp.
Figure 36:
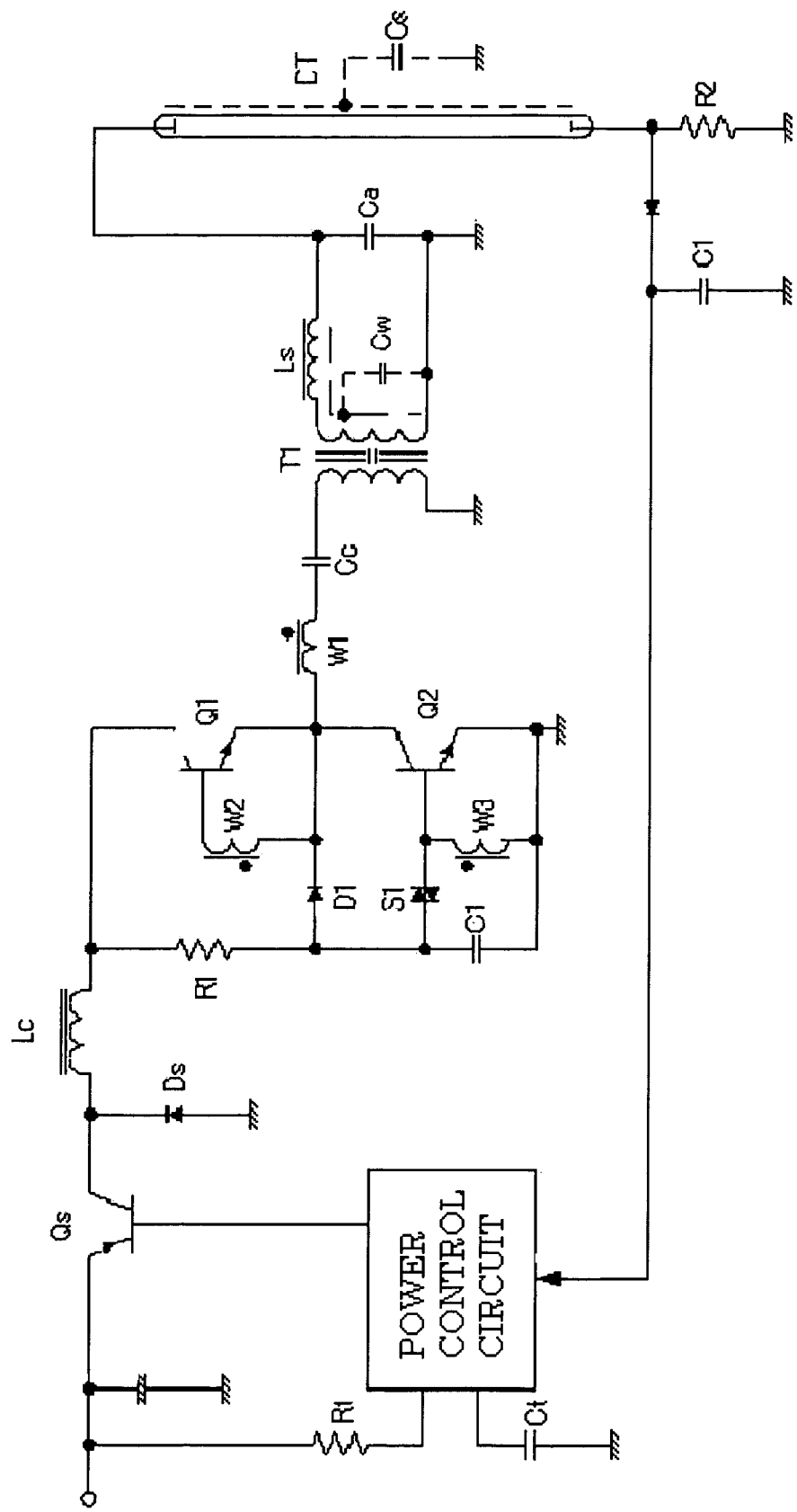
FIG. 36 is a circuit structural diagram showing one example of a dimmer circuit of an inverter circuit for a cold cathode fluorescent lamp which combines a conventional current-mode resonant circuit, a DC-DC converter circuit and a leakage flux transformer.
Figure 37:
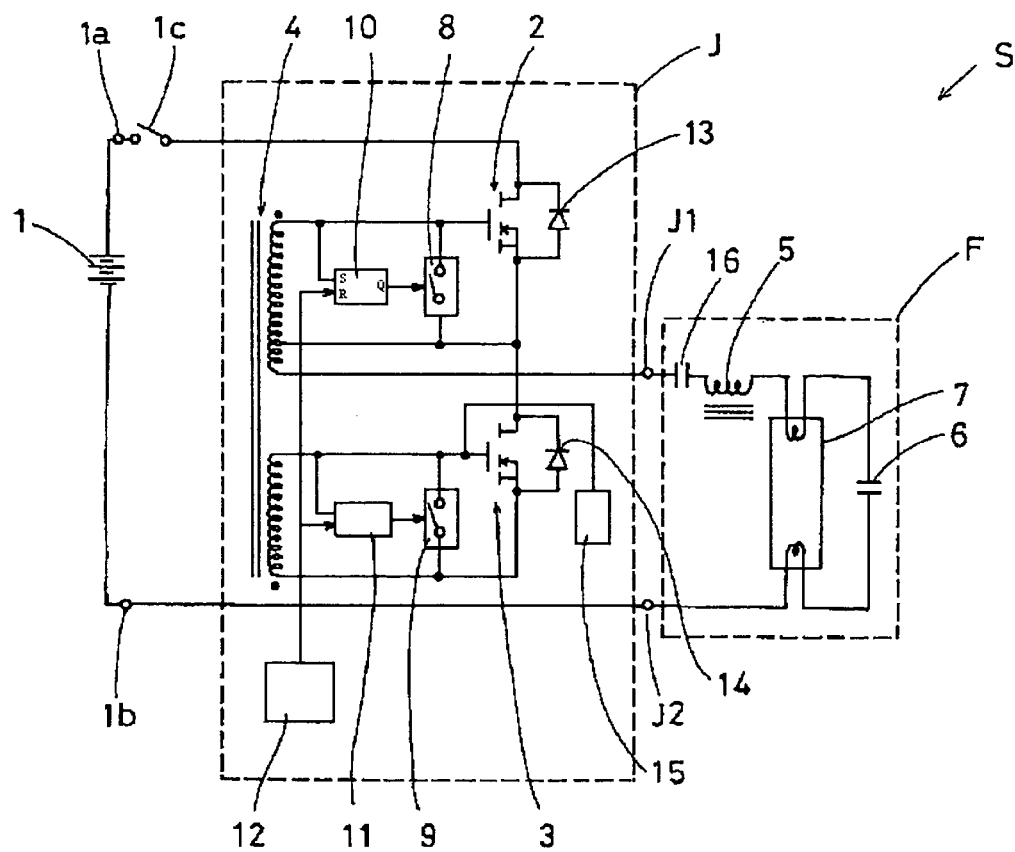
FIG. 37 is an explanatory diagram showing a method of detecting zero current in a conventional zero current switching circuit, turning on switching method, and then turning off the switching method after a prescribed period of time.
Figure 38:
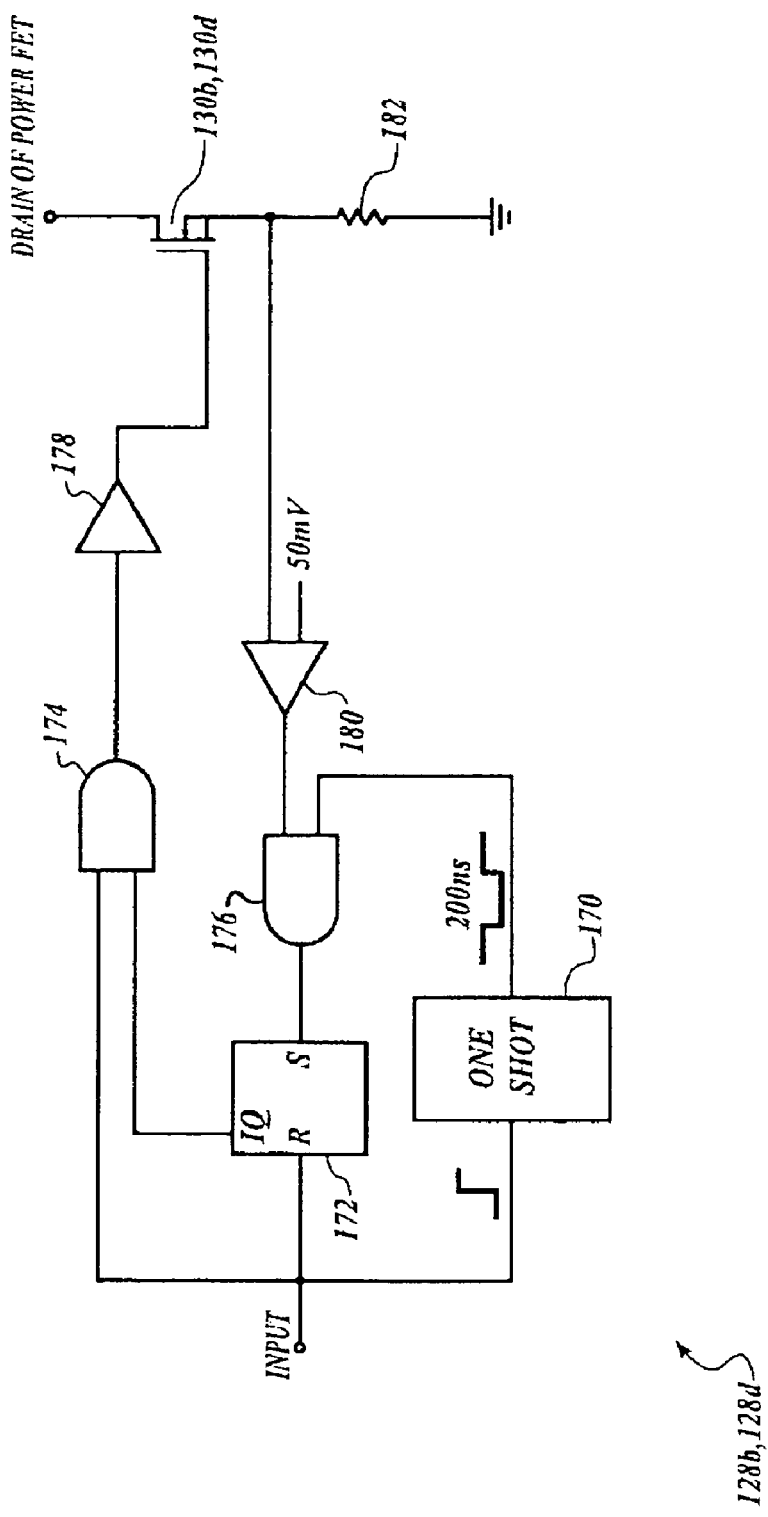
FIG. 38 is an explanatory diagram showing the conventional zero current switching circuit, illustrating that an RS flip-flop is set at zero current and reset after a prescribed period of time.
Figure 39:
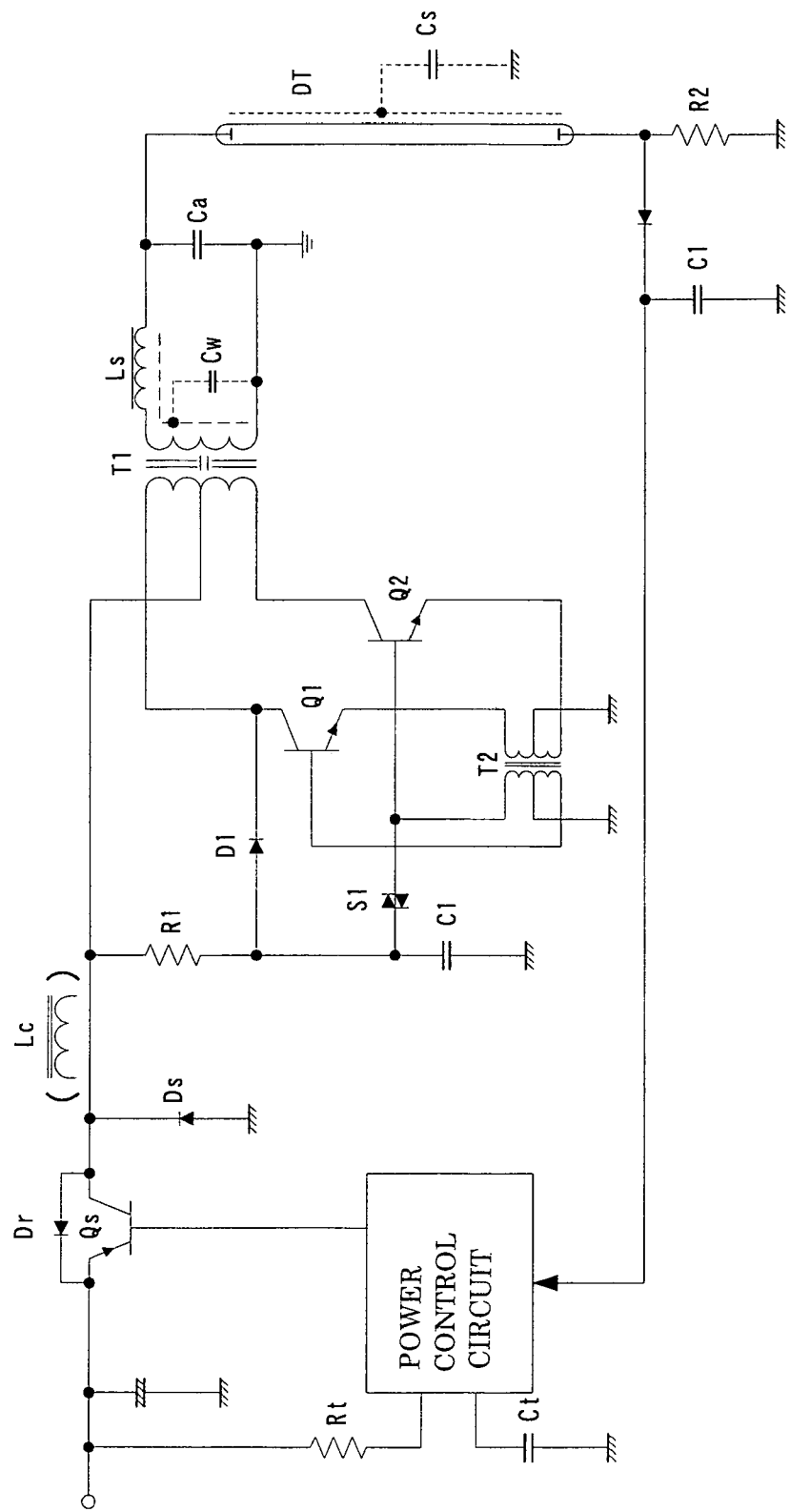
FIG. 39 is a circuit structural diagram showing one example of a current-mode resonant inverter circuit for a discharge lamp invented recently by the present inventor.
Figure 40:
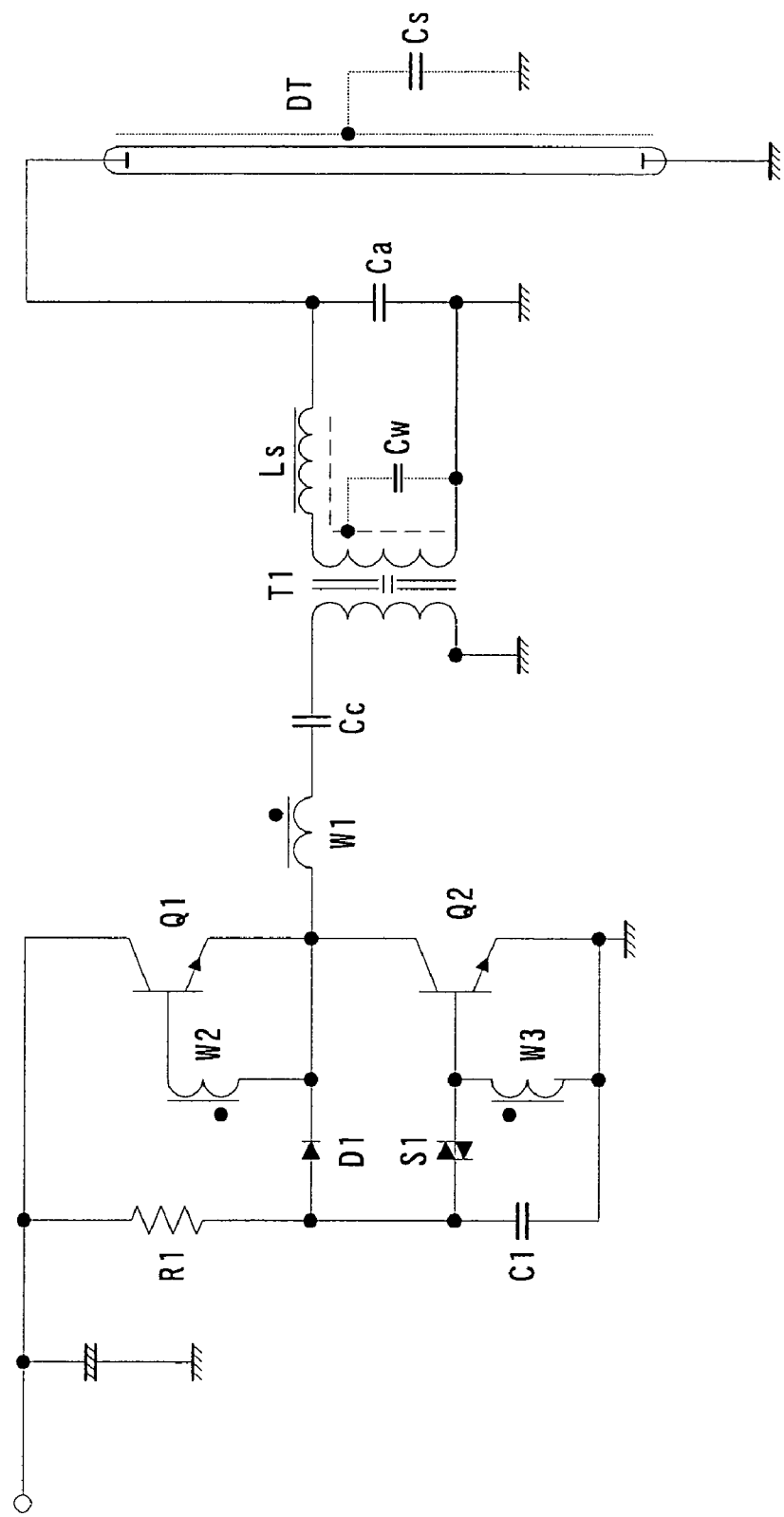
FIG. 40 is a circuit structural diagram illustrating an inverter circuit for lighting a cold cathode fluorescent lamp, in which the conventional current-mode resonant circuit is composed of a half-bridge circuit.
Figure 41:
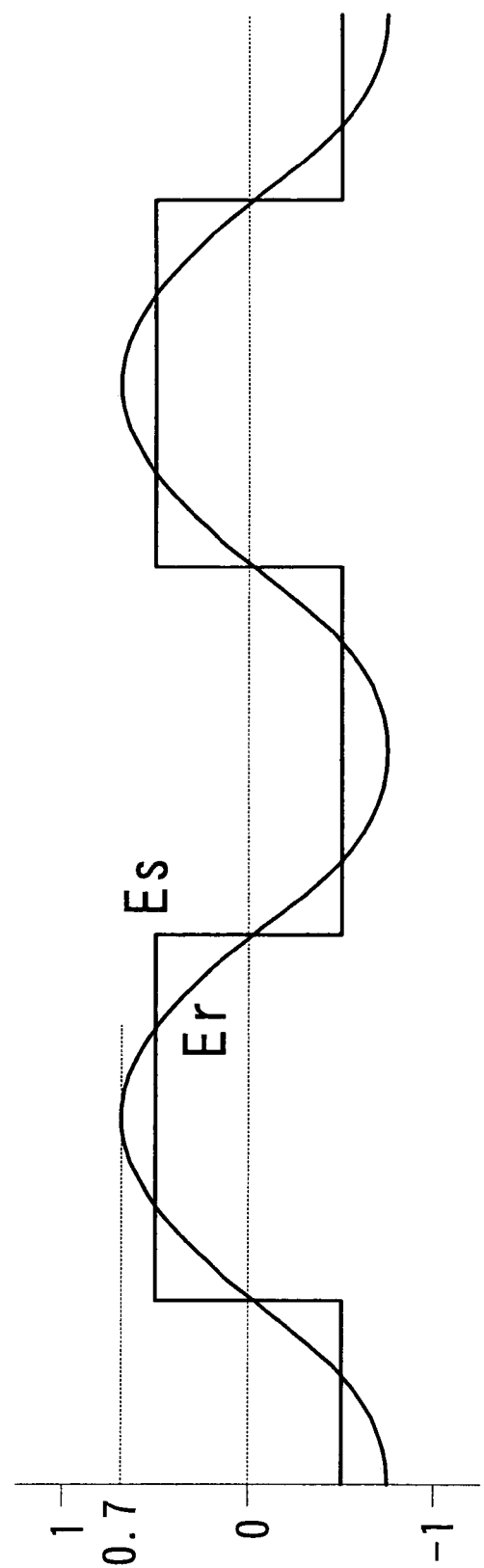
FIG. 41 is an explanatory diagram illustrating efficiency of a conventional half-bridge circuit in using supply voltage.
Figure 42:
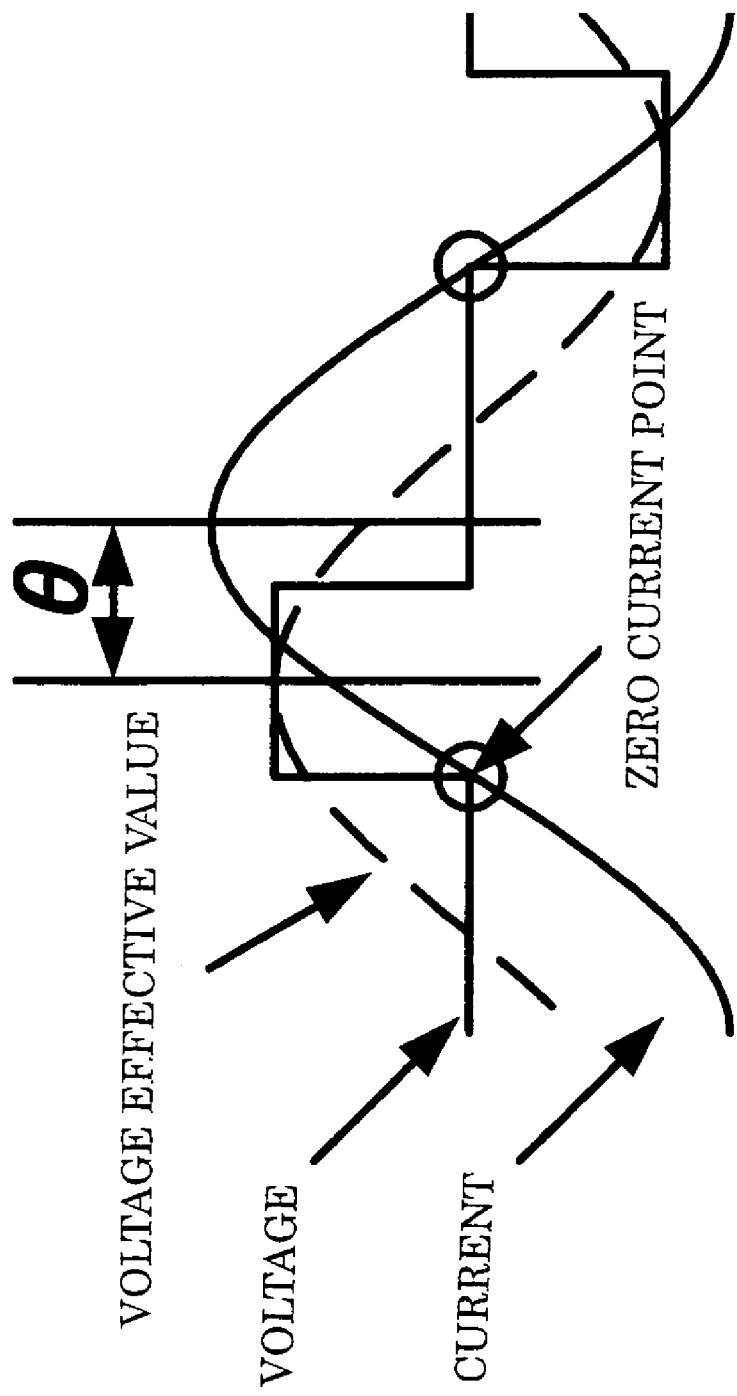
FIG. 42 is a phase diagram exemplarily showing the relation between the voltage and current applied to the step-up transformer primary winding in the conventional zero current switching circuit when power is large.
Figure 43:
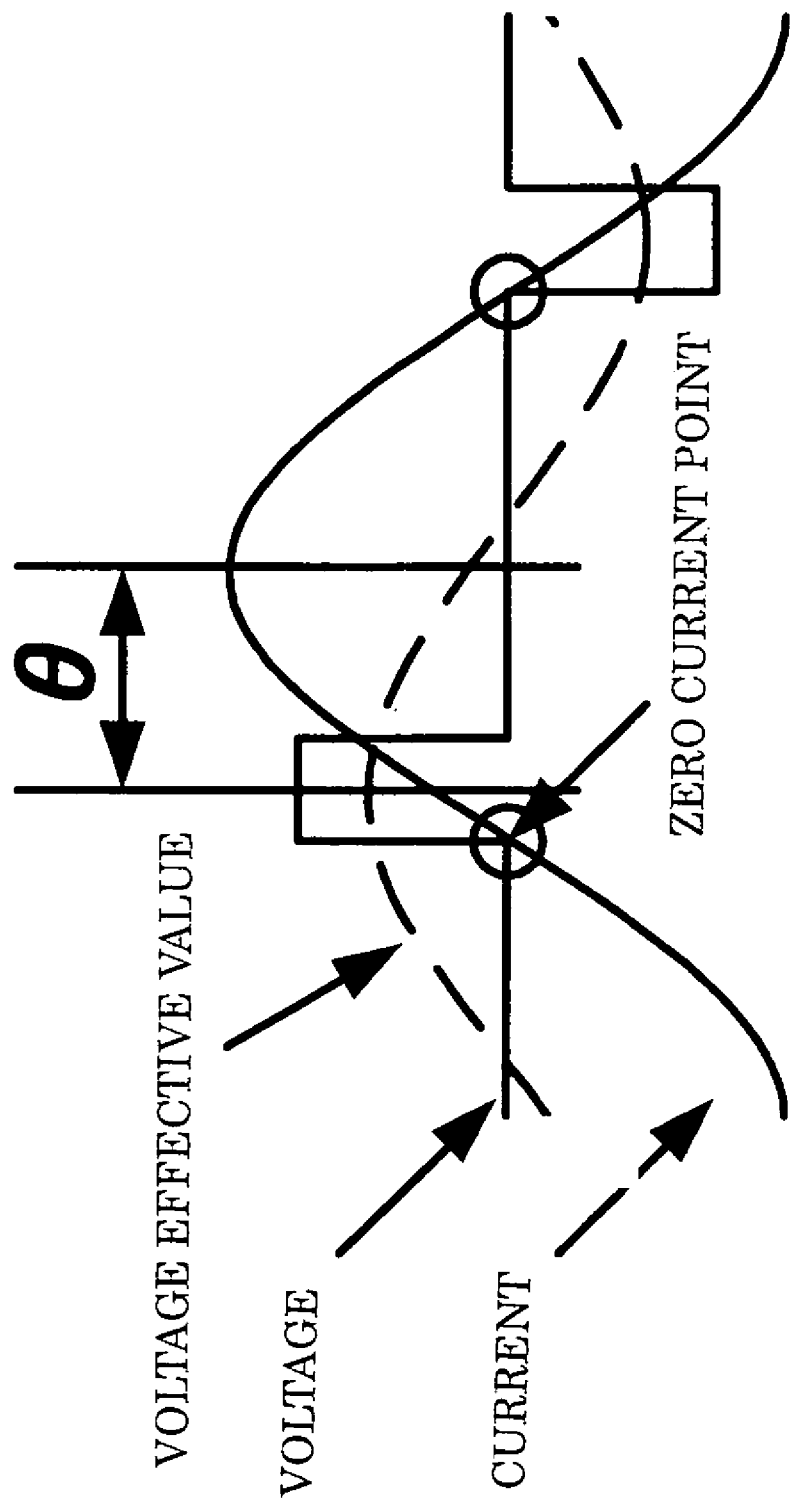
FIG. 43 is a phase diagram exemplarily showing the relation between the voltage and current applied to the step-up transformer primary winding in the conventional zero current switching circuit when power is small.
Figure 44:
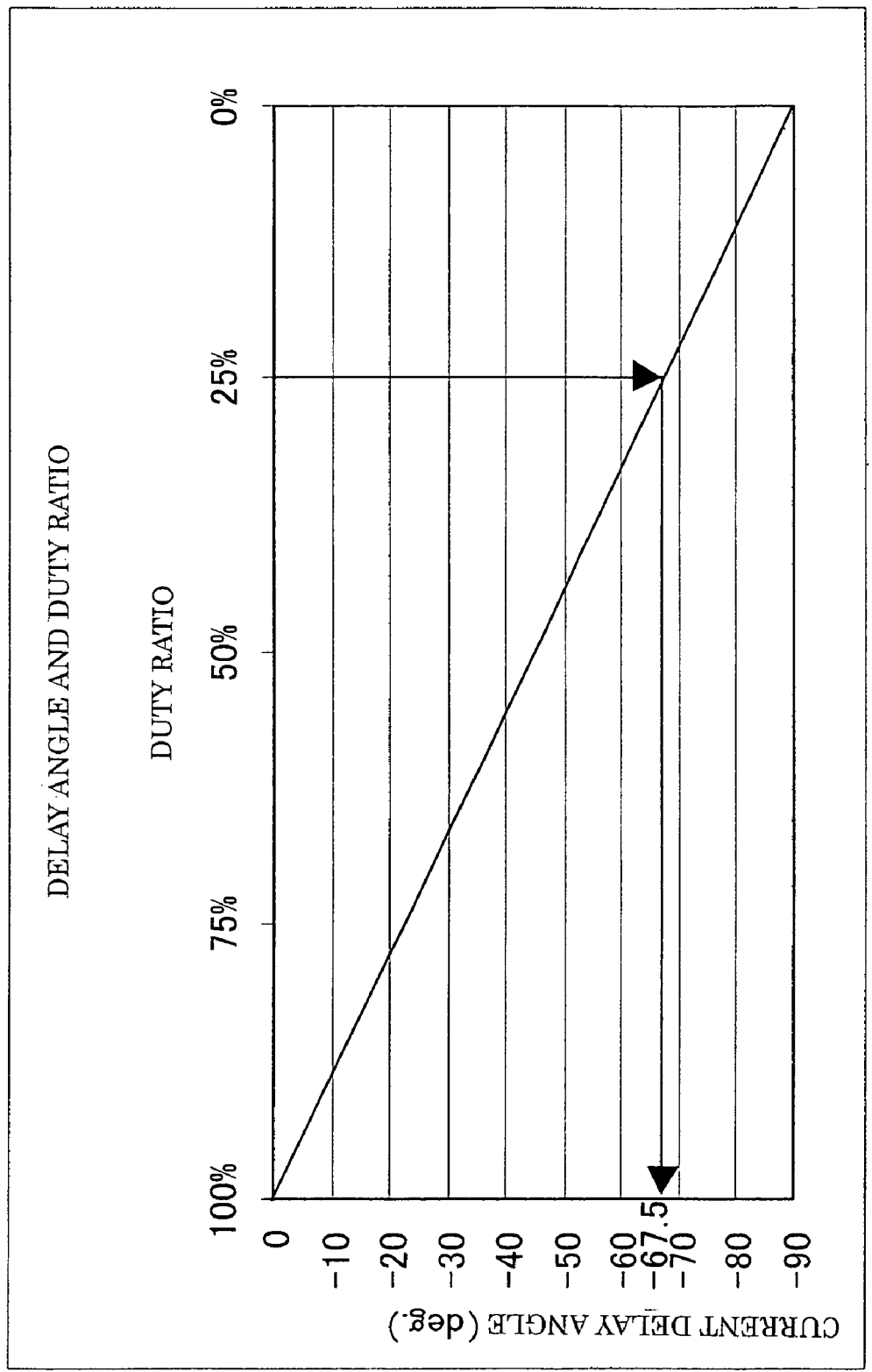
FIG. 44 is an explanatory diagram showing the relation between delay angle and duty ratio as to how much current waveform delays in a phase with respect to the voltage effective value, in the conventional zero current switching circuit.
Figure 45:
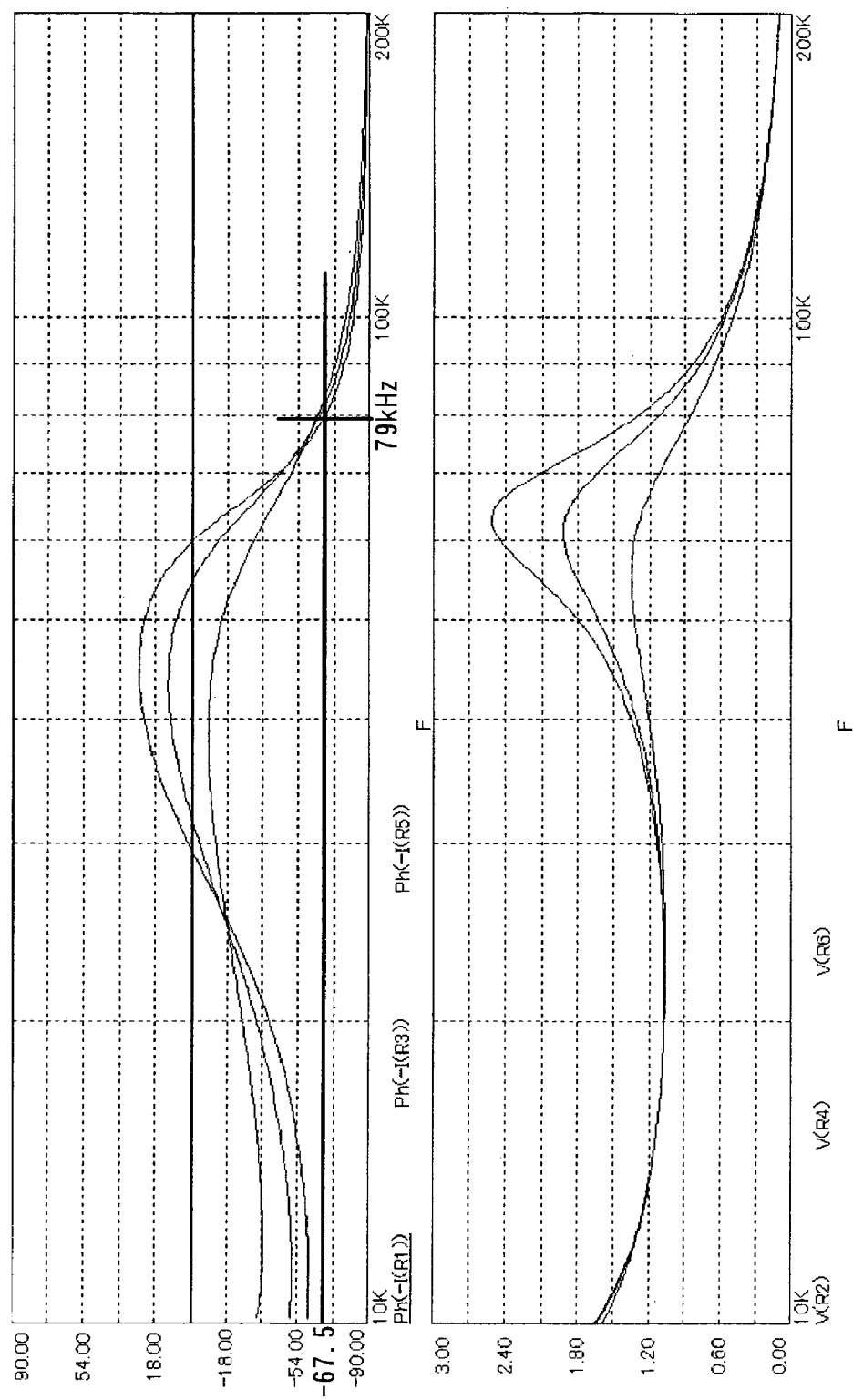
FIG. 45 is an explanatory diagram illustrating that an operational frequency of the inverter circuit is determined by the delay angle in the conventional zero current switching circuit.
Figure 46:
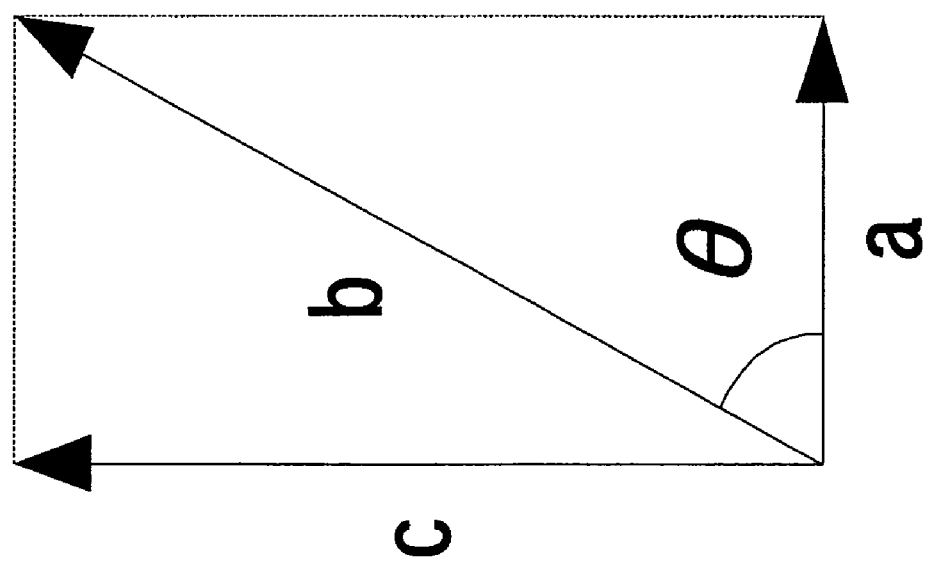
FIG. 46 is a figure in which consideration is given for power factor in which a load current converted on the primary side is set to as in the conventional zero current switching circuit.
Figure 47:
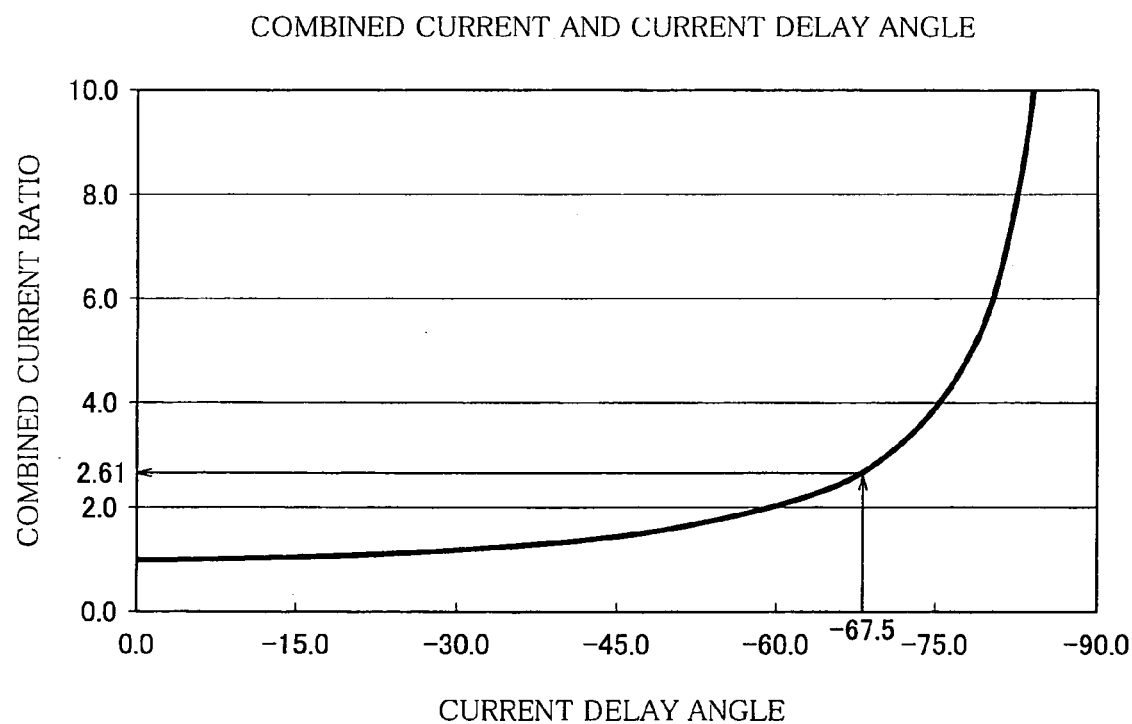
FIG. 47 is an explanatory diagram showing the relation among the load current converted on the transformer primary side, an exciting current, and a current through the primary winding when considering the power factor shown in FIG. 46.

In the present invention, power factor remains constant not only when no power control is performed, but also when using the power control means. FIG. 22 and FIG. 23 show the power control method in the present invention.

FIG. 22 shows a case in which the duty ratio becomes smaller so as to reduce the power of the inverter circuit. FIG. 23 shows a case in which the duty ratio becomes larger so as to increase the inverter circuit power. The voltage waveform changes the duty ratio with the peak of the current waveform as a center for power control. Since either case is controlled so that the voltage effective value shown with dotted line and the current are almost in phase, the power factor is always favorable as seen from the step-up transformer primary winding side.

This means that almost no exciting current flows. The fact that almost no exciting current flows means that the self-inductance of the step-up transformer primary winding can be small as long as it is driven under the ideal conditions. This leads to a drastic change in the design concept of the step-up transformer for a discharge lamp.

Specifically, the permeability of the core material may be lower then in a conventional one and the number of turns of the transformer primary and secondary windings may be smaller than in a conventional transformer. Particularly, if the number of turns of the transformer secondary winding is too large, as disclosed in Japanese Patent No. 2733817 and Japanese Laid-Open Patent Publication No. 2003-365326, due to the distributed constant transformer secondary winding, the structure of dense coupling and thin coupling appear (specifically, λ¼ self-resonance). Since the self-resonance effect is an important parameter which determines the maximum value for the number of turns of the secondary winding of the step-up transformer for a discharge lamp, it is significantly important that the number of turns of the transformer secondary winding can be made smaller. Considering the point disclosed in Japanese Laid-Open Patent Publication No. 2003-365326, it is implied that a step-up transformer which can convert larger power can be achieved in spite of the smaller dimension thereof.

EFFECT OF THE INVENTION

According to the present invention, the simple circuit, when compared with the conventional collector resonant circuit, can drastically improve the conversion efficiency of the inverter circuit. As a result, less heat is generated in the inverter circuit.

Also, an integrated circuit can be configured by the application of the principles of the present invention. In that case, since the circuit configuration inside the IC becomes extremely simple, the circuit with a lower cost can be configured.

Also, since the resonance frequency of the secondary side resonant circuit is accurately reflected in the operational frequency of the inverter circuit, the frequency deviation caused by changes in parasitic capacitance or the like can be responded to easily, thereby making the inverter circuit more reliable.

Also, although the value of the parasitic capacitance generated around the discharge lamp is an important parameter for determining the resonance frequency on the secondary side circuit, there has been no sign of this parameter being specified as of the time of the present application.

These are great problems facing industrial development. According to the present invention, however, since the current-mode resonant circuit searches for the optimum drive frequency automatically, the inverter circuit easily operates even though the important parameters have not been determined yet.

Also, the present invention can raise awareness of the importance of the parasitic capacitance around the discharge lamp on the secondary circuit among those skilled in the art at the same time.

Also, according to the present invention, since the primary resonant circuit can be set at a high Q value, the operational frequency of the inverter circuit can be stabilized, thereby achieving the inverter circuit reducing frequency deviation.

Also, the transformer becomes smaller at the same time. In contrast, if a transformer with the same outer diameter size as one used in the conventional collector resonant circuit, the transformer can be used with about 50% to 100% more power. In this case, it is necessary to say that the number of turns of the transformer secondary winding has to be changed so as to have an adequate leakage inductance. It is also to say that the transformer thus achieved, although the same as the conventional type in outer diameter size and shape, completely differs in electrical characteristics.

In the double-side high voltage driving inverter circuit composed of a main circuit and sub circuit, both poles of the discharge lamp do not have to be controlled synchronously, thereby making the inverter circuit configuration simplified.

Also, even when lighting multiple discharge lamps at the same time by a single inverter circuit, since the secondary side circuit can be set at a high Q value, the circuit for lighting multiple discharge lamps by a single circuit is easily achieved.

Also, when driving an external electrode fluorescent lamp (EEFL) or the like, driving is possible at a higher voltage by resonance step-up, thereby achieving the inverter circuit high conversion efficiency in driving.

What is claimed is:

1. A current-mode resonant inverter circuit comprising:
    a step-up transformer; and
    a secondary side circuit connected to a secondary winding of the step-up transformer, the secondary side circuit comprising a capacitive component, a resonant circuit being formed as a result of a leakage inductance of the step-up transformer secondary winding and the capacitive component in the secondary side circuit,
    wherein:
        one end of a primary winding of the step-up transformer is connected to a power source side;
        the other end of the primary winding is connected to a switched snubber circuit through a primary winding of a current transformer; and
        the switched-snubber circuit includes a pair of transistors different from each other in polarity, the bases or gates of the pair of transistors being connected to each other,
        the pair of transistors are connected to a secondary winding of the current transformer;
        one collector of the pair of transistors is connected to the primary winding of the current transformer, and the other collector of the pair of transistors is connected to the current transformer primary winding through a capacitor.

2. The current-mode resonant inverter circuit according to claim 1, wherein:
    the inverter circuit is configured as a main inverter circuit to be paired with a sub inverter circuit;
    either of the pair of inverter circuits is connected to one of the electrodes of the discharge lamp, and the sub inverter circuit is connected to the other electrode of the discharge lamp, so that the sub inverter circuit periodically oscillates with respect to the main inverter circuit automatically.

3. The current-mode resonant inverter circuit according to claim 1, wherein the inverter circuit is a current-mode resonant circuit or a zero current detection-type self-excited oscillation circuit.

4. The current-mode resonant inverter circuit according to claim 1, wherein the pair of transistors different in polarity is a pair of bipolar transistors different in polarity or a pair of field-effect transistors different in polarity.

5. The current-mode resonant inverter circuit according to claim 1, wherein:
    the inverter circuit has a mechanism for detecting a lamp current through a discharge lamp;
    the lamp current detecting mechanism is configured so that a negative potential becomes larger as the lamp current increases; and
    the negative potential is composed of a lamp current feedback circuit for power control, by being applied to a gate electrode of the switched-snubber circuit composed of a pair of reversed polarity transistors.

6. The current-mode resonant inverter circuit according to claim 1, further comprising:

current phase detecting means for detecting a current flowing through the step-up transformer secondary winding and switching means for determining a switching timing in response to an output of the current detecting method, wherein:
the switching means drives the step-up transformer primary side winding;
a parallel loaded serial resonant circuit if formed as a result of the capacitive component and the leakage inductance of the step-up transformer secondary winding;
and the current-mode resonant inverter circuit oscillates self-excitedly at a resonance frequency of the parallel loaded serial resonant circuit.

7. The current-mode resonant inverter circuit according to claim 6, wherein the switching means has the switched-snubber circuit.

8. A current-mode resonant inverter circuit comprising:
a step-up transformer;
a secondary side circuit connected to a secondary winding of the step-up transformer, the secondary side circuit comprising a capacitive component, a resonant circuit being formed as a result of a leakage inductance of the step-up transformer secondary winding and the capacitive component in the secondary side circuit;
an auxiliary resonance capacitor included in the capacitive component of the step-up transformer secondary circuit;
current phase detecting means for detecting a current flowing through the auxiliary resonance capacitor; and
switching means for determining a switching timing in response to an output from the current phase detecting means,
wherein:
one end of a primary winding of the step-up transformer is connected to a power source side;
the other end of the primary winding is connected to a switched snubber circuit;
the switched-snubber circuit includes a pair of transistors different from each other in polarity, the bases or gates of the pair of transistors being connected to each other;
the switching means drives the step-up transformer primary winding;
a parallel loaded serial resonant circuit is formed as a result of the capacitive component including the auxiliary resonance capacitor and the leakage inductance of the step-up transformer secondary winding; and
the current-mode resonant inverter circuit oscillates self-excitedly at a resonance frequency of the parallel loaded serial resonant circuit.

9. The current-mode resonant inverter circuit according to claim 8, wherein the switching means includes the switched-snubber circuit.

10. A current-mode resonant inverter circuit comprising:
a step-up transformer; and
a secondary side circuit connected to a secondary winding of the step-up transformer, the secondary side circuit comprising a capacitive component, a resonant circuit being formed as a result of a leakage inductance of the step-up transformer secondary winding and the capacitive component in the secondary side circuit,
wherein:
one end of a primary winding of the step-up transformer is connected to a power source side through a primary winding of a current transformer;
the other end of the primary winding is connected to a switched snubber circuit; and
the switched-snubber circuit includes a pair of transistors different from each other in polarity, the bases or gates of the pair of transistors being connected to each other,
the pair of transistors are connected to a secondary winding of the current transformer;
one collector of the pair of transistors is connected to the primary winding of the current transformer, and the other collector of the pair of transistors is connected to the current transformer primary winding through a capacitor.

11. A current-mode resonant inverter circuit comprising:
a step-up transformer; and
a secondary side circuit connected to a secondary winding of the step-up transformer, the secondary side circuit comprising a capacitive component, a resonant circuit being formed as a result of a leakage inductance of the step-up transformer secondary winding and the capacitive component in the secondary side circuit,
wherein:
one end of a primary winding of the step-up transformer is connected to a power source side;
the other end of the primary winding is connected to a switched snubber circuit through a current detecting element and an amplifier circuit; and
the switched-snubber circuit includes a pair of transistors different from each other in polarity, the bases or gates of the pair of transistors being connected to each other,
the pair of transistors are connected to the current detecting element and amplifier circuit;
one collector of the pair of transistors is connected to the current detecting element and amplifier circuit, and the other collector of the pair of transistors is connected to the current detecting element and amplifier circuit through a capacitor.

12. A current-mode resonant inverter circuit comprising:
a first choking coil;
a second choking coil;
a secondary side circuit, the secondary side circuit comprising a capacitive component and the second choking coil, a resonant circuit being formed based on the second choking coil and the capacitive component in the secondary side circuit;
an auxiliary resonance capacitor included in the capacitive component of the secondary side circuit;
current phase detecting means for detecting a current flowing through the auxiliary resonance capacitor; and
switching means for determining a switching timing in response to an output from the current phase detecting means,
wherein:
one end of the first choking coil is connected to a power source side;
the other end of the first choking coil is connected to a switched snubber circuit;
the switched-snubber circuit includes a pair of transistors different from each other in polarity, the bases or gates of the pair of transistors being connected to each other,
a parallel loaded serial resonant circuit is formed as a result of the capacitive component including the auxiliary resonance capacitor and the inductance of the second choking coil; and the current-mode resonant inverter circuit oscillates self-excitedly at a resonance frequency of the parallel loaded serial resonant circuit.

13. The current-mode resonant inverter circuit according to claim 12, wherein:

the inverter circuit is configured as a main inverter circuit to be paired with a sub inverter circuit;

either of the pair of inverter circuits is connected to one of the electrodes of the discharge lamp, and the sub inverter circuit is connected to the other electrode of the discharge lamp, so that the sub inverter circuit periodically oscillates with respect to the main inverter circuit automatically.

14. The current-mode resonant inverter circuit according to claim 12, wherein the inverter circuit is a current-mode resonant circuit or a zero current detection-type self-excited oscillation circuit.

15. The current-mode resonant inverter circuit according to claim 12, wherein the pair of transistors different in polarity is a pair of bipolar transistors different in polarity or a pair of field-effect transistors different in polarity.

16. A current-mode resonant inverter circuit comprising:

a first choking coil; and a secondary side circuit, the secondary side circuit comprising a capacitive component and a second choking coil, a resonant circuit being formed based on the second choking coil and the capacitive component in the secondary side circuit, wherein:

one end of the first choking coil is connected to a power source side;

the other end of the first choking coil is connected to a switched snubber circuit through a primary winding of a current transformer; and the switched-snubber circuit includes a pair of transistors different from each other in polarity, the bases or gates of the pair of transistors being connected to each other, the pair of transistors are connected to a secondary winding of the current transformer;

one collector of the pair of transistors is connected to the primary winding of the current transformer, and the other collector of the pair of transistors is connected to the current transformer primary winding through a capacitor.

17. The current-mode resonant inverter circuit according to claim 16, wherein the inverter circuit is a current-mode resonant circuit or a zero current detection-type self-excited oscillation circuit.

18. The current-mode resonant inverter circuit according to claim 16, wherein the pair of transistors different in polarity is a pair of bipolar transistors different in polarity or a pair of field-effect transistors different in polarity.

19. The current-mode resonant inverter circuit according to claim 16, wherein:

the inverter circuit is configured as a main inverter circuit to be paired with a sub inverter circuit;

either of the pair of inverter circuits is connected to one of the electrodes of the discharge lamp, and the sub inverter circuit is connected to the other electrode of the discharge lamp, so that the sub inverter circuit periodically oscillates with respect to the main inverter circuit automatically.

* * * * *